United States Patent
Jacobs et al.

(10) Patent No.: US 8,712,848 B2
(45) Date of Patent: *Apr. 29, 2014

(54) METHOD FOR DISTRIBUTING ADVERTISEMENTS TO CLIENT DEVICES USING AN OBSCURED AD MONITORING FUNCTION

(75) Inventors: Paul E. Jacobs, La Jolla, CA (US); Franklin P. Antonio, Del Mar, CA (US); Steve Dorner, San Diego, CA (US); John W. Noerenberg, San Diego, CA (US); Jeffrey K. Belk, Poway, CA (US); Benjamin P. Ogdon, Del Mar, CA (US); Jeffrey D. Beckley, Poway, CA (US); Alan Bird, San Diego, CA (US); John D. Boyd, San Diego, CA (US); John Sam Purlia, La Jolla, CA (US); William J. Rhodes, San Diego, CA (US); David Jonathan Ross, San Diego, CA (US); Matthew J. Dudziak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1711 days.

This patent is subject to a terminal disclaimer.

(21) Appl. No.: 11/470,591

(22) Filed: Sep. 6, 2006

(65) Prior Publication Data

US 2007/0112627 A1    May 17, 2007

Related U.S. Application Data

(63) Continuation of application No. 09/609,123, filed on Jun. 30, 2000, now abandoned.

(60) Provisional application No. 60/169,622, filed on Dec. 8, 1999, provisional application No. 60/209,392, filed on Jun. 1, 2000.

(51) Int. Cl.
   *G06Q 30/00*    (2012.01)

(52) U.S. Cl.
   USPC ....... 705/14.68; 705/14.4; 709/203; 709/219; 709/224; 709/246; 717/178

(58) Field of Classification Search
   USPC .............. 705/14.4, 14.68; 709/203, 219, 224, 709/246; 717/178
   See application file for complete search history.

(56) References Cited

U.S. PATENT DOCUMENTS

| 4,703,423 A | 10/1987 | Bado et al. |
| 5,105,184 A | 4/1992 | Pirani et al. |

(Continued)

FOREIGN PATENT DOCUMENTS

| EP | 822535 | 2/1998 |
| WO | WO9624213 | 8/1996 |

(Continued)

OTHER PUBLICATIONS

Claria Company Information, Corporate Overview. www.claria.com/companyinfo Apr. 12, 2004.

(Continued)

*Primary Examiner* — Raquel Alvarez
(74) *Attorney, Agent, or Firm* — James T. Hagler

(57) ABSTRACT

Software for use on a client device that is configured for communications via a communications network instantiates a communications function that effects an advertisement download communication link between the client device and an advertisement distribution server system via the communications network, at selected advertisement download times, an advertisement download function that downloads advertisements identified in a playlist(s) generated by at least one playlist server, via the advertisement download communication link, at the selected advertisement download times, an advertisement storage function for storing the downloaded advertisements on a storage medium associated with the client device, and an advertisement display function that effects display of at least selected ones of the stored advertisements.

41 Claims, 42 Drawing Sheets

| Persistent Ads | |
|---|---|
| PlayList Request | |
| faceTime | Used to determine how much advertising to send to client |
| faceTimeLeft | Not used |
| PlayList Response Clientinfo | |
| reqInterval | Relatively large: one or more days |
| flush | Used. Single playlist completely specifies list of ads client should have |
| PlayList Response Scheduling Parameters | |
| Show/ForMax | Not used |

(56) References Cited

U.S. PATENT DOCUMENTS

| | | |
|---|---|---|
| 5,177,680 A | 1/1993 | Tsukino et al. |
| 5,325,310 A | 6/1994 | Johnson et al. |
| 5,347,632 A | 9/1994 | Filepp et al. |
| 5,377,354 A | 12/1994 | Scannell et al. |
| 5,426,427 A | 6/1995 | Chinnock et al. |
| 5,442,771 A | 8/1995 | Filepp et al. |
| 5,451,998 A | 9/1995 | Hamrick |
| 5,473,143 A | 12/1995 | Vak et al. |
| 5,475,819 A | 12/1995 | Miller et al. |
| 5,483,466 A | 1/1996 | Kawahara et al. |
| 5,515,270 A | 5/1996 | Weinblatt |
| 5,664,948 A | 9/1997 | Dimitriadis et al. |
| 5,781,894 A | 7/1998 | Petrecca et al. |
| 5,794,210 A | 8/1998 | Goldhaber et al. |
| 5,796,952 A | 8/1998 | Davis et al. |
| 5,809,242 A | 9/1998 | Shaw et al. |
| 5,812,784 A | 9/1998 | Watson et al. |
| 5,838,790 A | 11/1998 | McAuliffe et al. |
| 5,848,397 A | 12/1998 | Marsh et al. |
| 5,854,897 A | 12/1998 | Radziewicz et al. |
| 5,913,040 A | 6/1999 | Rakavy et al. |
| 5,918,014 A | 6/1999 | Robinson |
| 5,937,392 A | 8/1999 | Alberts |
| 5,946,646 A | 8/1999 | Schena et al. |
| 5,955,170 A | 9/1999 | DiFranza |
| 5,957,695 A | 9/1999 | Redford et al. |
| 5,959,623 A | 9/1999 | van Hoff et al. |
| 6,014,502 A | 1/2000 | Moraes |
| 6,064,982 A | 5/2000 | Puri |
| 6,134,584 A | 10/2000 | Chang et al. |
| 6,141,010 A | 10/2000 | Hoyle |
| 6,144,944 A | 11/2000 | Kurtzman, II et al. |
| 6,216,112 B1 | 4/2001 | Fuller et al. |
| 6,298,332 B1 | 10/2001 | Montague |
| 6,339,795 B1 | 1/2002 | Narurkar et al. |
| 6,345,288 B1 | 2/2002 | Reed et al. |
| 6,381,709 B1 | 4/2002 | Casagrande et al. |
| 6,487,538 B1 | 11/2002 | Gupta et al. |
| 6,516,338 B1 | 2/2003 | Landsman et al. |
| 6,605,120 B1 | 8/2003 | Fields et al. |
| 6,625,578 B2 | 9/2003 | Spaur et al. |
| 6,658,465 B1 | 12/2003 | Touboul |
| 6,714,975 B1 | 3/2004 | Aggarwal et al. |
| 2004/0249708 A1 | 12/2004 | Jacobs et al. |

FOREIGN PATENT DOCUMENTS

| | | |
|---|---|---|
| WO | WO9740514 | 10/1997 |
| WO | WO9847090 | 10/1998 |
| WO | WO9913423 | 3/1999 |
| WO | WO9952056 | 10/1999 |
| WO | WO9955066 | 10/1999 |
| WO | WO9959097 | 11/1999 |

OTHER PUBLICATIONS

International Search Report—PCT/US2000/029157, International Search Authority—European Patent Office—Apr. 2, 2001.

| Assumptions | |
|---|---|
| Average Comerc., Speed, Mbps | 28.8 |
| Average Ad Size, Mbps | 9.3 |
| Number of Cache | 8,000.000 |
| Number of Hours Running Eudora | 2 |
| Number Mailchecks Per User Per Hour | 2 |
| Playlist, Entry Size, Bytes | 500 |

FIG. 13A

| | | Implications | | | |
|---|---|---|---|---|---|
| # of new Ads Per User Per Day | # of Seconds Download by Ads | # of Seconds Added Per Check | 8X Cache Ad Bundled Mbps | Ad Mbps / 100,000 user | Avg Sim. Cumulative, 1000 | 8X Cache Playlist Bandwidth Mbps | Playlist Mbps / 100,000 users |
| 10 | 26 | 6 | 67 | 0.8 | 2.4 | 4 | 10.0 |
| 15 | 39 | 10 | 101 | 1.3 | 3.6 | 5 | 0.1 |
| 20 | 52 | 13 | 135 | 1.7 | 4.8 | 7 | 0.1 |
| 25 | 65 | 16 | 168 | 2.4 | 6.0 | 8 | 0.1 |
| 30 | 70 | 19 | 202 | 2.5 | 7.2 | 11 | 0.1 |
| 35 | 90 | 23 | 235 | 2.9 | 8.4 | 12 | 0.2 |

FIG. 13B

```
//////////////////////////////
// Main ad scheduler
ScheduleMain
{
// Has a new day dawned?
Do CheckForNewDay
// Are we are within the current ad's showFor?
if   ( ad.thisShowTime < ad.showFor )
{
// there is nothing to be done
return
)
// At this point, we know that we need a new ad
// Perform housekeeping tasks on the old one
Do AdEndBookkeeping
// Pop out of a block if all ads on par
if   ( block isn't all playlists )
{
find ad with minimum ad,numberShown
if ( ad.numberShown > = blockGoal )
set block to all playlists
}
// If we are over our quota of regular ads for the day,
// look for a runout
if    ( adFaceTimeToday > faceTimeQuota )
{
Do  ShowARunout
}
else
{
Do  ShowARegularAd
}
}
// end ad schedule main
```

FIG. 15A

```
///////////////////////////////////////
// We must perform certain tasks when the calendar day changes.
CheckForNewDay
{ if ( the calendar day has changed )
{
// Perform housekeeping tasks on the ad currently showing
Do StopShowingCurrentAd
// Runout ads are charged for a full showFor if they've been shown
// at all on a given day. Charge any runout ads if they've been
// shown at all.
for runout ads
{
if  ( ad.thisShowTime > 0 )
{
ad.totalTimeShown += ad.showFor
ad.thisShowTime = 0
}
}
// Now, reset the counters for all ads to reflect the fact that
// a new day has dawned.
for all ads
{
ad.numberShownToday = 0
}
// Record yesterday's facetime
// Might not literally be yesterday, be sure to use
// whatever day the app was last run on
set old current day's facetime to totalFaceTimeToday
// and reset our global regular ad facetime counter
adFaceTimeToday = 0
totalFaceTimeToday = 0
// if we were in a block, back out
set block to all playlists
}
}
// end CheckForNewDay
```

FIG. 15B

```
////////////////////////////////////
//  This function shows a runout ad, and if it
//  can't find one, goes to a rerun
ShowARunout
{
for runout ads
{
//  has the ad been flushed?
if   ( ad.flushed )
try next ad
//  are we done showing this runout today?
if   ( ad.numberShownToday > ad.dayMax )
try next ad // this one's used up for the day
//  are we done showing this runout for ever and ever?
if   (ad.shownFor > ad.showForMax )
try next runout ad // this one's used up forever
//  are we between the ad's start and end dates?
if   ( ad.startDate < the current date < ad.endDate )
try next runout ad
//  the ad is not supposed to run today
//  do we actually HAVE the ad?
if   ( ad has not been downloaded )
{
ask for ad to be downloaded
try next ad
}
//  ok, we believe we should show this runout
//  we are now in runout state
Do ShowAnAd
return
}
//  if we haven't found a runout ad, we will go to "rerun"
state
Do ShowARerun
}
//  end ShowARunout
```

FIG. 15C

```
///////////////////////////////////
//  Rerun state. Look for a regular ad to rerun
ShowARerun
{
for regular ads [ in current block ]
{
//  has the ad been flushed?
if   ( ad.flushed )
try next ad
//  is this ad recent enough to rerun?
if   ( ad.lastShownDate is older than returnInterval )
try next ad
//  this one is too old to rerun
//  if in block, show ads only if it's their "turn"
if   ( ad.numberShownToday >= blockGoal )
try next ad // need to find a friend in this block
//  are we between the ad's start and end dates?
if   ( ad.startDate < the current date < ad.endDate )
try next ad
//  the ad is not supposed to run today
//  do we actually HAVE the ad?
if   ( ad has not been downloaded )
{
ask for ad to be downloaded
try next ad
}
//  ok, at this point we can show this ad, but because
//  we're in rerun, we don't keep the books
Do ShowAnAd
return
}
//  if we get here, we have no ads to show. Punt.
return
}
//  end ShowARerun
```

FIG. 15D

```
////////////////////////////////////
//  Show a regular ad
ShowARegularAd
{
for regular ads [ in current block ]
{
//  has the ad been flushed?
if   ( ad.flushed )
try next ad
//  are we done showing this ad today?
if   ( ad.numberShownToday > ad.dayMax )
try next ad // this one's used up for the day
//  if in block, show ads only if it's their "turn"
if   ( ad.numberShownToday >= blockGoal )
try next ad // need to find a friend in this block
//  are we done showing this ad for ever and ever?
if   ( ad.shownFor > ad.showForMax )
try next ad // this one's used up forever
//  are we between the ad's start and end dates?
if   ( ad.startDate < the current date < ad.endDate )
try next ad
//  the ad is not supposed to run today
//  do we actually HAVE the ad?
if   ( ad has not been downloaded )
{
ask for ad to be downloaded
try next ad
}
//  ok, we believe we should show this ad
//  we are now in regular state
Do ShowAnAd
return
}
//  If we get here, we have failed to find a regular
//  ad. Go to runout
Do  ShowARunout
}
//  end ShowARegularAd
```

FIG. 15E

```
//////////////////////////////////
// Perform necessary housekeeping when we're taking
// down an ad
AdEndBookkeeping
{
// In rerun state, we don't do any bookkeeping
if   ( in RerunState )
return
// Account for at most ad,showFor seconds, provided
// we've shown the ad for at least ad.showFor seconds
// Note that this means we don't charge for time beyond
// ad.showFor seconds, which is important
if   ( ad.thisShowTime >= ad.showFor )
{
ad.numberShownToday += ad.showFor
ad.shownFor++
// we do NOT reset thisShowTime here, we do it in
// AdStartBookkeeping. It actually doesn't matter where
// we do it, provided we are careful NOT to do it for
// runout ads.
}
}
// end AdEndBookkeeping
```

FIG. 15F

```
//////////////////////////////////
//  Show an ad, including bookkeeping and block handling
ShowAnAd
{
//  If the ad is in a block, notice that
if   ( it's in a "block" playlist )
{
if   ( not currently in a block )
{
find ad in block with minimum numberShown
make that our ad
set blockGoal to minimum numberShown+1
}
set current block to this playlist
}
//  now do bookkeeping
Do AdStartBookkeeping
//  and actually show it
Do DisplayThatAd
}
```

FIG. 15G

```
//////////////////////////////////
//  Perform housekeeping when we put up an ad
AdStartBookkeeping
{
//  In rerun state, we don't do any bookkeeping
if   ( in RerunState )
return
//  For regular ads
if   ( it's a regular ad )
{
ad.thisShowTime = 0
Ad.lastShownDate = now
}
}
//  end AdStartBookkeeping
```

FIG. 15H

| Persistent Ads | | |
|---|---|---|
| PlayList Request | faceTime | Used to determine how much advertising to send to client |
| | faceTimeLeft | Not used |
| PlayList Response ClientInfo | reqInterval | Relatively large: one or more days |
| | flush | Used. Single playlist completely specifies list of ads client should have |
| PlayList Response Scheduling Parameters | Show/ForMax | Not used |

FIG. 16A

| Short-Lived Ads | | |
|---|---|---|
| PlayList Request | faceTime | Not used |
| | faceTimeLeft | Used to determine how many ads client should receive |
| PlayList Response ClientInfo | reqInterval | Not used. Instead client requests new playlist whenever ads "run low" |
| | flush | Not used |
| PlayList Response Scheduling Parameters | show/ForMax | Used to determine how long an ad runs |

FIG. 16B

We'd like to know how you use Eudora.

In order to make Eudora work as well as possible, it's important that we know how people use it. We ask users for this information at random. Looks like it's your turn. If you're open to helping us this way, all you have to do is click "Generate Info" below and a message will be created. You can review the contents of the message if you like, and then send it to us or not -- that's up to you.

We value our privacy; we're pretty sure you value yours. So we want you to know what we'll be collecting and give you a chance to eliminate anything you don't want to send. Simply uncheck the boxes next to any information you'd rather not send.

Please understand that as soon as we receive your email, we will throw away the headers that identify the mail as coming from you. You see, we don't actually need to know who you are to find your information helpful. So we promise to protect your privacy and turn you into "just a number."

It's OK to transmit statistics regarding:

- ☑ Your demographic data
- ☑ Advertisement Information
- ☑ Non-personal settings
- ☑ Your Net/Eudora usage
- ☑ Eudora features you use

[ Cancel ]   [ Generate Info ]

FIG. 18A

| Page | action | \multicolumn{16}{c}{Applicable Query Parts} |
|------|--------|----------|---------|---------|----------------|------|----------|-------|----------|---------|---------|--------|----------|---------|-----|------|-------|
|      |        | platform | product | version | Distributor II | mode | realname | email | regfirst | reglast | regcode | oldReg | regLevel | profile | url | adid | topic |
| Payment | pay | X | X | X | X | X | X | X | X | X | X | X | | | | | |
| Freeware Registration | register-free | X | X | X | X | X | X | X | X | X | X | | | | | | |
| Adware Registration | register-ad | X | X | X | X | X | X | X | X | X | X | | | | | | |
| Box Registrations | register-box | X | X | X | X | X | X | X | X | X | X | | | | | | |
| Lost Code | lostcode | X | X | X | X | X | X | X | X | X | | X | | | | | |
| Update | update | X | X | X | X | X | | | | | | | X | | | | |
| Pro Update | proupdate | X | X | X | X | X | | | | | | | X | | | | |
| Archived | archived | X | X | X | | | | | | | | | | | | | |
| Profile | profile | X | X | X | X | X | X | X | | | | | | X | | | |
| Introduction | intro | | | | | | | | | | | | | | | | |
| Support | n/a | X | X | X | X | X | X | X | X | X | X | X | | | | | |
| QuickTime Missing | support | X | X | X | X | | | | | | | | | | | | no-qt |
| Ad Failure | support | X | X | X | X | | | | | | | | | | | | ad-fail |
| Tutorial | support | X | X | X | X | | | | | | | | | | | | tutor |
| FAQ | support | X | X | X | X | | | | | | | | | | | | faq |
| Light Users | support | X | X | X | X | | | | | | | | | | | | light |
| Search Support | support | X | X | X | X | | | | | | | | | | | | search |
| Newsgroups | support | X | X | X | X | | | | | | | | | | | | usenet |

FIG. 19

% The lost of available ads advantageously can be built from the following query:

ads = dbCon.prepareStatement("SELECT * FROM ads WHERE StartDate <= today AND endDate >= today + 30 AND AdType = "I" AND AdStatus = "A" AND ImpressionsServerd < Impressions ORDERED BY ImpressionsServed ASC);

run out ads = dbCon.prepareStatement("SELECT * FROM ads WHERE StartDate <= today AND endDate >= today + 30 AND AdType = "R" AND AdStatus = "A" AND ImpressionsServed <Impressions ORDERED BY ImpressionsServed ASC);

% The time required to deliver the ads advantageously can be calculated in the following manner.

face time left for today [seconds] = faceTime[today] – faceTimeUsedToday (Comment: Face time left for today is the number of seconds the servlet can use to deliver special ads today.)
predict face time [seonds] = SUM( faceTime(tomorrow), faceTime[tomorrow + 1], … faceTime[tomorrow + reqInterval]
)

(Comment: Predict face time is the number of seconds the servlet predicts the user is going to have.)
goal show time left [seconds] = predict face time – faceTimeLeft (Comment: Goal show time left is the number of seconds that the software provider needs to fill with ads.)

FIG. 21A

```
%   Targeting
        while (face time left for today){
                if ad is not in the history{
                        select ad (according to target = today)
                        face time left for today -= ad.showFor
                }
                next ad
        }
}

While (Goal show time left) {
        if ad is not in the history(
                select ad [according to target]
                goal show time left -= ad.showFor
        }
        next ad
}

Default values:
        reqInterval = 1day.
        facetime = 30 minutes
        faceTimeQuota is ?
        histLength = 31 days
```

FIG. 21B

METHOD FOR DISTRIBUTING ADVERTISEMENTS TO CLIENT DEVICES USING AN OBSCURED AD MONITORING FUNCTION

CROSS-REFERENCE TO RELATED APPLICATIONS

This application is a continuation of U.S. Provisional Patent Application Ser. No. 60/209,392, filed Jun. 1, 2000, and U.S. patent application Ser. No. 09/609,123, filed Jun. 30, 2000, now abandoned, which claims the benefit of U.S. Provisional Patent Application Ser. No. 60/169,622, filed Dec. 8, 1999. These patent applications are incorporated herein by reference in their entirety.

COPYRIGHT NOTICE

A portion of the disclosure of this patent document contains material which is subject to copyright protection. The copyright owner has no objection to the facsimile reproduction by any one of the patent document or patent disclosure as it appears in the Patent and Trademark Office patent file or records, but otherwise reserves all copyright rights whatsoever.

BACKGROUND OF THE INVENTION

The present invention relates generally to the field of electronic mail ("e-mail") software and systems. More particularly, the present invention is related to advertiser-supported e-mail software for delivering advertisements to client computers having this advertiser-supported e-mail software installed thereon.

Electronic mail ("e-mail") has become a ubiquitous form of communication in recent years. In general, e-mail works as follows. E-mail software is installed on a client device, e.g., a personal computer (PC), equipped or configured for communications with a multiplicity of other client devices via a communications network. Access to the communications network can be provided by a communications network service provider, e.g., an Internet Service Provider (ISP) and/or a proprietary network e-mail service provider, with whom the user establishes one or more e-mail accounts, each identified by a unique e-mail address, e.g., president@whitehouse.gov. The e-mail software, e.g., the e-mail client, enables a user of the client device to compose e-mail messages, to send e-mail messages to other client devices via the communications network, and to read e-mail messages received from other client devices via the communications network. A user can send e-mail messages to multiple recipients at a time, which capability is sometimes referred to using a mailing list or, in extreme cases, bulk mailing. The typical e-mail client supports Post Office Protocol Version 3 (POP3), Simple Mail Transfer Protocol (SMTP), Internet Mail Access Protocol, Version 4 (IMAP4), and/or Multipurpose Internet Mail Extensions (MIME).

Each ISP and each proprietary network e-mail service provider independently operates and controls an e-mail communication system (or, simply, "e-mail system"). These independently-operated e-mail systems are bi-directional store-and-forward communication systems that are interconnected to one another via the Internet. Each e-mail system generally includes a number of e-mail servers that store inbound and outbound e-mail messages and then forward them, route them, or simply make them available to the users/intended recipients. Different e-mail systems are operated and controlled by independent control entities. With the advent of the Internet, the user is not restricted to a single system providing both an incoming e-mail server (or server cluster) and an outgoing e-mail server (cluster), i.e., both the incoming and outgoing e-mail servers under the control of a single entity. Most e-mail clients, other than proprietary e-mail systems such as AOL and JUNO, can be configured to receive e-mail from an incoming e-mail server (cluster) controlled by a first entity and an outgoing email server (cluster) controlled by a second, totally independent entity. It will be appreciated that most casual email users download from and upload to respective servers operated by a single entity.

Generally, when a user desires to send e-mail messages, or to check for received messages (which operations can occur automatically according to a prescribed schedule), the e-mail software is activated. Upon being activated, the e-mail software:

effects a connection or communications session with the host ISP or e-mail service provider via a prescribed communication link by invoking a prescribed communications mechanism, e.g., a dial-up modem, an ISDN connection, a DSL or ADSL connection, etc.;

electronically transmits or transports any e-mail messages desired to be sent to the e-mail server system operated by the host ISP or e-mail service provider, e.g., via an SMTP server;

receives any inbound e-mail messages forwarded to the client device by the host ISP or e-mail service provider, e.g., via a POP3 or IMAP4 server; and stores any received e-mail messages in a prescribed memory location within the client device, e.g., at either the default location established by the e-mail client or a user-selected location.

Exemplary e-mail software is the commercially available e-mail software marketed by the present assignee, QUALCOMM INCORPORATED, under the registered trademarks EUDORA PRO® and EUDORA LIGHT® (hereinafter sometimes referred to generically as "Eudora"). In general, the EUDORA PRO e-mail software provides the user with a "full feature set," and the EUDORA LIGHT e-mail software provides the user with a "reduced feature set" that is a subset of the "full feature set" provided by the EUDORA PRO e-mail software. The EUDORA PRO e-mail software (the previous version of which is referred to as "EP4" in this document) must be paid for by the user (or by someone else on behalf of the user), and can thus be regarded as "Payware", whereas the EUDORA LIGHT e-mail software is provided free of charge to registered users, and thus, can be regarded as "Freeware." Each of the client devices that has any version of Eudora installed thereon can be regarded as a "Eudora client." Presently, there is a very large installed base of Eudora clients.

The present assignee, QUALCOMM INCORPORATED, has recently released a new version of its popular EUDORA e-mail software that is popularly known as EUDORA Adware (hereinafter sometimes referred to simply as "Adware"). This new Adware version of Eudora is contained within, i.e., is an integral part of, a new Eudora software product that contains the previously-referenced Payware and Freeware versions of Eudora. In general, each version of Eudora contained within this Eudora product release constitutes a separate operating mode of a single software product. Advantageously, the Adware Version of Eudora Pro® can be activated or switched between modes either automatically, in accordance with prescribed criteria or conditions, or manually, in accordance with prescribed user actions, e.g., registration, payment, selection, etc. This new Adware version of Eudora and the multi-moded Eudora e-mail software product that contains the same were motivated by a desire on the part of the present assignee to provide users with the "full feature set" afforded by the Payware version of Eudora free of charge to the users, by means of distributing advertisements paid for by advertisers to Eudora clients, thereby effectively shifting the source of payment/revenue from the users to the advertisers. Thus, this new Eudora software product can be regarded as "advertiser-supported" or "advertiser-subsidized" or simply "sponsored" software.

Most Internet service providers (ISPs) and e-mail service providers charge users a flat monthly subscription fee, although some providers still charge users based on usage, e.g., additional charges for on-line time beyond a prescribed level. However, there exists a population of users who desire to have basic e-mail service, but who do not require or want to pay for Internet access. A few companies have addressed the needs of this market segment by providing free e-mail service to users/subscribers who agree to receive advertisements along with their received e-mail messages. In this way, the advertisers support or sponsor the free e-mail service.

Based upon the relevant literature, it appears that the first company to propose and offer such a free e-mail service was FreeMark Communications (a.k.a. "ProductView Interactive"). The FreeMark system and method for providing free e-mail service is disclosed in PCT published patent application International Publication Number WO 96/24213, having a priority date of Feb. 1, 1995, based on U.S. application Ser. No. 08/382,118, naming as inventors Marv Goldschmitt and Robert A. Young. The disclosure of this published PCT patent application is expressly incorporated herein by reference. In short, this free e-mail system was subsidized by advertisers that appended advertisements as attachments, e.g., graphical interchange format (GIF) image file attachments, to e-mail messages transmitted to subscribers. The advertisements were stored on the subscriber's computer for viewing while the subscriber was off-line reading the received e-mail messages. In some of their promotional literature, FreeMark referred to the appended advertisements as "postage stamps". In FreeMark's literature, each message received by the subscriber was depicted as an envelope bearing a postage stamp; the postage stamp was the advertisement.

Subsequently, a company by the name of Juno Online Services, L.P. (hereinafter simply "JUNO") introduced a free e-mail service. The JUNO system and method for providing free e-mail service is disclosed in U.S. Pat. No. 5,809,242, which issued to Marsh et al. on Dec. 8, 1998, the disclosure of which is also expressly incorporated herein by reference. With the proprietary JUNO e-mail system, a plurality of advertisements are downloaded to subscribers when they connect to the proprietary JUNO e-mail server system to send and/or receive e-mail messages, with the advertisements being stored locally on the subscriber's computer for display when the subscriber is off-line composing or reading e-mail messages, i.e., when the subscriber activates Juno e-mail software previously installed on the subscriber's computer. The locally stored advertisements are displayed under the control of a display scheduler resident on the subscriber's computer, to thereby enable the advertisements to be rotated or changed in a dynamic manner. This results in a continuously-changing display of advertisements being presented to the subscriber. Various other aspects and features of the proprietary JUNO e-mail system are disclosed in U.S. Pat. No. 5,838,790, which issued to McAuliffe et al on Nov. 17, 1998, and in U.S. Pat. No. 5,848,397, which issued to Marsh et al on Dec. 8, 1998; the disclosures of both of these patents are also expressly incorporated herein by reference.

With both the FreeMark and JUNO proprietary free e-mail systems, both the advertisements and the e-mail messages are stored on a single e-mail system (e.g., JUNO stores both on a single, unique server which is assigned (bound) to the user when he/she first signs up for service), and are distributed to subscribers under the direction of a common control entity that is controlling all part of the e-mail system. While this may be a desirable system architecture for providing free e-mail service, it is not a suitable system architecture for a system whose purpose is to distribute advertiser-supported e-mail software that is e-mail system-independent, i.e., which is not tied to a particular proprietary e-mail service provider but, rather, supports public standards, e.g., POP3, SMTP, IMAP4, etc. Moreover, the free e-mail system architecture is not suitable for the many people who maintain multiple e-mail accounts, e.g., business and personal e-mail accounts. As mentioned previously, the present inventors were motivated by a desire to provide a system and method for distributing advertisements to Eudora clients in order to generate advertising revenues that would allow a fully-featured version of the Eudora e-mail software to be widely distributed free of charge to end-users. Moreover, the present inventors were motivated by a desire to provide e-mail software that is both universal and e-mail system-independent, i.e., it is not tied to any particular proprietary e-mail service or service provider.

Accordingly, the present inventors have developed a novel multi-moded Eudora e-mail software product that contains the Payware, Freeware and Adware, and have also devised a novel system and method for distributing advertisements to clients equipped with this new software product. As will become fully apparent hereinafter, the purpose and architecture of this novel system are radically different than that of the proprietary FreeMark and JUNO e-mail systems. In this regard, the multi-moded Eudora e-mail software product, and the novel system and method for distributing advertisements to clients equipped with this new software product, embraces a number of different inventions that will become fully apparent from the following disclosure and the documents referenced therein.

SUMMARY OF THE INVENTION

Based on the above and foregoing, it can be appreciated that there presently exists a need in the art for a subsidized e-mail client which overcomes the above-described deficiencies. The present invention was motivated by a desire to overcome the drawbacks and shortcomings of the presently available technology, and thereby fulfill this need in the art.

In one of its aspects, the present invention encompasses e-mail software which incorporates an automatic advertisement download function for automatically downloading advertisements to be displayed when the e-mail software is activated, for the purpose of subsidizing the full e-mail software product (e.g., to provide a "Freeware" version of the e-mail software product to end-users), wherein the e-mail software is e-mail system-independent. Preferably, the e-mail software is a stand-alone product which is universal, i.e., works in conjunction with virtually any e-mail service provider or e-mail system, including those service which comply with open standards. The present invention also encompasses a system and method for automatically distributing advertisements to a multiplicity of client devices which have this e-mail software installed thereon.

According to one aspect, the present invention provides an e-mail client for receiving and sending e-mail messages to at least one of a plurality of e-mail servers operated by respective e-mail operators, wherein the e-mail client receives at least one ad from an ad server operated by a control entity different than the control entity operating the one or more e-mail systems.

According to another aspect, the present invention provides a recording medium storing e-mail client software for instantiating an e-mail client which receives e-mail messages from and sends e-mail messages to at least one of a plurality of e-mail servers operated by their respective e-mail operators, wherein the e-mail client automatically receives ads from an ad server which operates independent of the e-mail servers.

According to still another aspect, the present invention encompasses a method of operating an e-mail client, provided by an ad server operator, compatible with a plurality of independently operated e-mail servers, including ones based on open e-mail standards. Preferably, the method includes steps for periodically at least one of sending and receiving e-mail from selected ones of the e-mail servers, periodically receiving ads from the ad server operator, and displaying the received ads responsive to instructions provided by the ad server operator.

According to a still further aspect, the present invention provides an e-mail system including an incoming e-mail server storing incoming e-mail messages addressed to a plurality of users, an outgoing e-mail server for forwarding or routing outgoing e-mail messages generated by the users, and an ad server operating independently of the e-mail server, and a plurality of e-mail clients operated by respective users. Preferably, each of the e-mail clients checks for respective e-mail messages stored on the incoming e-mail server, transmits any outgoing e-mail messages stored on the e-mail client to the outgoing e-mail server, and downloads available ads from the ad server while the e-mail client is online.

In one aspect, the present invention provides software for use on a client device that is configured for communications via a communications network instantiating a communications function that effects an advertisement download communication link between the client device and an advertisement distribution server system via the communications network, at selected advertisement download times, an advertisement download function that downloads advertisements identified in a playlist(s) generated by at least one playlist server, via the advertisement download communication link, at the selected advertisement download times, an advertisement storage function for storing the downloaded advertisements on a storage medium associated with the client device, and an advertisement display function that effects display of at least selected ones of the stored advertisements.

In another aspect, the present invention provides software for use on a client device that is configured for communications via a communications network instantiating a playlist fetch function that fetches a playlist(s) from a playlist server, wherein the playlist(s) identifies advertisements to be fetched, an ad download function that downloads the advertisements identified in the playlist(s) from an advertisement distribution system, via the communications network, during one or more advertisement download sessions, an advertisement storage function for storing the downloaded advertisements on a storage medium associated with the client device, and an advertisement display function that effects display of at least selected ones of the stored advertisements on a display associated with the client device.

Many other features, aspects, uses, applications, advantages, modifications, variations, and alternative embodiments of the foregoing inventive concepts will become apparent from the technical documentation that follows. This technical documentation constitutes an integral part of this application for all purposes. Moreover, additional inventive concepts that have not been discussed above are disclosed in this technical documentation, and it is intended that this application cover such additional inventive concepts.

Furthermore, certain terms that have been used in the foregoing and following descriptions of the present invention are defined as follows:

| TERM | DESCRIPTION |
|---|---|
| Advertisement(s) | This term is intended to broadly encompass any secondary content that is delivered or distributed to client devices in addition to the primary content, e.g., e-mail messages, which the software product instantiated by the client device is designed to receive, transmit, process, display, and/or utilize. For example, this term is intended to cover, without limitation, paid advertisements, community service messages, public service announcements, system information messages or announcements, cross-promo spots, artwork, and any other graphical, multimedia, audio, video, text, or other secondary digital content. Nevertheless, it will be recognized that the primary purpose of the presently contemplated commercial embodiment of the present invention is to distribute paid advertisements, and thus, in accordance with the preferred embodiment of the present invention, the advertisements will be exclusively, or at least primarily, paid advertisements. |
| Client Device | This term is intended to broadly encompass any device that has digital data processing and output, e.g., display, capabilities, including, but not limited to, desktop computers, laptop computers, hand-held computers, notebook computers, Personal Digital Assistants (PDAs), palm-top computing devices, intelligent devices, information appliances, video game consoles, information kiosks, wired and wireless Personal Communications Systems (PCS) devices, smart phones, intelligent cellular telephones with built-in web browsers, intelligent remote controllers for cable, satellite, and/or terrestrial broadcast television, and any other device that has the requisite capabilities. |
| Information | This term is intended to broadly encompass any intelligible form of information which can be presented by a client device, i.e., an information client device, including, without limitation, text, documents, files, graphical objects, data objects, multimedia content, audio/sound files, video files, MPEG files, JPEG files, GIF files, PNG files, HTML documents, applications, formatted documents (e.g., word processor and/or spreadsheet documents or files), MP3 files, animations, |

-continued

| TERM | DESCRIPTION |
|---|---|
| | photographs, and any other document, file, digital, or multimedia content that can be transmitted over a communications network such as the Internet. |
| E-mail Messages | This term is intended to broadly encompass the e-mail message and any attachments thereto, including, without limitation, text, documents, files, graphical objects, data objects, multimedia content, audio/sound files, video files, MPEG files, JPEG files, GIF files, PNG files, HTML documents, applications, formatted documents (e.g., word processor and/or spreadsheet documents or files), MP3 files, animations, photographs, and any other document, file, digital, or multimedia content that can be transmitted over a communications network such as the Internet. |
| Software Provider | This term is intended to broadly encompass the developer (or developers), sellers, distributors, etc., of the multi-mode software products(s) installed on the client device. |
| Memory | This term is intended to broadly encompass any device capable of storing and/or incorporating computer readable code for instantiating the client device referred to immediately above. Thus, the term encompasses all types of recording medium, e.g., a CD-ROM, a disk drive (hard or soft), magnetic tape, and recording devices, e.g., memory devices including DRAM, SRAM, EEPROM, FRAM, and Flash memory. It should be noted that the term is intended to include any type of device which could be deemed persistent storage. To the extent that an Application Specific Integrated Circuit (ASIC) can be considered to incorporate instructions for instantiating a client device, an ASIC is also considered to be within the scope of the term "memory." |

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 5A illustrates an exemplary state flow diagram of a process by which the Ad user becomes a registered Ad user while

FIG. 6A illustrates an exemplary state flow diagram of a process by which a Free user can become a registered Free user while

FIG. 7A illustrates an exemplary state flow diagram of a process by which all users are reminded to update the software according to the present invention while

FIG. 12A is a simulated screen capture of a link history window employed in an exemplary software embodiment of the present invention while

FIG. 13A illustrates the assumptions used in determining the impact of ad transmission on e-mail program operations while FIG. 13B is a table listing the bandwidth requirements in terms of subscriber base versus the number of new ads to be downloaded each day;

FIGS. 15A-15H collectively illustrate an algorithm controlling ad scheduling in an exemplary embodiment according to the present invention;

FIGS. 16A and 16B illustrate parameter variations in alternative modes of ad display possible in an exemplary embodiment according to the present invention;

FIG. 18A illustrates an exemplary dialog box associated with auditing the operation of the Adware software according to the present invention.

FIG. 19 is a table summarizing the features of a plurality of web pages that advantageously can be employed in conjunction with an exemplary e-mail system according to one aspect of the present invention;

FIGS. 21A and 21B collectively constitute a pseudo code listing which can be employed by the server 302 in FIG. 1 in generating a PlayList in accordance with the present invention;

DETAILED DESCRIPTION OF THE PREFERRED EMBODIMENTS

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
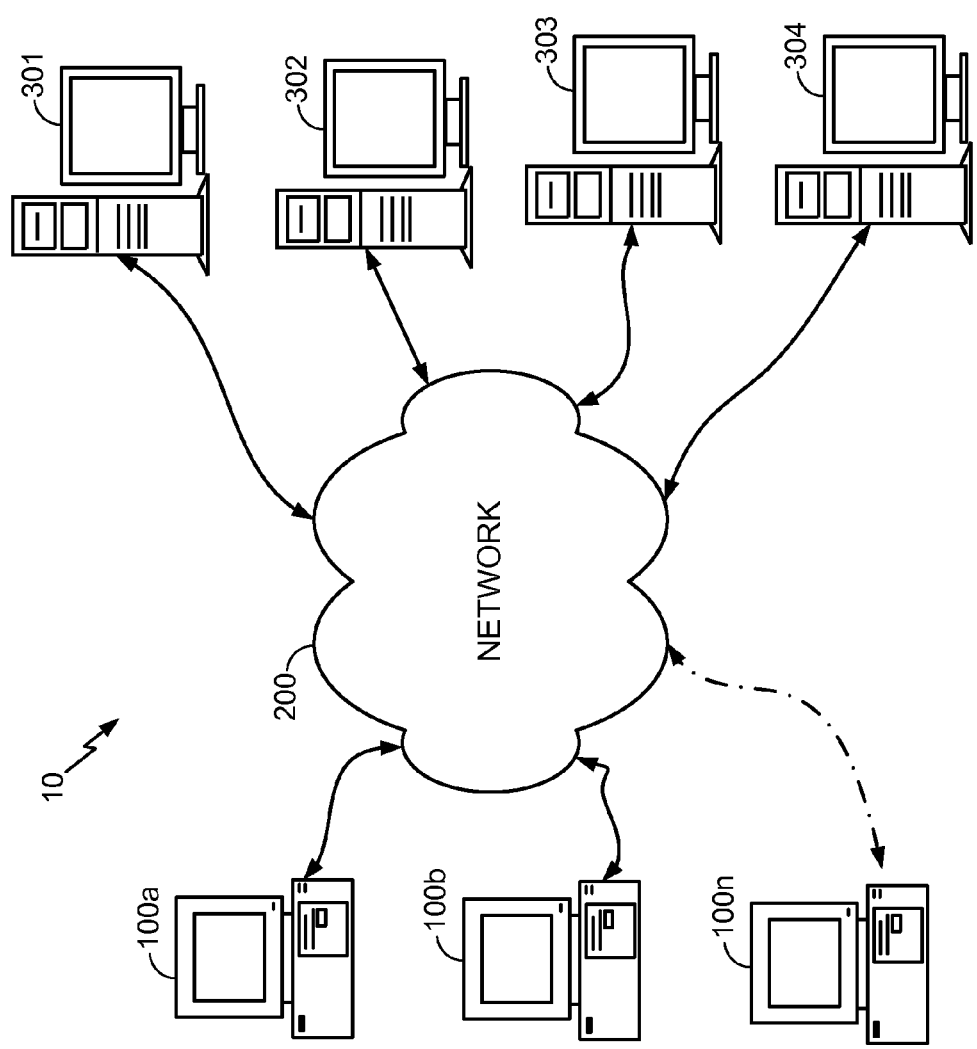
FIG. 1 is a high-level diagram of a computer system including a plurality of client devices connected to a plurality of independently-operated server devices via a network, which computer system is suitable for implementing various functions according to the present invention.

Referring now to specific drawings, FIG. 1 illustrates an exemplary system configuration 10 which is suitable for carrying out the functions according to representative embodiments of the present invention. Although the representative embodiment will be generally described with respect to an electronic mail (e-mail) system where a number of users can create, send, receive and read e-mail messages, the present invention is not so limited. For example, the present invention is equally applicable to a personal digital assistant (PDA) incorporating specialized software for receiving stock quotations via a wireless network. Thus, the principles of the present invention should not be regarded as limited solely to e-mail systems; the principles of the present invention apply to on-line services where a provider, e.g., a software provider, desires to make its software available to users using a variety of payment options for a core set of software functions.

As shown in FIG. 1, the system 10 includes a plurality of client computers 100a, 100b, . . . , 100n, where n denotes any positive integer. Preferably, each of the client computers generally denoted 100 can be either a workstation or a personal computer executing a client program according to the present invention. In an exemplary case, the client computers 100a, 100b, . . . , 110n advantageously can be connected to a plurality of servers 301-304, which servers will be described in greater detail below, via a network 200, e.g., the Internet. Alternatively, the network 200 can be one of a local area network (LAN), a wide area network (WAN), an Intranet, or a wireless network, or some combination thereof. It will be appreciated that FIG. 1 illustrates a non-limiting exemplary system; and number of clients can be connected to any number of servers.

Figure 2:
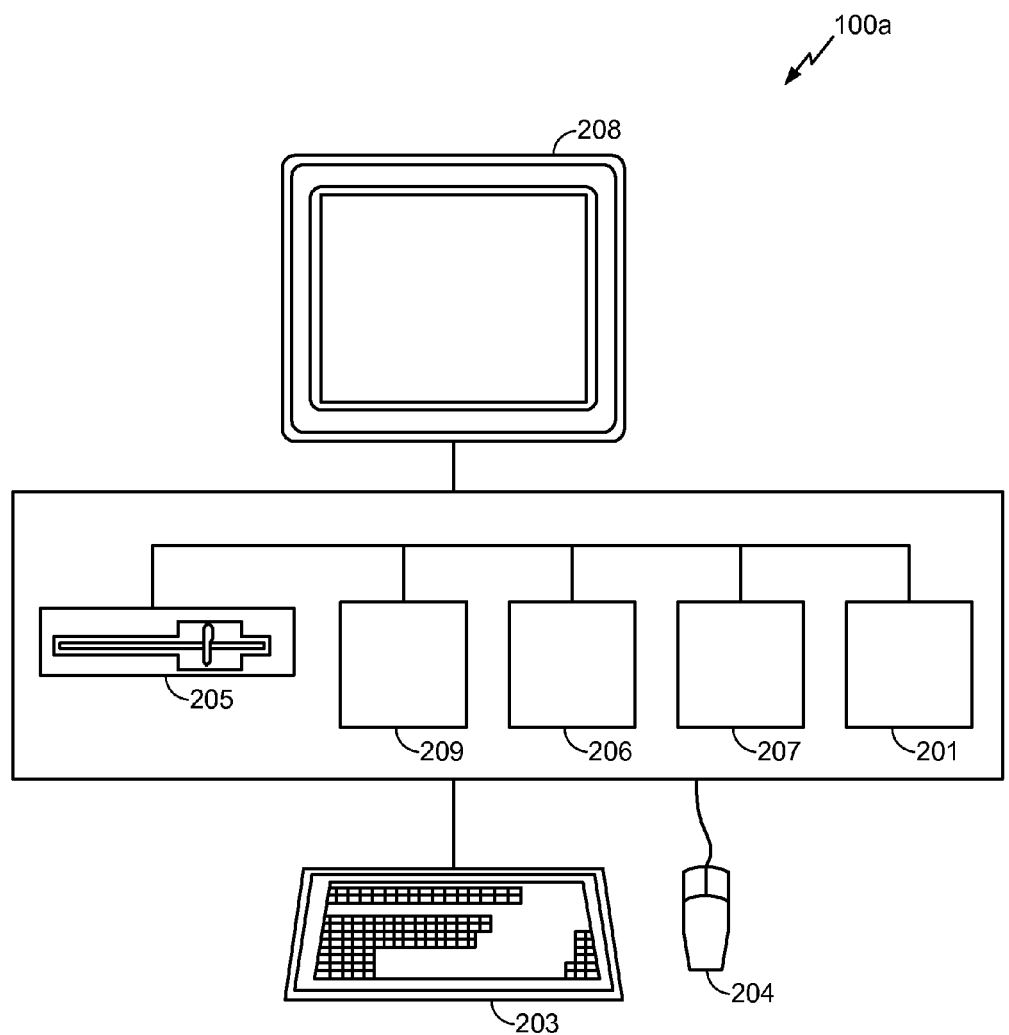
FIG. 2 is a high-level diagram of a representative one of the client devices illustrated in FIG. 1.

FIG. 2 illustrates in further detail the hardware configuration of an exemplary one of the client computers 100a, 100b, . . . , 100n illustrated in FIG. 1. In the representative embodiment, the client computer 100a includes a central processing unit 209 for executing computer programs (including the client program according to one exemplary embodiment of the present invention) and managing and controlling the operation of the client computer 100a. A storage device 205, such as a floppy disk drive, is coupled to the central processing unit 209 for, e.g., reading and writing data and computer programs to and from removable storage media such as floppy disks. Storage device 206, coupled to the central processing unit 209, also provides a mechanism for storing computer programs and data. Storage device 206 is preferably a hard disk having a high storage capacity. A dynamic memory device 207 such as a RAM, is also coupled to the central processing unit 209. It will be noted that storage devices 205 and 206, as well as dynamic memory device 207, are non-limiting examples of a memory, which term was defined previously. The client computer 100a includes typical input/output devices, such as, for example, a keyboard 203, a mouse 204, a monitor 208, and a communications device 201. It will be appreciated that the communications device advantageously can be a modem, an ethernet interface card, etc.

Referring again to FIG. 1, each of the client computers 100a, 100b, . . . , 100n can selectively communicate with any of the servers, e.g., servers 301-304, via the network 200. In the computer system 10 depicted in FIG. 1, each of the servers performs a specialized function. In an exemplary case, server 301 performs a registration function, i.e., accepts registration information from each client computer (as discussed in greater detail below), server 302 provides PlayLists to the client computers 100a, 100b, . . . , 100n, server 303 provides the advertisements designated in the PlayLists, and server 304 acts as a conventional e-mail system server system, i.e., provides both the incoming e-mail server and the outgoing e-mail server. It should be mentioned that only servers 301 and 302 need actually be under the direct control of the software provider, e.g., QUALCOMM INCORPORATED in the preferred embodiment, although server 303 advantageously may be under the control of the software provider as well. It should also be mentioned that the reference to software should not be construed as limited to disk based software; the term "software" should be broadly interpreted as instructions carried out by a processor, whether these instructions are read from a dynamic memory or stored as firmware in an read only memory (ROM) or other variants of such a device.

According to one aspect of the present invention, the "software" advantageously can be provided as a single binary (per client device) file containing the software, e.g., the Eudora software, which can be employed by all users. This binary file will operate in one of three major modes of operation: Payware; Freeware; and Adware. In the Payware mode of operation, the user must pay the software provider to use the software. Freeware is free for all to use, but has fewer features than either Payware or Adware. Preferably, Payware users will prove their payment by a registration code that the software provider will provide to them at time of payment. This code will be self-validating, and contain enough data to identify what version(s) the user is entitled to operate. It should be noted that users of the Payware version of Eudora will be entitled to all versions of Eudora that are produced during the calendar year following their payment. The software preferably polls a predetermined site, e.g., a site maintained by QUALCOMM INCORPORATED, on a periodic basis in order to determine if an update for the software is available; if an update is available, the software advantageously can present the user with a small web page of options for obtaining the software update, as discussed in greater detail below.

It will be noted that Adware has all the features of Payware, but does not require payment from the user. What Adware does require is that the user display and view ads, which the user will download from the software provider's site and/or one or more sites designated by the software provider. It will also be noted that the initial state of the software is Adware.

Figure 3A:
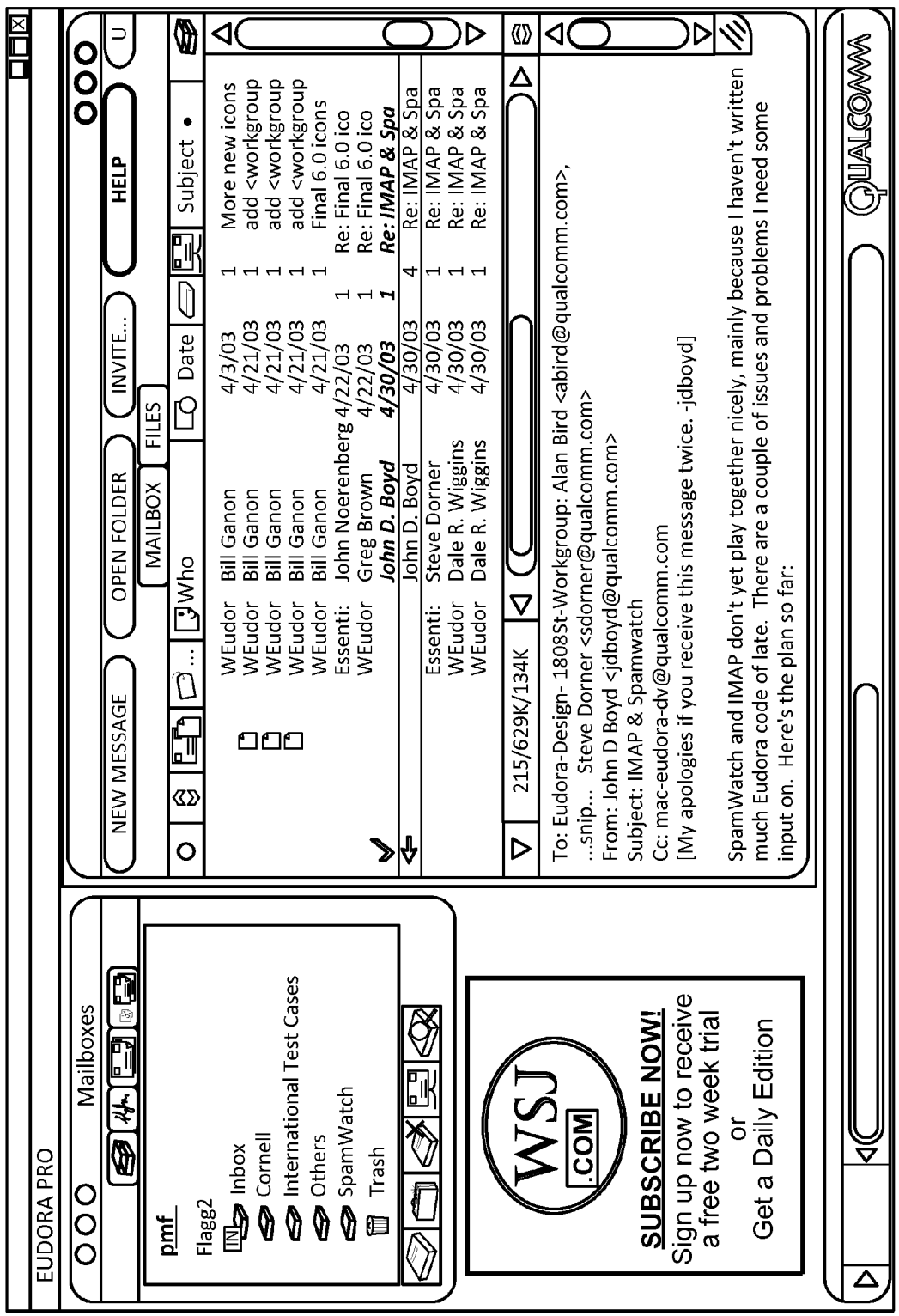
FIGS. 3A and 3B illustrate alternative and non-limiting placement of ads in the main navigation screen of an exemplary e-mail software application according to the present invention.
Figure 3B:
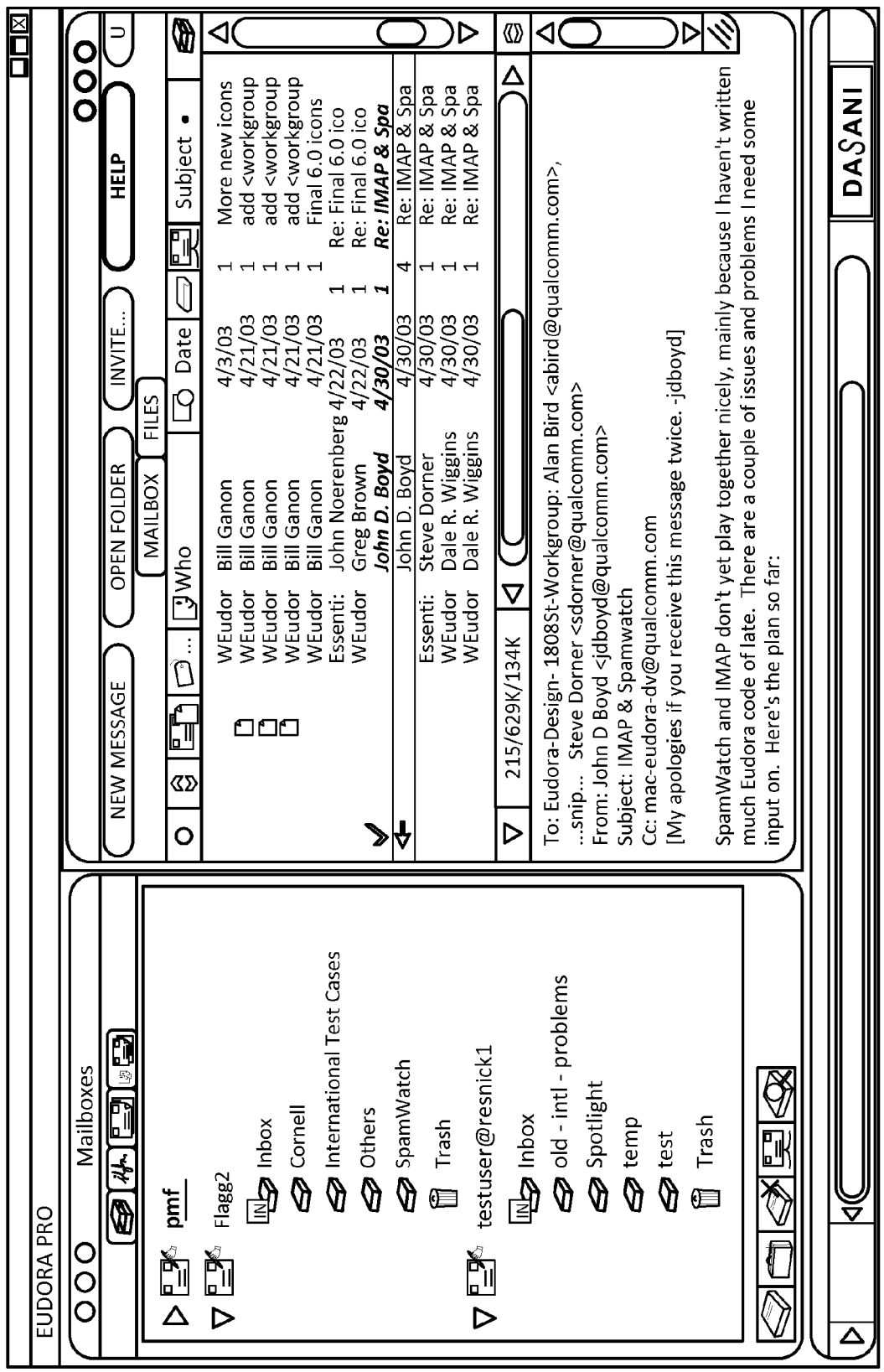

In an exemplary preferred embodiment, each client computer downloads ads from the ad server 303 unobtrusively and without drawing significant bandwidth, as discussed in greater detail below. Moreover, the ads advantageously can be displayed in a manner that doesn't significantly detract from the use of the software, e.g., Eudora. FIGS. 3A and 3B illustrate advertisements integrated into the main screen of the exemplary Eudora e-mail software.

Some of the terminology employed in describing the functions and novel features of exemplary embodiments of the present invention was presented above. Additional terminology which facilitates a full understanding of the present invention in terms of the Eudora software is presented immediately below.

| | | |
|---|---|---|
| Applications | | QUALCOMM INCORPORATED has several versions of the Eudora software, including: |
| | EP4 | Eudora Pro 4.x, either Windows or Macintosh. |
| | Eudora | The new three-modal version of Eudora, running in any of its modes. |
| | Payware | Eudora running in full-feature mode, after the user has paid. |
| | Freeware | Eudora running in reduced-feature mode. |
| | Adware | Eudora running in full-feature mode with ads. |
| | Paid App | Any version of Payware to which the user's registration entitles him/her. |
| | Unpaid App | Any version of Payware newer than that to which the user is registered and entitled to. |
| Old Eudora | | Eudora versions prior to Eudora Pro 4.x. |
| User States | | A user state is the most basic concept to understanding how the various modes of the application are interrelated. The user state determines how the program treats the user. The states are defined as follows: |
| | EP4 User | A user of EP4 who has not registered via the old (non-Adware) registration process. |
| | Registered EP4 User | A registered user of EP4. |
| | New User | A user using Eudora for the first time, but who has not obtained a boxed copy, e.g., bundled with a newly purchased computer system, etc. |
| | Payware User | A user who has paid for Eudora, entered his/her registration code, and is using a version of Eudora to which he/she is entitled. |
| | Box User | This is a user who has been given their RegCode by an installer, either from the box product or from an EP4 updater, and whose registration information is therefore unknown. |
| | Free User | A user who has chosen to use Freeware but who has not entered a Freeware registration code. |
| | Adware User | A user who is using the Adware version that displays ads. |
| | Registered Freeware User | A Freeware ("Free") user who has entered a Freeware registration code. |
| | Registered Adware User | An Adware user who has entered an Ad registration code. |
| | Deadbeat User | A former Adware user who has been shut off due to Eudora's failure to receive ads (or less than a prescribed minimum number of ads). |
| Windows and Dialogs | | Several windows and dialogs are used in the process. A fuller description of these will be given later, but the major ones are briefly described immediately below: |
| | Intro Dialog | A dialog presented to new users explaining the software options to new users. |
| | Registration Nag | A window presented to the user every so often to suggest that the user register his/her software. |
| | Full-Feature Nag | A window presented to Freeware users requesting them to try Eudora Pro again. |
| | Free Downgrade | A dialog that tells the user the features that will no longer be available to him/her if they switch to Freeware, but allows them to do so if they really wish. |
| | Code Entry Dialog | A dialog allowing the user to enter their registration code. |
| | Ad Window | A window or portion of a screen displaying an ad. See FIGS. 3A and 3B. |
| | Link History Window | A window that will display links the user has clicked on, i.e., ads the user has seen. |
| Web Pages | | The software provider advantageously can elect to restrict interactions between the user and the software provider to the Internet to the maximum extent possible. This will allow the software provider the most flexibility in how the software provider deals with actual users. One potential list of the major pages is provided immediately below, although these "pages" advantageously may be groups of pages, or pages customized to match the demographics of a given user, e.g., a customized and/or branded version of Eudora provided by a major retailer, e.g., a private label version of Eudora provided to its users by an ISP. |
| | Freeware Reg Page | A page that allows the user to register Freeware. |
| | Payware | A page that accepts payment for Eudora Pro and returns a |

| | | |
|---|---|---|
| | Reg Page | registration code to the user. |
| | Adware Reg Page | A page that allows users of Adware to submit their registration information to the software provider. |
| | Lost Code Page | A page that helps users who have lost their registration codes. (May require human intervention) |
| | Update Page | A page generated for a user that lists possible upgrades and the latest version for which he/she is registered. |
| | Archived Versions Page | A page from which users can download all versions of Eudora. |
| | Profile Page | A web page where users can enter their profile information. |
| Nag Schedules | | A "Nag Schedule" is a bracketed set of numbers. The numbers signify # of days since the start of a trial period. Users will be nagged on the days indicated. The last number signifies what happens when the other numbers run out; the user will either not be nagged (0), or be nagged every so many days. For example, a schedule of [0, 5, 2] means the user will be nagged on the first day, the sixth day, and every other day thereafter. |

As mentioned above, the "software" advantageously can be provided as a single binary file containing the software, e.g., the Eudora software, which can be installed (if required) and employed by all users. This binary file will operate in one of three major modes of operation: Payware; Freeware; and Adware. The installation and operation of various functions of the software program according to the present invention will now be described in greater detail while referring to several state flow diagrams, which state diagrams illustrate the major user states and the transitions among them. In the flow state diagrams, the following conventions will be observed:

Raised grey squares are conceptual names for buttons in dialogs.

A few paths are labeled with menu items. These items can be used to bring up the window in question directly, without waiting for nags.

In principle, any dialog or nag can be cancelled, leaving the user back in the initial state.

Web pages cannot change user state or generate more dialogs; hence, all web pages lead back to the user's initial state.

With the conventions noted above, the installation of the Eudora e-mail software will now be described while referring to FIG. 4, which depicts state transitions when a version of the software is installed by one of a new user, an old user, and an EP4 user. It will be noted that the software provider doesn't give the user the options to pay for the full feature set or to accept the software with a reduced feature set in the intro dialog. While the software provider will explain those options, e.g., via a dialog box similar to that illustrated in FIG. 4B, as well as the fact that the user can obtain these alternative versions of the software feature set by going through the Help menu, the software defaults to the Adware version.

Figure 4A:
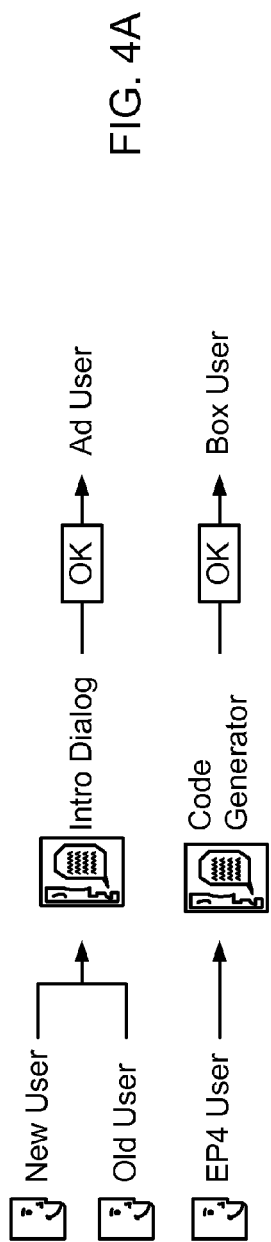
FIG. 4A depicts state transitions when a version of the software is installed by one of a new user, an old user, and an EP4 user.
Figure 4B:
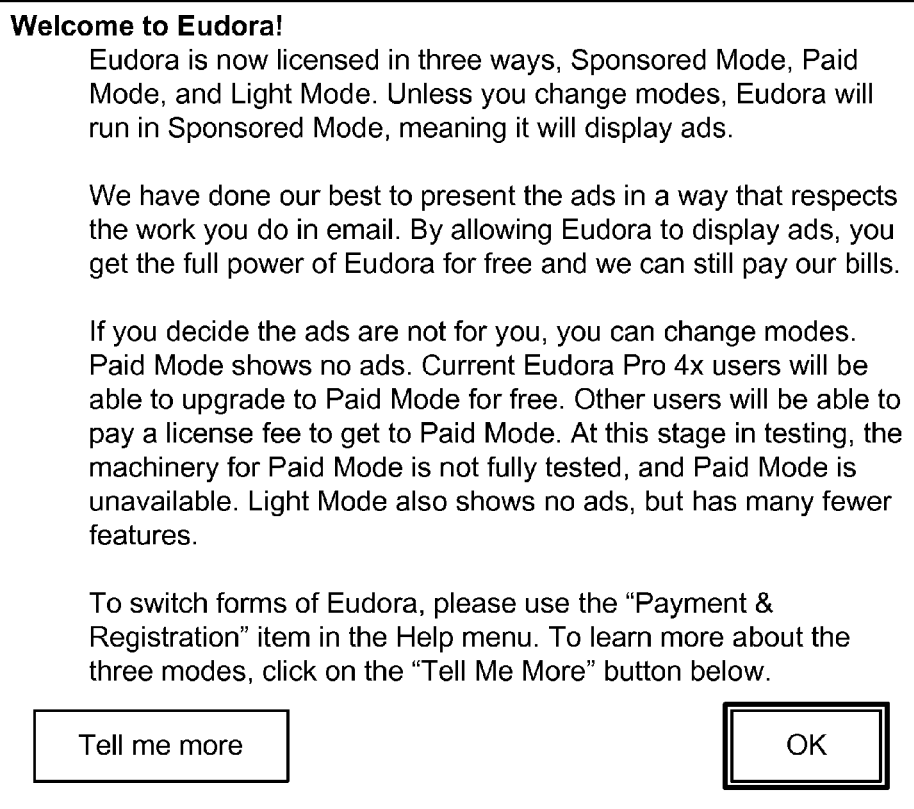
FIG. 4B illustrates a dialog box associated with the state flow diagram illustrated in FIG. 4A.

The path taken by EP4 users and box purchasers illustrated in FIG. 4A merits some elaboration. The Code Generator referred to in FIG. 4A advantageously is instantiated by the installer module of the binary file, not in the Eudora e-mail program itself. If the user is using the software's 4.x->4.3 update function, the software searches for a copy of EP4 and, on finding a copy of the software, the Code Generator permits the user to generate a RegCode file. If the user is running the installer out of the box, the installer permits RegCode generation without looking for a copy of EP4 first. It should be mentioned that the RegCode file so generated is special in that it contains a line saying "Eudora-Needs-Registration: YES." The Eudora e-mail software will notice this line of text, put the user into the unregistered state, and then nag the user to register the software. Once the user registers, the same registration code will be re-transmitted to the user, and the Eudora e-mail software will silently accept it (since it will be the same as the current code), and turn off the need to register flag in the e-mail software.

Figure 5A:
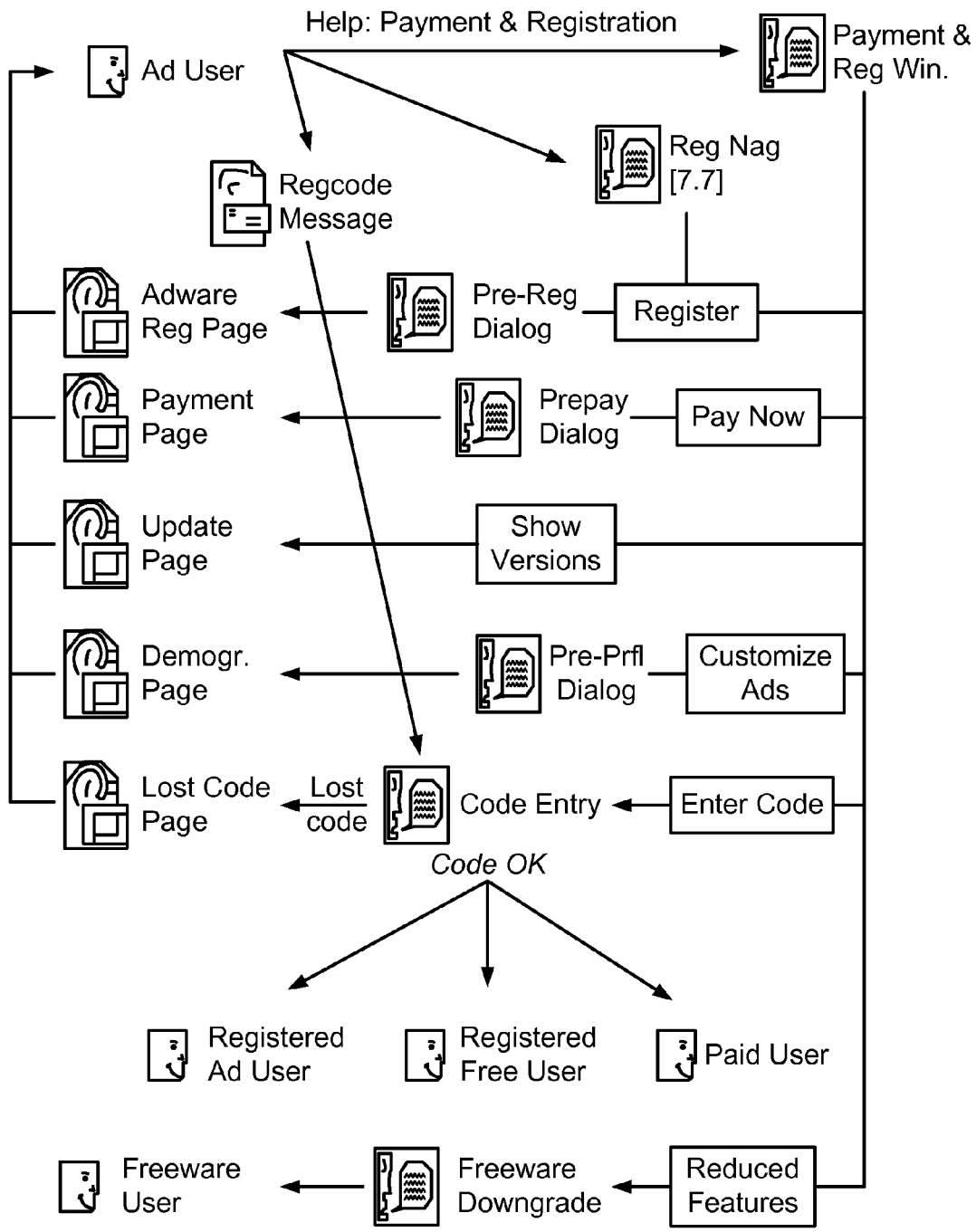
Figure 5B:
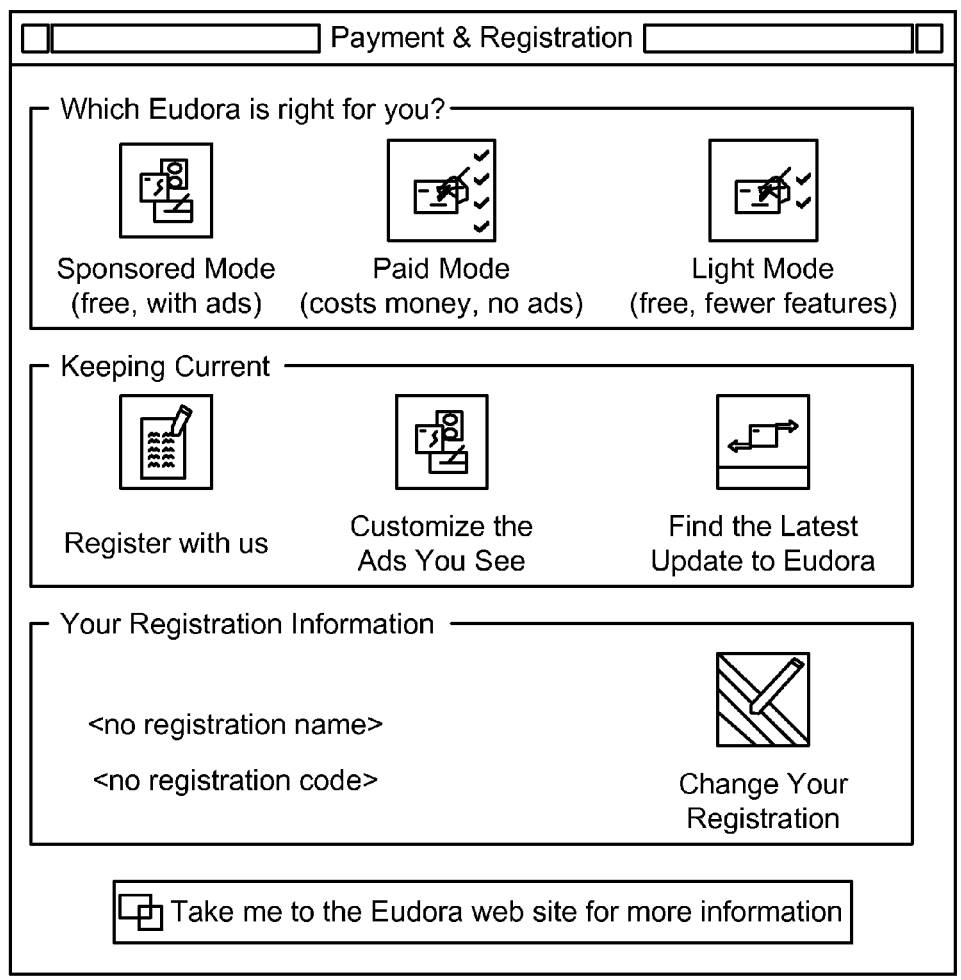
FIGS. 5B through 5G illustrate several dialog boxes associated with FIG. 5A.
Figure 5C:
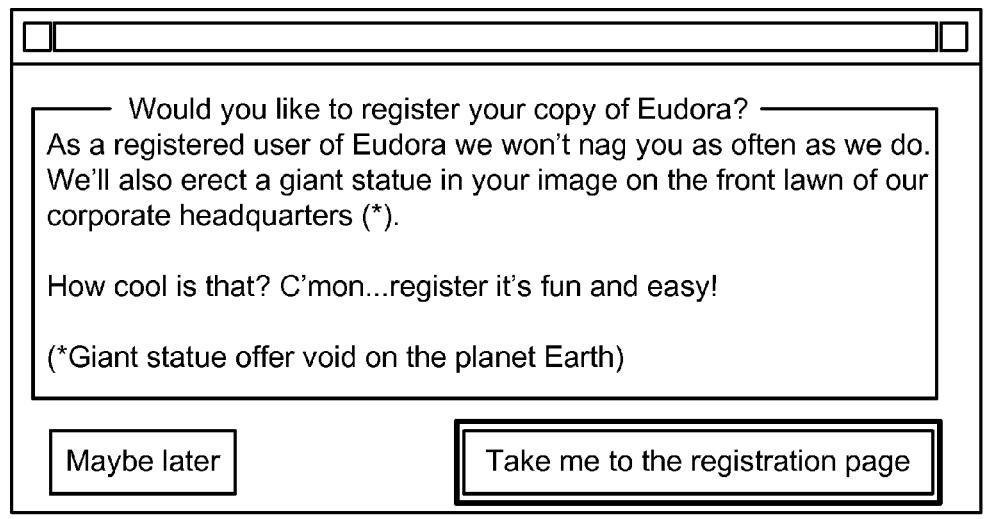
Figure 5D:
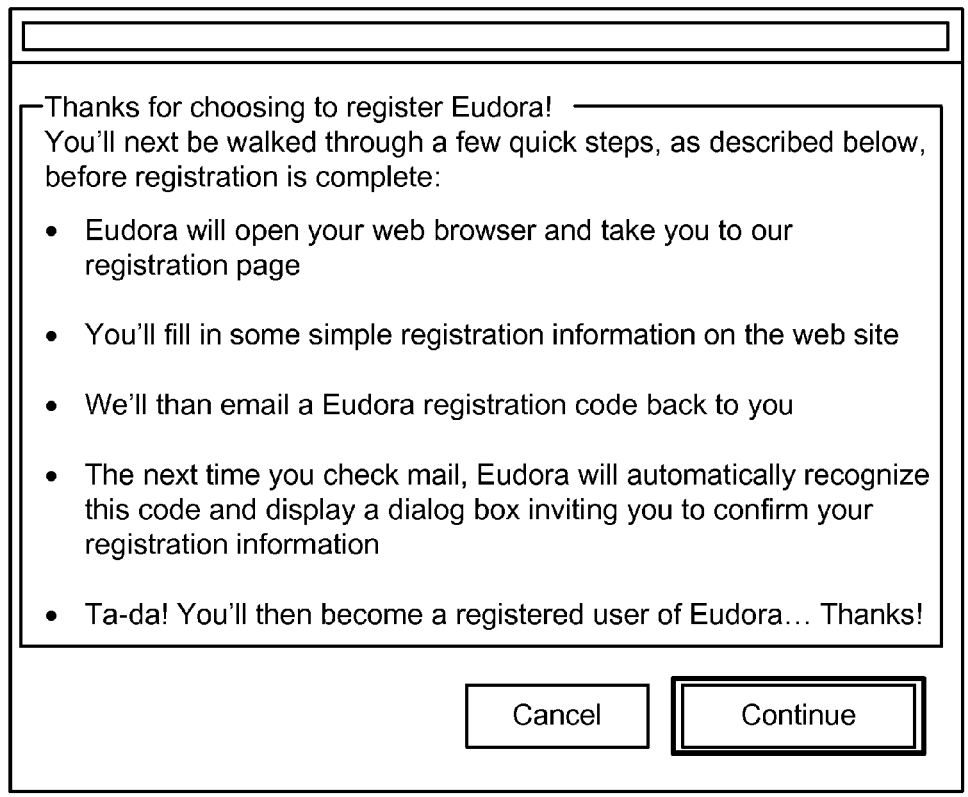
Figure 5E:
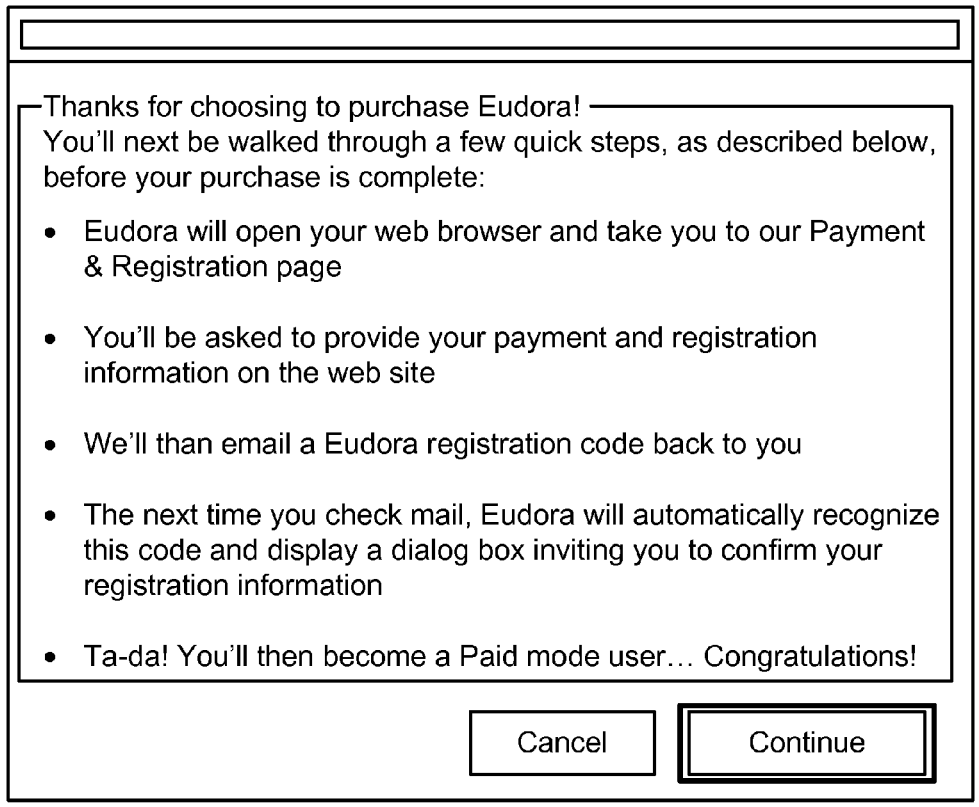

FIG. 5A illustrates a state flow diagram of the process by which the Adware user becomes a registered Adware user. It will be appreciated that, in the illustrated exemplary case, the registration process necessitates interaction between client computer 100*a* and a registration server 301, which are connected to one another via network 200. In FIG. 5A, the Adware user indicated in FIG. 4A registers with the software provider through several alternative mechanisms. For example, the Ad user may wish to register, and simply activates the "HELP" pulldown menu, which is available from the tool bar illustrated at the top of FIG. 3A, and selects the Payment & Registration option, as depicted in FIG. 5B. Alternatively, the Adware user may receive a Nag box, i.e., a Nag dialog box, generated by the software at a predetermined time, as discussed more fully below. Finally, the Ad user may receive a registration via e-mail, i.e., a registration code generated by server 301 and transmitted to the client computer 100*a* by way of e-mail server 304.

As shown in FIG. 5B, the Payment & Registration Window provides several selection buttons, which allow the Ad user to register the Adware, pay for the software, list all versions available to the user, customize or modify the ad stream by providing demographic information, enter a received registration code, and downgrade to the reduced feature set offered to Freeware users. See FIGS. 5C-5G. It should be mentioned that the user can enter a registration code to become one of a registered Adware user, a registered Freeware user, and a registered Payware user. See FIG. 5F. It will be appreciated that the software operates in accordance with the same state flow diagram for Registered Adware Users, except that the Registered Adware User is not subjected to the Registration Nag.

The software provider advantageously can use a registration scheme with a self-validating registration code, so that databases do not need to be used to validate registrations. The algorithm for verification is intended to satisfy several conflicting constraints, i.e., it needs to be secure, yet easy to implement and not unduly burdensome for the user. The Eudora e-mail software checks its registration code at startup for validity. If the registration code is invalid, the user should be considered unregistered. If the user is a paid mode user, this will involve a switch to Sponsored mode, about which the user should be warned using a dialog box (not shown). This alert will be followed by an opportunity to reenter the code. The necessary inputs to generate the registration code are as follows:

| | |
|---|---|
| RegName | The name the user wishes to register under. The software provider will imply but not require that this be the user's real name. The only thing this name will be used for is registration. Supplied by the user. When the software provider actually collects this name from the user, the software provider will ask ed for it in terms of first and last names, call RegFirstName and RegLastName, respectively. RegName is built by concatenating RegFirstName, a single space, and RegLastName. Each of the first and last names is limited to 20 significant characters; beyond that, characters will be ignored. |
| RegMonth | The date of the registration, expressed as the number of months since Jan. 1, 1999, e.g., 8 bits (20 years). All 1's is reserved are for "never expires" situations. |
| Product | A numeric code indicating what product the registration is for. The user will choose the product; the software provider will translate that choice into an 8-bit code. |

It will be appreciated that a plurality of RegCode algorithms advantageously can be employed in generating a self-validating registration code. In brief, the software provider takes the inputs listed above, checksums them, mixes the inputs (including the RegName) and the checksum together in according to any one of a variety of algorithms, and encodes the result as a 16-bit number string. It will also be appreciated that the encoding and bit-mixing can be reversed and then, together with the RegName, the checksum can be used to verify the validity of the registration code.

It should be noted that the software provider will store registration codes separately for Freeware (Eudora Light), Adware (Sponsored) and Payware (Eudora Pro) software modes. Acceptance of a registrations code for one mode of operation does not imply that the registration codes for the other modes should be destroyed.

Once the registration code has been generated, the user must somehow enter the valid RegCode into the Eudora e-mail client. This can be accomplished in one of three ways:
  Manually. Users can type or paste values into the Enter Code dialog box. See FIG. 5F.
  Windows Registry. At Eudora startup, the software will look for the RegCode in the Windows registry (e.g., Software\Qualcomm\Eudora\Check, FName, LName, RCode). The values should be copied into the preferences register or associated lookup table of the e-mail client, if these preferences are found and valid.
  RegCode File. At Eudora startup, the software will look for a file in the application software folder named "RegCode.dat," in an exemplary case. The values should be copied into the preferences register or associated lookup table of the e-mail client, if these preferences are found and valid.

It should also be mentioned that the software provider will allow a special-case MIME part to be mailed to the Eudora e-mail client. The user receiving this part will automatically be asked to verify and enter the information. He/she can also execute the attachment again later. However, he/she cannot forward the attachment to anyone else using the Eudora e-mail client, because a special Content-Type attribute ("regCode") is required to activate the part, and the Eudora e-mail client can't send those.

The format of the MIME part (and the RegCode file) is that of a text file containing RFC822-header-style fields. It has a registered MIME type of application/vnd.eudora.data. The fields included in the part are:

| | |
|---|---|
| Eudora-File-Type | This is always the first field, and describes what sort of information the rest of the file contains. Its value will be either "regFile" or "Profile." |
| Eudora-First-Name | The first (given) name of the registrant, in US-ASCII. |
| Eudora-Last-Name | The last (family) name of the registrant, in US-ASCII. |
| Eudora-Reg-Code | The registration code as produced by the registration system |
| Profile | Profile information. This takes the form of a relatively short, e.g., 127 bytes, ASCII string. A profile is generated for each user during the registration process. |
| Eudora-Needs-Registration: | If this field contains "YES", then the user should be nagged to register their copy of Eudora. This is used by installers that generate RegCodes that the software provider otherwise would not have in its database. |
| Mailed-To | This is the address the information was mailed to. If this field is present and does not match any of the user's personalities or "me" nickname, the information should not be acted on. |

It should be noted that the Eudora-File-Type field must be present. The other fields listed above may or may not be present.

It will be appreciated from the discussion above that RegCodes mailed to the user should be validated prior to use. In order to be used, a RegCode should meet the following tests:
  Validity—An invalid RegCode should be ignored.
  Directness—The mailed-to field of the RegCode should contain an address for one of the user's personalities or be in the user's "me" nickname.
  Applicability—A new RegCode should not automatically override an existing valid RegCode. The only exceptions to this policy are that a Payware mode RegCode should override a Freeware or Adware RegCode, and a Payware mode RegCode that is the same as the user's existing Payware mode RegCode can be used to disable the "Eudora-Needs-Registration" Nag.

Figure 5F:
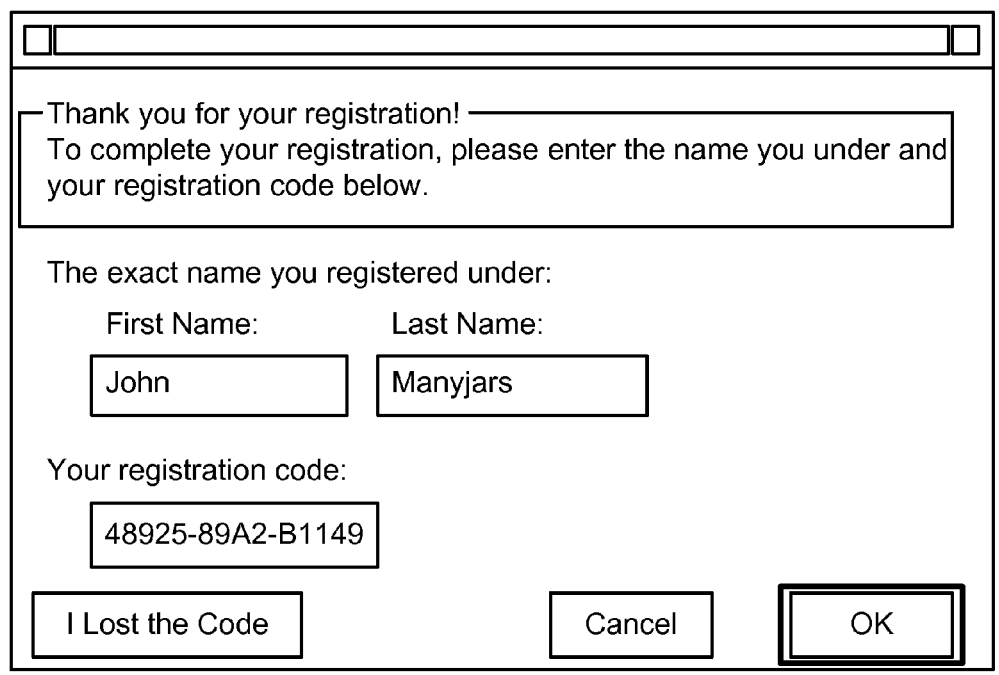
Figure 5G:
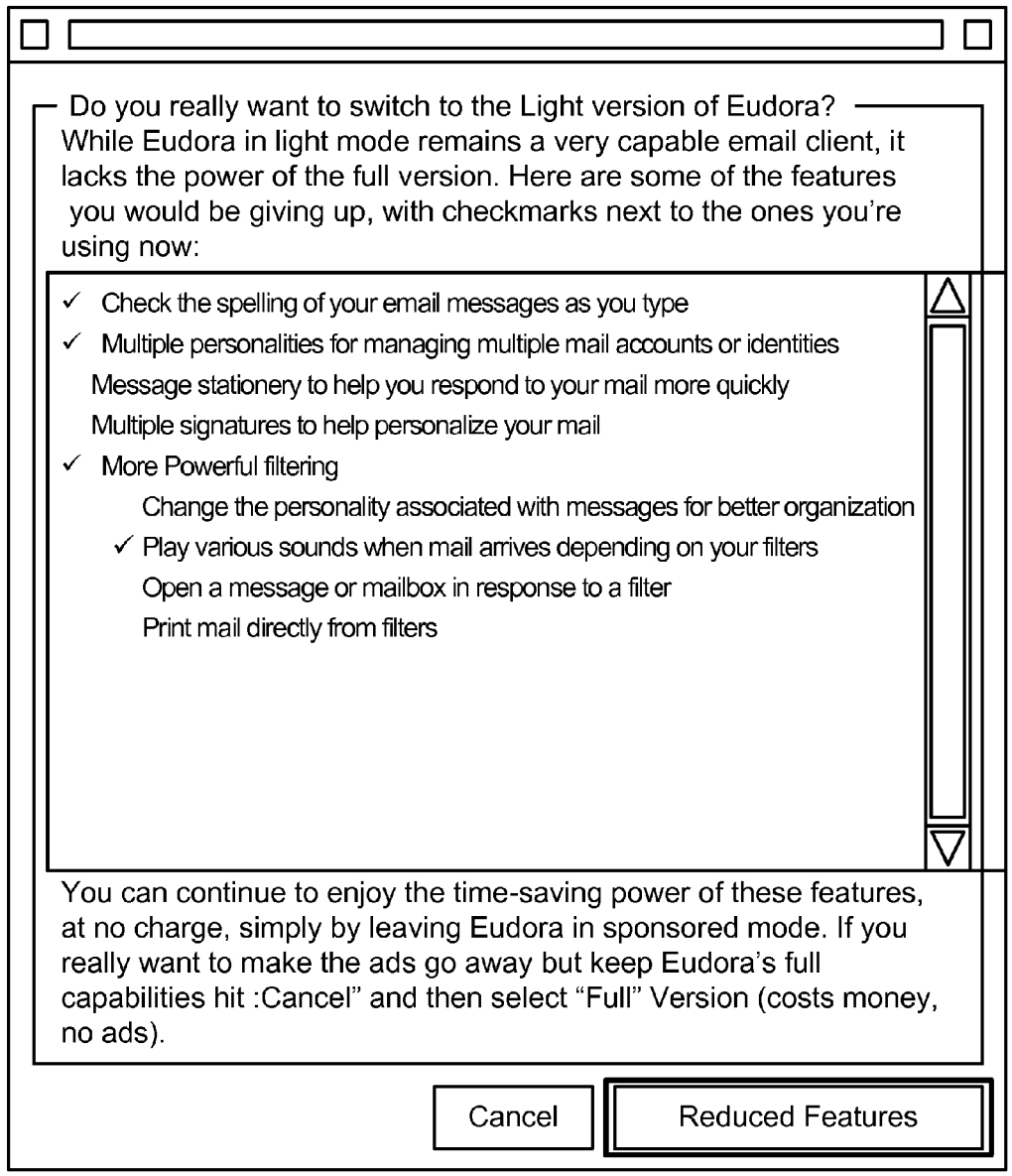

Once the RegCode has been determined to meet the above tests, the user should be asked to accept the code. An exemplary acceptance dialog box is illustrated in FIG. 5F.

As mentioned above, the registration code is self-validating, since one part is a function of the other. However, there is another sense of "validation" to be considered, i.e., whether or not the registration code is "valid" for use with a particular version of Eudora. This is accomplished by comparing the ExpMonth in the registration code with a BuildMonth field the software provider will put into the application (in a place that cannot be overwritten by plug-ins, settings, etc.). If the ExpMonth and the BuildMonth correspond, the registration is deemed valid by the e-mail client.

Figure 6A:
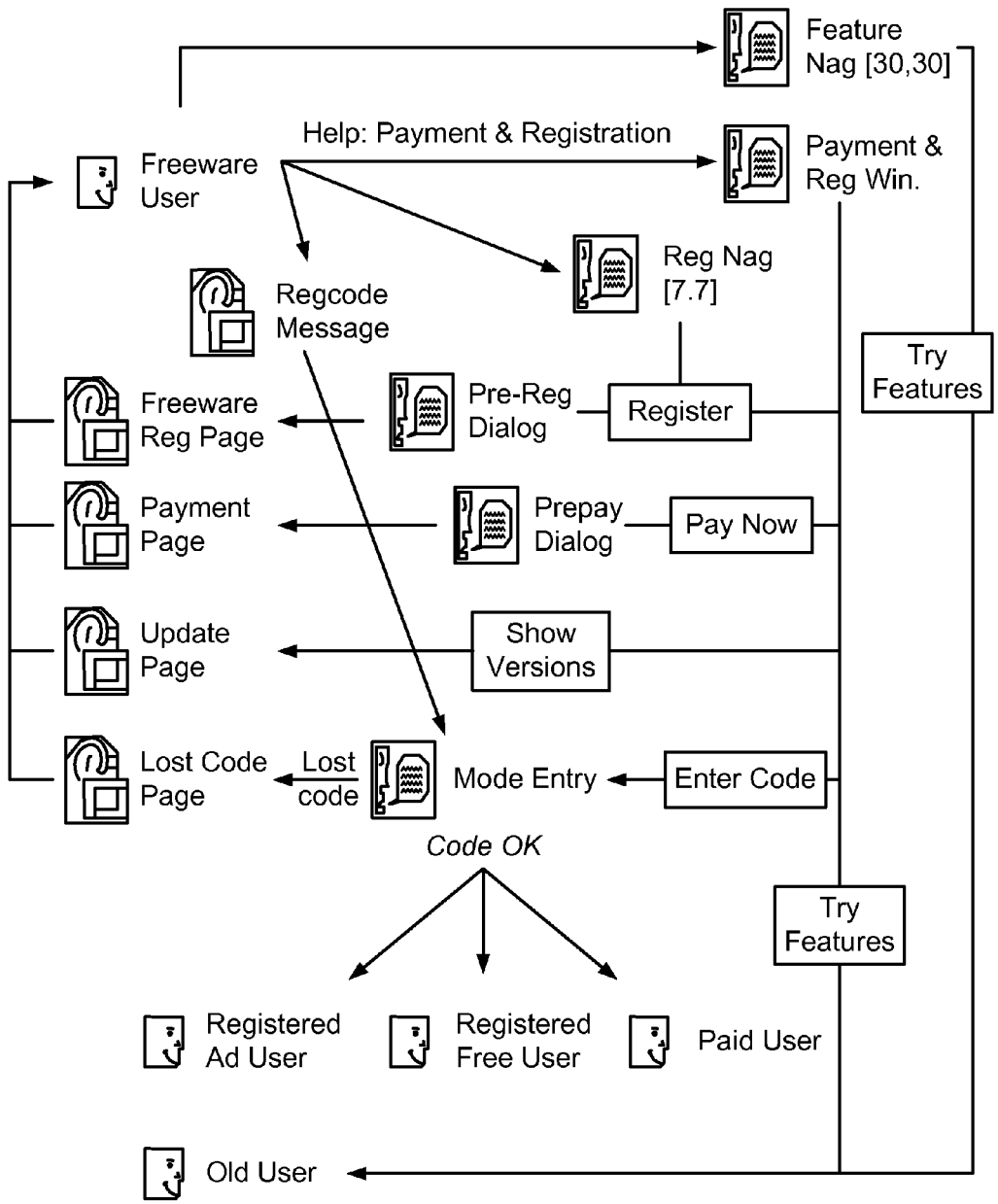
Figure 6B:
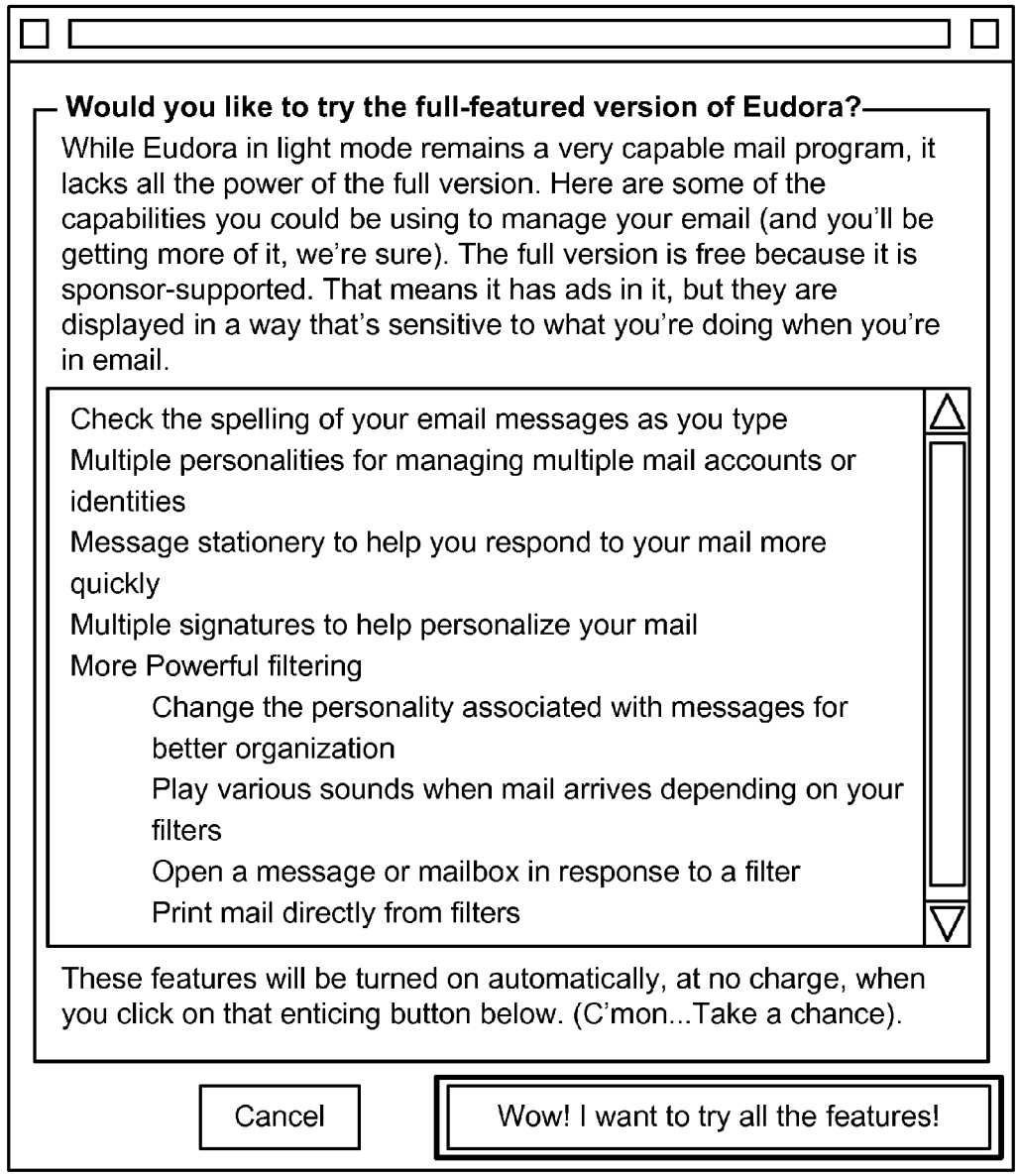
FIG. 6B illustrates an additional dialog box associated with FIG. 6A.

FIG. 6A illustrates a state flow diagram of the process by which a Freeware user can become a Registered Free User. It will be appreciated that the state flow diagrams of FIGS. 5A and 6A are similar in many respects. However, the state flow diagram of FIG. 6A allows for an additional Nag dialog box, i.e., the so-called Feature Nag dialog box pictured in FIG. 6B, to remind both the Free User and the Registered Free User of the enhanced features available to Adware and Payware users. With respect to Freeware Users and Registered Freeware Users, it will be appreciated that the Registered Freeware Users will not receive the Registration Nag dialog box. It will be appreciated that the state flow diagram illustrated in FIG. 6A is very similar to that applicable to the Adware Users (FIG. 5A), with the exception that Freeware Users are given the option to try the full features rather than enter their demographic information.

Figure 7A:
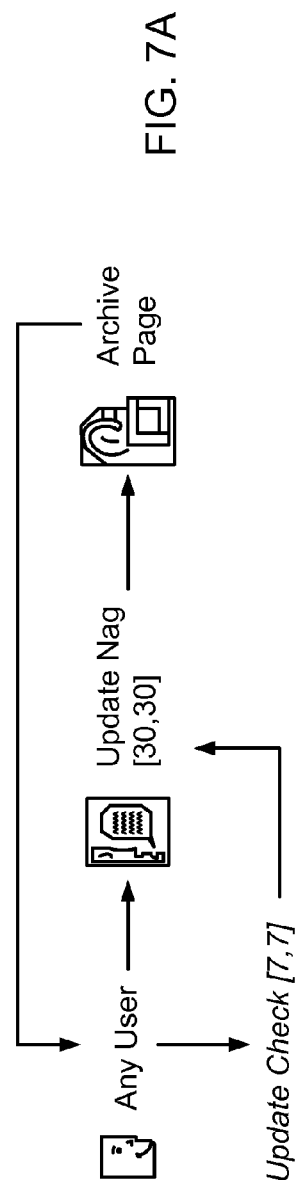
Figure 7B:
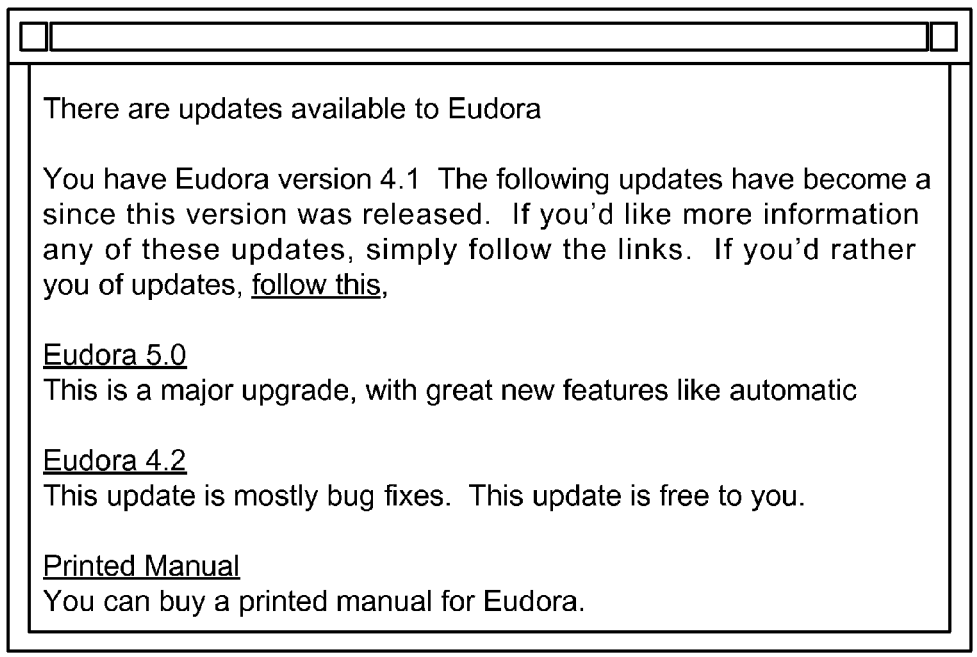
FIG. 7B depicts an exemplary dialog box corresponding to an Update Nag.

It should also be mentioned at this point that all users will receive an Update Nag dialog box (not shown) at a predetermined interval. Eudora checks the Update Page once per week during an e-mail session. If the Update page has changed, the user is nagged to update the Eudora e-mail software. Even if the page hasn't changed, the user is nagged on a 30-day schedule to check for updates, to ensure that he/she has the latest software version. See the state flow diagram of FIG. 7A. The Update Nag presents the user with versions to which he/she is entitled to upgrade (if any). See FIG. 7B. The Nag itself is an HTML document with links to versions of the Eudora e-mail software for the user to download.

Figure 8:
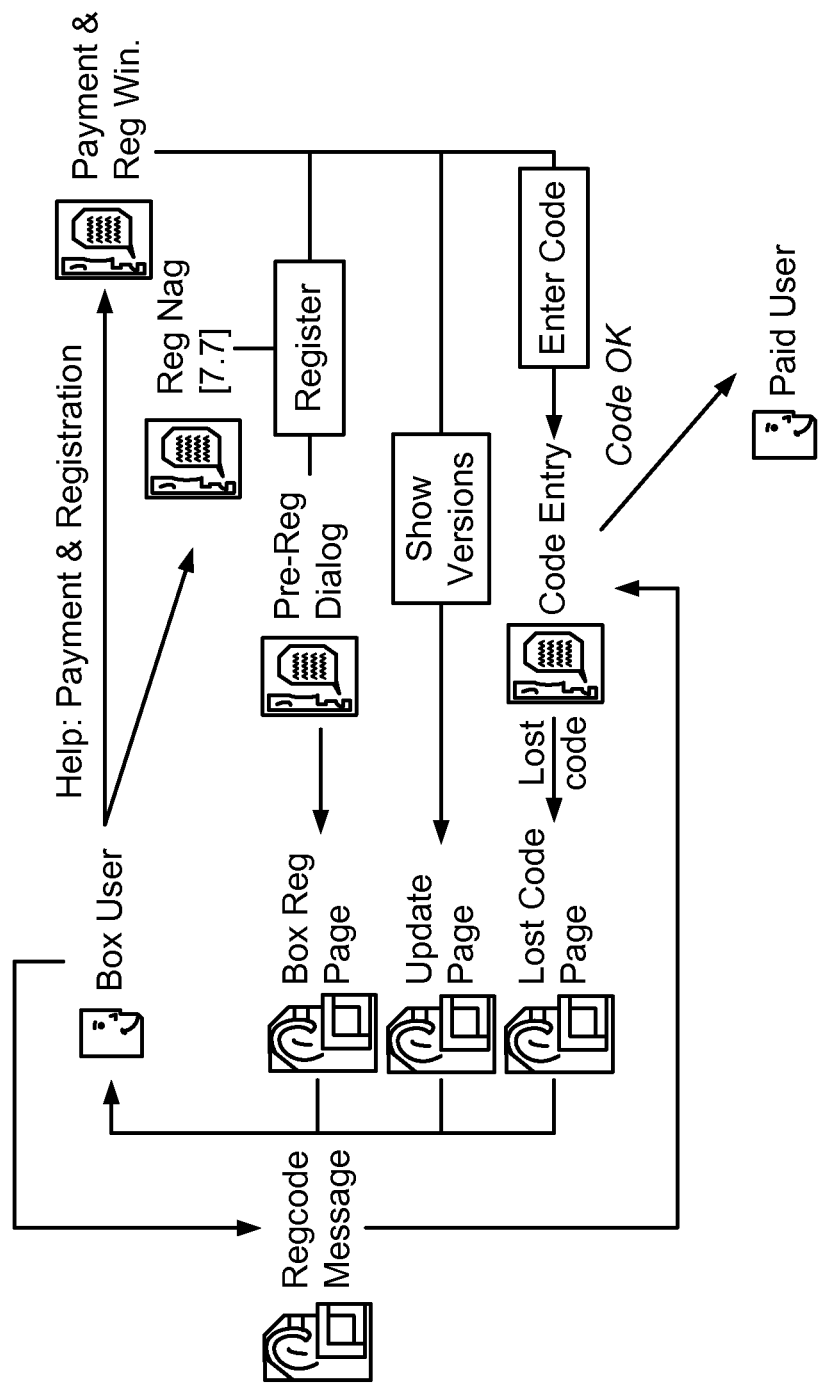
FIG. 8 illustrates an exemplary state flow diagram of a process by which a Box user can become a Paid user.
Figure 9:
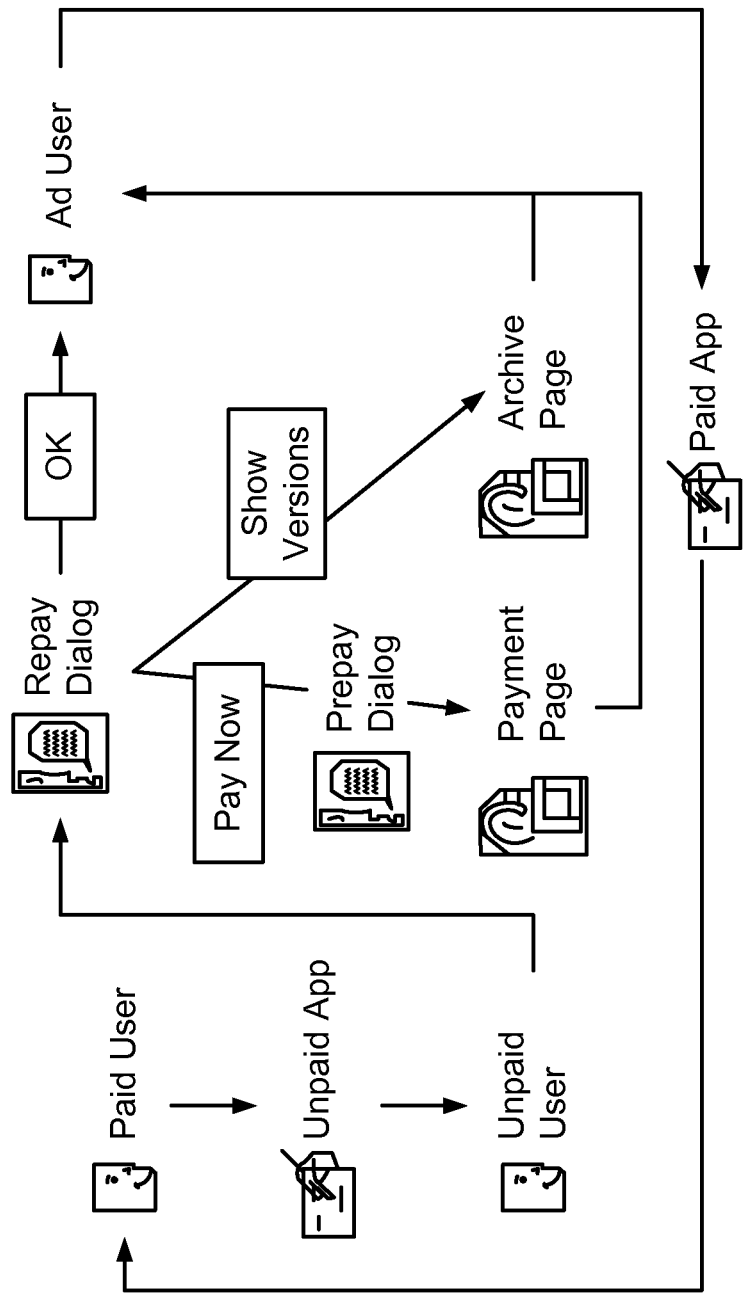
FIG. 9 illustrates an exemplary state flow diagram of a process by which the Paid User becomes an Unpaid user.

FIG. 8 illustrates an exemplary state flow diagram of the process by which a Box user can become a Paid user, i.e., a Payware user. It will be appreciated that the only Nag the software provider presents specifically to the Box users is the Registration Nag. Once a Box user registers, the Box user is converted into a normal Paid user. It should be mentioned however that the payment date for the Box user is set to a specific value by the software provider, so that the software provider can control what versions of the software the Box user will receive, e.g., the period of time for which the user will receive updates from the software provider for free going forward.

Having introduced the concept of nagging, this would be a convenient point to discuss various features of nagging implemented in the software according to the present invention. Two major issue are (1) how the software provider nags the user, and (2) when the software provider nags the user.

Ideally, Nag Windows are modeless windows. The user can close them using close boxes, or dismiss them by taking one of their action items, or simply leave them open and let them drift wherever they will in the window list. Due to implementation constraints, Windows Nag Windows will be slightly different in behavior than MacOS Nag Windows, which are discussed below. The Nag Windows are floating windows; the software provider expects that the user will probably dismiss the Nag Window in fairly short order. It will be appreciated that the Nag Windows will not, however, stop background tasks from executing.

It should be mentioned that there is at most one Nag Window of each variety open at a time; old windows of the same variety advantageously will be recycled. That is, if a given Nag Window is still open the next time the user is due to be nagged, that window will be reused and brought back to the top of the window stack. It should also be mentioned that all Nags applicable to the user should be available to the user by selection from the Help menu, so that the user who dismisses one of the Nag Windows inadvertently can deliberately nag him/her-self if he/she wishes, although such manual Nag invocations do not reset the Nag's timer.

Preferably, Nag Windows will be opened on top of all other windows, and no automatically opened windows, including, for example "Tip of the Day" and other dialog boxes and excluding other Nag Windows, will ever be placed above them until the user has manually brought another, non-Nag Window above them. Due to the implementation constraints in the Windows version of the Eudora e-mail software, the only windows that can obscure Nags would be other floating windows. It will be appreciated that this is chiefly due to the requirement that Multiple Document Interface (MDI) child windows be maximizable. It should be mentioned that is a standard Windows interface used by many popular Windows applications and utilities, such as the Windows Program Manager, and the Windows File Manager; the MDI interface is also part of the Common User Access (CUA) standard set by IBM. Each MDI-compliant application enables you to open child windows for file-specific tasks such as editing text, managing a database, or working with a spreadsheet, to name but a few of the possible tasks.

Figure 10:
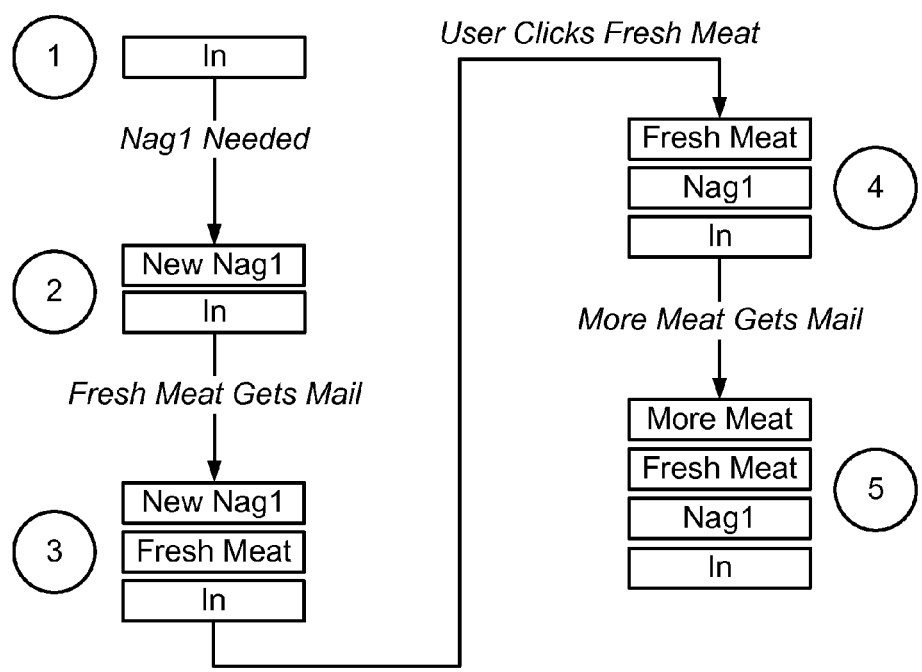
FIG. 10 illustrates an exemplary Nag Window display timeline for MacOS versions of the Eudora e-mail software according to an exemplary embodiment of the present invention.

FIG. 10 illustrates a flow chart for Nag Window display in MacOS versions of the Eudora e-mail software according to an exemplary embodiment of the present invention. In FIG. 10, the software presents just the In mailbox, as denoted by the symbol (1), i.e., time (1). The Eudora e-mail software then determines that it needs to nag the user, and places the Nag atop the mailbox, as denoted by the symbol (2). Some mail arrives in the "Fresh Meat" mailbox. Ordinarily, this would open on top. However, since there is a "new" Nag being displayed by the software, i.e., one the user has not manually sent behind anything, the "Fresh Meat" instead opens below the Nag, as denoted by symbol (3). The user manually brings Fresh Meat to the front, as denoted by symbol (4). After that, when mail arrives in More Meat, the Nag is no longer new, and More Meat can be opened on top in the normal manner, as denoted by the symbol (5).

The placement of Nag Windows in any of the Windows environments is, in general, considerably simpler. Nag Windows simply float outside the MDI box, above other floating windows, until the user closes them. The exception to this rule is the Update Nag, which acts like a MacOS Nag Window, if the user assumes that the entire Macintosh diagram takes place inside an MDI box. Note particularly that this indicates that the Update Nag may be maximized in the Windows environment.

Although the basic concept of Nag Schedules was introduced above, a more detailed discussion of Nag Schedules at this point would facilitate the understanding of certain aspects and features of the software according to an exemplary preferred embodiment of the present invention. In the Eudora e-mail software, each schedule is a set of numbers representing (save for the last) the number of days since a given date (the Nag base). The software provider further must keep track of the last time the user was nagged (the last lag). Note that both the Nag base and last Nag should be tracked separately for each type of Nag; the software provider must not mix values for Registration Nags and Update Nags, for example. The last number of the Nag Schedule is a repeat interval. Once the other Nags are all exhausted, the user is nagged each time this last number of days passes.

Figure 11:
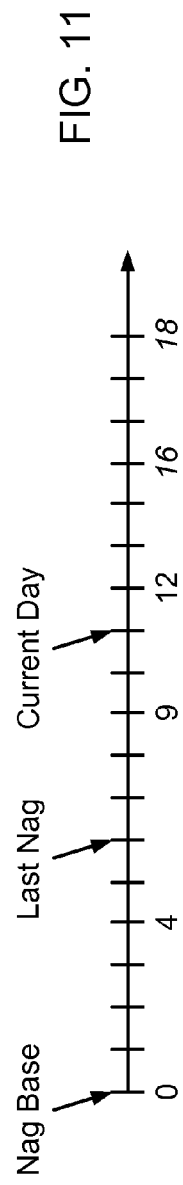
FIG. 11 illustrates a Nag Schedule employed by the software according to the present invention.

The best way to understand a Nag Schedule is to view the schedule as a timeline, as illustrated in FIG. 11. This particular timeline is for a Nag Schedule of [0,4,9,12,3]. Note that the Nags which will occur at the 15 and 18 day points are there because of the final number, the repeat interval (of 3 days). Thus, in FIG. 11, the user is due to be nagged if there is a Nag day greater than the last Nag and less than or equal to the current day. If more than one Nag day has passed, the user is still nagged only once.

It should be mentioned that once the Nag Window has been opened, the last Nag is reset to the current day. It should also be mentioned that a final Nag interval of 0 indicates that the Nag is not done any more after the defined period has expired. It will be appreciated that the Eudora e-mail software advantageously includes a software subroutine which determines whether any Nags are due at application startup and at the completion of each mail check. With respect to the latter case, the software checks the modification date on the Update Page once per week during a mail check. If the Update Page has been modified during the past week, the software provider will download update information during the mail check, and nag the user to update his/her software, e.g., the Eudora e-mail software. See FIG. 7B. Finally, it will be noted that when a user's state changes so that an open Nag is no longer relevant, that Nag is closed and no longer displayed.

The preceding discussion also touched briefly on various issues with respect to ads; these issues will be developed more fully immediately below. More specifically, the major client issues involving ads are how the software displays the ads, when the software displays the ads, how the software obtains the ads, how the software provider obtains and transmits demographic information, and how the software provider verifies that ads are actually being displayed.

Referring again to FIG. 3A, the main window of the Eudora e-mail software shows a squarish ad and three ad buttons in opposite corners of the main window. It should be mentioned that this particular squarish ad is 144 pixels high by 128 pixels wide; the software will accommodate ads as large as 144 pixels by 144 pixels. It will be appreciated that the area of the window usable by the mailboxes has been reduced approximately 38%; however, it will also be appreciated that the content area has been left untouched. FIG. 3B illustrates an alternative main window where a small graphic or placard is employed, e.g., in the lower right corner, to indicate that the main window is sponsored.

It will be appreciated that the actual information that the software provider can accept from advertisers will be relatively simple. For standard ads, such as that depicted in the lower left-hand corner of FIG. 3A, the ad will consist of an image file, e.g., a GIF file, a PNG file, a JPEG file, etc., of not more than 15K, and not more than 144 pixels tall by 144 pixels wide. Preferably, this image file will employ the Web Safe Color Palette. This palette, which is sometimes to as the Browser-Safe Palette, contains only 216 colors out of a possible 256 colors definable by 8-bits. The remaining 40 colors vary on Macs and PCs. By eliminating the 40 variable colors, this palette is optimized for cross-platform use. Moreover, the image file advantageously will be associated with a single uniform resource name (URN) to which users who click on the ad will be directed. Each advertiser will also specify the desired scheduling information for the ad, as discussed in greater detail below. In order to facilitate the transmission of the ad to the software provider, e.g., QUALCOMM INCORPORATED, the advertiser may wrap the ad in HTML. The software provider advantageously can also employ HTML-wrapped ads, since this will allow the software provider to include ad parameters as META tags in the HTML page, specify the link address, etc.

Moreover, the Toolbar icons will be requested in GIF format as well, but will actually be delivered to the client in a composite format and transformed into standard icons. In addition, placards for sponsors of the Freeware version illustrated in FIG. 3B should be no more than 31 pixels tall, and on the order of 88 pixels wide, though the precise width can be varied at runtime.

It should be mentioned here that when the user clicks on an ad, the software provider will normally take the user to the software provider's click-through counter and then redirect the user's browser to the link listed with the ad. The click-through counter advantageously can be one of the software provider's servers, e.g., one of servers 302 and 303. It will be appreciated that this will require that the software provider will compose a URN which includes a server name, some tracking information, and the ultimate destination URN, and then the server will redirect the user's browser to the destination URN.

Figure 12A:
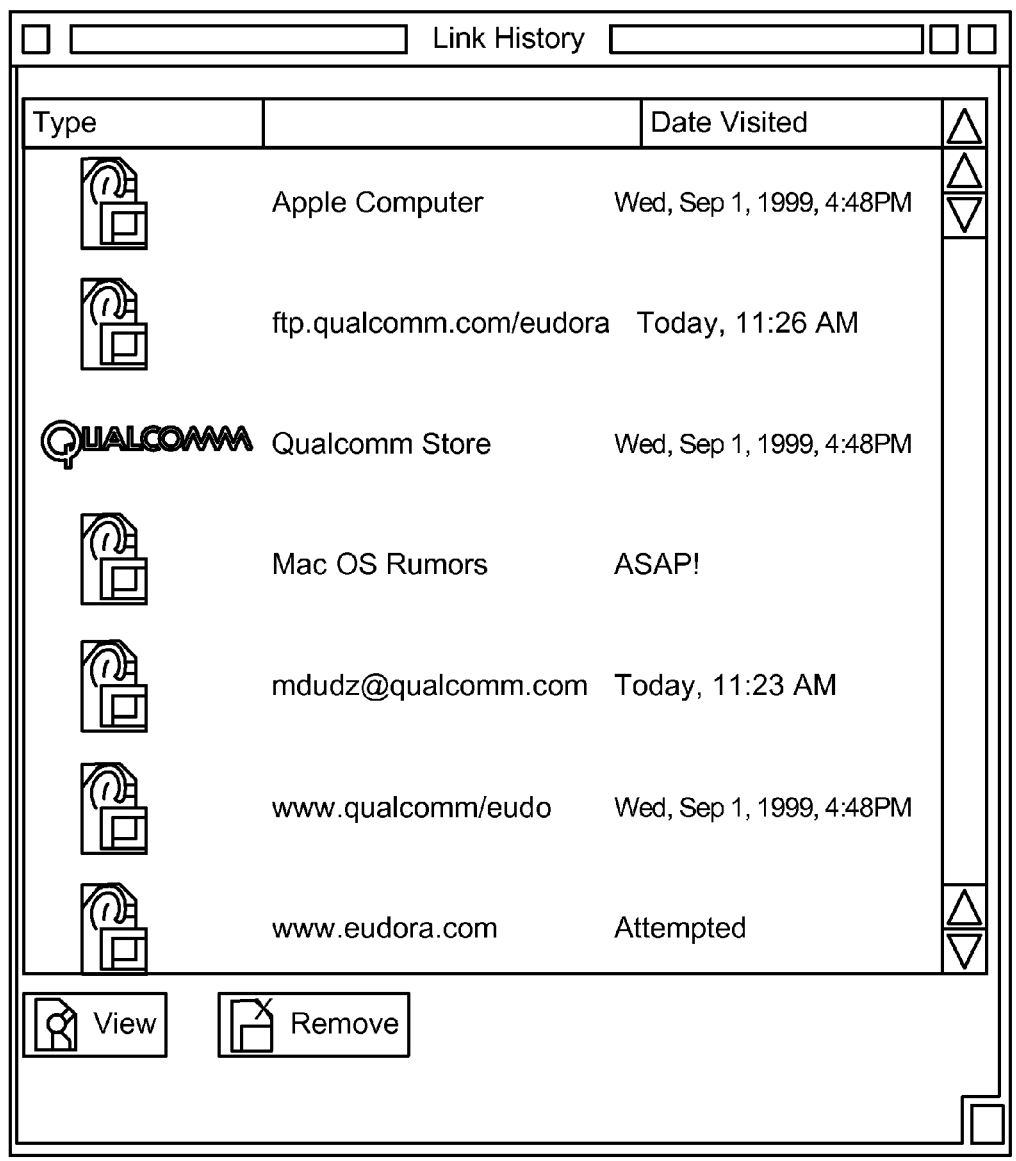
Figure 12B:
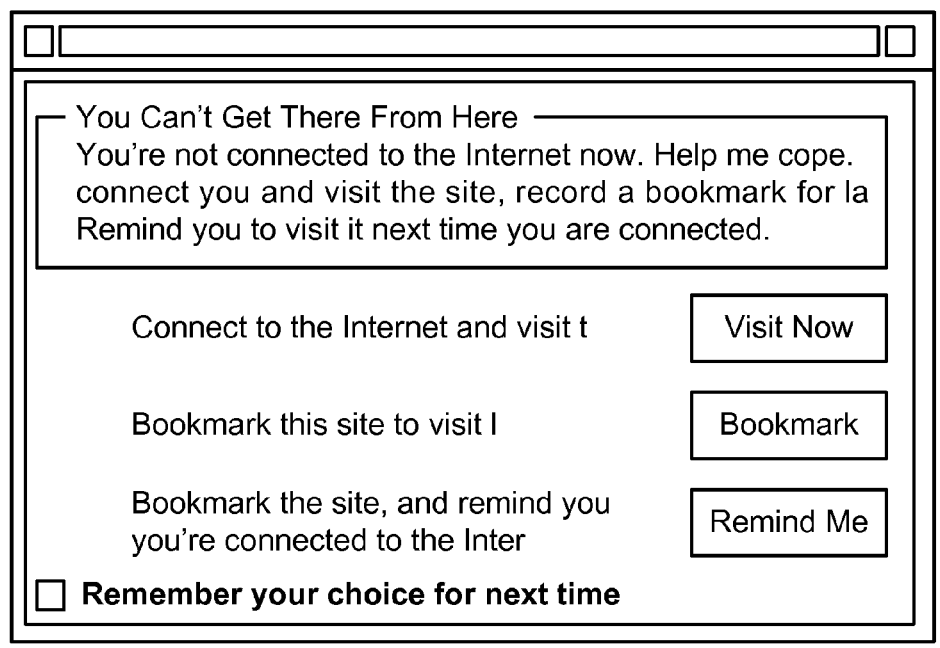
FIG. 12B is a dialog box reminding the user that the e-mail client according to the present invention is off-line.

One complication occurs if the user is offline at the time that the click-through is attempted. When the user is offline, several possible actions by the software are possible. For example, the software could initiate an online session. Alternatively, the software could simply flag the link using the link history facility. See FIG. 12, which depicts a window/menu that the software maintains, similar to the history lists maintained by most browsers. When the ad is clicked while the software is offline, the software advantageously adds the link to the link history window, and flags this link so that the user knows he/she had wanted, but was unable, to visit that site during a previous e-mail session.

Moreover, the software advantageously may be constructed to permit the user's browser respond to the click-through. It will be appreciated that some browsers have sophisticated features of their own for dealing with offline conditions, and the software provider shouldn't discount the idea that the user might wish to rely on them. Alternatively, the software may permit transmission of the link to the browser for subsequent handling by the browser when it is online, i.e., the software can allow the user to tell the software provider to send the link to the user's browser the next time he/she is online.

In summary, the software provider will, in an exemplary and non-limiting case, mandate that the following standard for all advertisements submitted by advertisers:

No larger than 144×144 pixels. Ads smaller than this will be centered in a 144×144 window and surrounded by the standard frame color.

GIF or JPEG. The software provider advantageously can convert the GIF file to a PhotoShop (PNG) file, but this is transparent. It should be noted that the software provider will not presently accept PNG ads directly, because of the gamma bugs in PhotoShop.

No larger than 15K. This will reduce the bandwidth required to transmit the ad as well as the goodwill cost of user bandwidth.

No animation. This is a cornerstone of the "unobtrusive" message to users aspect of exemplary embodiments of the present invention.

A single URN of not more than 900 characters. There are suspected limits of 1K on URN size. Limiting the customer's URN to 900 characters will allow the software provider to annotate the URN and still stay within the 1K limit.

A user-friendly title string of not more than 31 characters. This string will be displayed in the link history window, and should be something users will relate to.

Use Web Safe Color Palette. This 216-color palette optimized for users with 256-color systems, as mentioned above.

It should be mentioned that Toolbar buttons, i.e., the buttons in the upper right-hand corner of FIG. 3A have the same requirement as standard ads, except for the following:

Both 16×16 and 32×32 sizes required. These are the sizes the client supports, the software provider needs them both.

GIF only. The software will not render JPEG images in the toolbar.

With respect to the co-brand spot ad illustrated in the lower right-hand corner of FIG. 3B, the spot has the same requirement as standard ads, except for the following:

No larger than 95 pixels wide by 31 pixels high.

GIF only.

One troublesome issue regarding the ad placement illustrated in FIG. 3A is the relative ease with which a user might be able to hide the ads from view by placing a small window directly over the ad. Advantageously, the software performs a check to determine that the ad is both onscreen and uncovered. If the screen state does not satisfy both of these criteria, the software will either nag the user to uncover the ad or automatically re-order the windows so that the ad is uncovered. If the user persists in covering the ad for a predetermined period of time, the software will automatically devolve to freeware mode.

Since one of the major reasons for providing an Adware version of software such as the Eudora e-mail program is to provide a mechanism by which advertisers can subsidize the cost of the software, the software provider is clearly motivated to ensure that all Eudora users are actually looking at the ads. Stated another way, displaying an ad on the screen of the client computer 100a, for example, while the user is in another room does not justify the expense of the ad for the advertiser. For that reason, the software includes functions which permit measurement of the actual time that the user is in front of the computer while the ad is present.

Absent some sort of positive ocular fastening device, the best thing the software can do to measure user attention is to monitor for user input to the client computer 100a, thus verifying the user's presence in front of the display device 208. Given that the primary user input devices to the client computer 100a are the mouse 204 and the keyboard 203, the e-mail client will monitor for both mouse and keyboard operation by the user when the Adware version of the Eudora e-mail client is frontmost, and periodically report this activity back to, for example, the software provider. In other words, the user will be considered "present and accounted for" if the mouse moves significantly, if a mouse button states change, or if keys are pressed or released. Moreover, the software will consider a period before and after such an event as "face time" for the ad. In an exemplary case of the software according to the present invention, the software measures the period and refers to the total length of this period as kFaceInterval. There is no need to be overly precise about this value, e.g., a kFaceInterval of sixty (60) seconds, which begins with a user event, is employed in the exemplary, non-limiting case being discussed.

Having discussed the format of the ads being displayed by the software, a detailed discussion of the methodology by which the ads are actually obtained for display will now be presented. The general methodology for obtaining ads for display is to connect to a QUALCOMM INCORPORATED site during a mail check, or some other time when the software senses a live network connection, and download ads into a local cache. It will be appreciated that the act of downloading the ad can be the trigger for billing the advertiser, in order to avoid the necessity of collecting billing information from individual clients. In contrast, proprietary systems such as that provided by JUNO, upload ad display data to the designated e-mail server whenever the user accesses his/her e-mail account for any reason.

In order to make reasonable decisions about how to download ads, the software provider needs to have some idea of what impact the ad downloads will have on users. In order to assess that impact, the software provider must make assumptions (or gather information) about what a typical Eudora user's habits are, and what the ads will be like in terms of transmission characteristics. Part of the Adware process is to add instrumentation in the software client so that the software provider can begin to answer these questions intelligently, rather than by guesswork. However, one must start with some basic assumptions. For example, FIG. 13A is a table listing the assumptions used in determining the impact of ad transmission on e-mail program operations; FIG. 13B is a table listing the bandwidth requirements in terms of the subscriber base versus of the number of new ads to be downloaded each day to the subscribers. The implications of these calculations are as follows. Given that the goal is for an average turnover of an ad is, for example, three days, the top line in the table illustrated in FIG. 13B would be the one used by the software provider. The worst-case, i.e., maximum bandwidth, scenario would be to turn over, for example, 25 ads a day. These values are highlighted in the table of FIG. 13B.

In order to determine what ads are to be shown for a particular user class, as well as in order to transmit particular ad parameters, the software provider advantageously employs a PlayList. The PlayList is in its essence a list of URNs from which to fetch the actual ads as well as a set of attribute-value pairs, on a per-ad basis. The exact format of the PlayList is discussed in greater detail shortly. PlayLists will specify the complete set of ads the client should have, along with parameters for displaying those ads, as discussed immediately below. It should be noted that ads may appear in a PlayList but not be scheduled for display for a long time (or even at all). The presence of such ads in the PlayList will cause the client to retrieve the ads for storage on the client for future display. The general requirements for the PlayList are as follows:

1) The request for a PlayList will contain information to help the PlayList server determine what ads a copy of Eudora is required to fetch.

2) The PlayList can also contain parameters for Eudora as a whole, including the ability to modify how often New PlayLists are checked for.

3) PlayLists are allowed to specify whether or not they should replace all older PlayLists or merely be merged with them. It should be mentioned that the merge function will allow a more web-like advertising model, e.g., a model employing a rotating ad pool, should the software provider choose to employ such a model.

Figure 14:
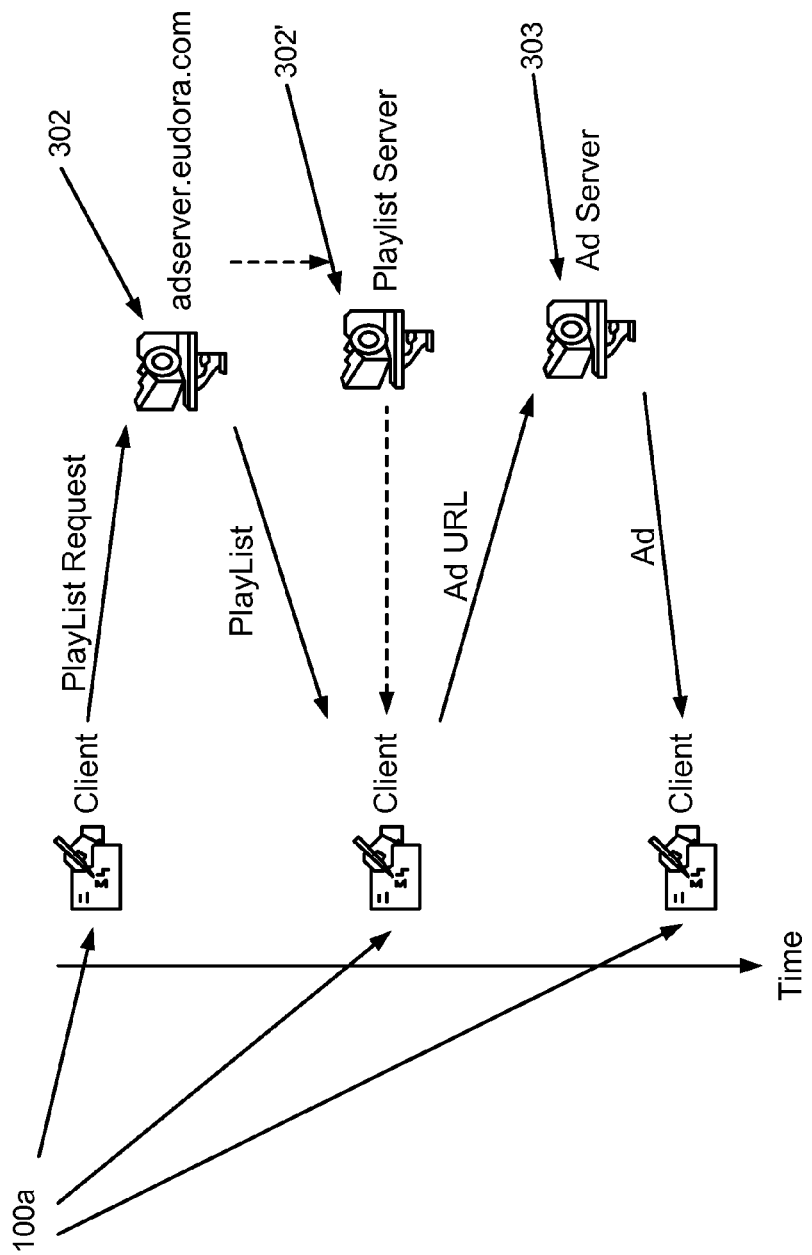
FIG. 14 is a state flow diagram of an exemplary ad fetch process according to the present invention.

The basic ad fetch process will now be described while referring to FIG. 14, which is a state flow diagram of an exemplary ad fetch process according to the present invention, and FIG. 1. First, the client software running on client computer 100a identifies itself to the PlayList server 302, e.g., ads.eudora.com. The client software, e.g., the Eudora software, provides to the PlayList server 302 basic client information and the ID of the PlayList the client software currently has installed. The ads.eudora.com server responds with either an indication that the current PlayList is still valid, uses an Hyper Text Transfer Protocol (HTTP) redirect to send the client to a different PlayList server, e.g., another PlayList server 302', or responds directly with the New PlayList from PlayList server 302. See FIG. 14. In the event that the New PlayList is received from PlayList server 302, the client software compares the New PlayList with its current set of ads, and begins fetching ads not resident in the e-mail client's ad cache from one of more ad servers, e.g., the ad server 303 illustrated in FIG. 1, according to URNs included in the PlayList. The client software also deletes ads not currently appearing in the PlayList.

Advantageously, the client software performs a check for a New PlayList every three days. It should be mentioned that the 3 day interval between PlayList checks is arbitrary and applicable only to the exemplary preferred embodiments of the present invention being discussed. It should also be mentioned that the ads preferably will be fetched as needed to fill the PlayList, possibly over many mail checks. Moreover, the ad fetch process will be limited to one minute per mail check, irrespective of the tasking of either the e-mail client software or the client computer 100a. After one minute, the client software will disconnect from the ad server 303. This will often mean that the e-mail client software has not filled the PlayList when the ad fetch operation is terminated. This is acceptable. The software will utilize the available ads while the remaining ads are being downloaded.

Furthermore, the software provider advantageously can provide for multiple servers on a peer with ads.eudora.com server 303. It will be appreciated that these servers will provide extra ads for some Eudora user communities, e.g., all of the users at a company serviced by one ISP, etc. Stated another way, an ISP which provides additional services such as local and long distance telephone access may wish to cross promote these services to its own customer base. Thus, the ISP advantageously can contract for such localized promotion. The PlayLists transmitted to the ISP's branded Adware e-mail clients would be linked to an ad server 303" maintained by the ISP in that instance.

Given a set of available ads, the software still needs to choose which ad to display next. It will be appreciated that this is a matter of much excitement in the Web ad industry, where many choices are allegedly made to maximize the profit of the advertiser. In particular, ads that generate better user response are preferred because such ads generate extra revenue—such ads are frequently tied to the content of the Web page upon which they are displayed. However, it is unlikely that either the software provider or the client software will be able to derive a significant benefit from the ad scheduling algorithms currently run on ad services. This is in part due to the fact that the ads being displayed by the e-mail client software are divorced from the content being displayed, i.e., neither the software provider nor the client software are cognizant of the content of any particular ad that the user is looking at, and in part due to the fact that the e-mail client software will be requesting ads in a batch for later display, rather than requesting them in "real time".

As mentioned above, the PlayLists provide certain global inputs to the ad scheduling algorithm, including the parameters listed in the table immediately following.

| PARAMETER | DESCRIPTION |
| --- | --- |
| FaceTimeQuota | The amount of time per day that the e-mail client software is supposed to show the ad. |
| RerunInterval | The age beyond which ads should not be "rerun" after the "runout", i.e., maximum permissible, time is passed. |

In addition, the per-ad inputs in the PlayList associated with ad scheduling are set forth in the following table.

| PARAMETER | DESCRIPTION |
| --- | --- |
| ShowFor | This is the number of seconds the ad should be shown for at any given time. This number might be small, like a TV ad (e.g., 30), or large, more like a billboard (e.g., 3600 for one hour, uninterrupted). |
| ShowForMax | Maximum total amount of time to show this ad. The ad is exhausted after this time, and should be discarded once new ads arrive. |
| DayMax | Maximum number of times per day to show this particular ad. |
| BlackBefore | The amount of time the ad window should be blank before the ad is displayed. |
| BlackAfter | The amount of time the ad window should be blank after the ad is displayed. BlackAfter runs concurrently with the blackBefore of the next ad, so that the actual time between ads is max(blackAfter, blackBefore), not blackAfter + blackBefore. |
| StartDT | Date/time (time zone optional) before which the ad should not run. |
| EndDT | Date/time (time zone optional) after which the ad should not run. |

There are some values the software provider computes that are also input to the scheduling algorithm. These global values are listed in the table which follows.

| PARAMETER | DESCRIPTION |
| --- | --- |
| AdFaceTimeToday | The total amount of ad Face time for the current day during which regular ads have been shown. |
| TotalFaceTimeToday | The total amount of Face time for the current day |

The software also keeps track of and reports these values to the software provider for every ad:

| PARAMETER | DESCRIPTION |
| --- | --- |
| NumberShownToday | The number of times an ad has been shown on the current day. |
| ThisShowTime | The amount of face time the current ad has received. |
| LastShownDate | The last date/time that the e-mail client software showed this ad. |

Advantageously, the software provider implements three major states of the ad scheduler, the regularState, the runoutState, and the rerunState. In the regularState, the e-mail client software advantageously is showing regular ads and accounting for them. It will be appreciated that this is what actually generates charges for the bulk of the ads displayed on the e-mail client. In contrast, the runoutState is selected when the e-mail client software has shown enough regular ads to fill the assigned faceTimeQuota, and the ad cache includes one or more runout ads available for showing. In the rerunState, the e-mail client software has exhausted both its regular ad quota and the runout ads, i.e., the e-mail client software is now reshowing the regular ads, but the software provider is not charging for them.

It should be mentioned here that the software provider advantageously can provide a custom installer to various ISPs, book publishers, etc., that will label or brand the copies of Eudora that they have distributed. The software provider will then credit these distributors with a percentage of the ad revenue generated by the clients they distribute. It will be appreciated that these credits may be offset by cross promotional activities associated with each branded version of the Adware e-mail client, for the reasons previously discussed.

Given the discussion presented immediately above, a more detailed explanation of various aspects of the exemplary e-mail client software according to the present invention can now be provided.

As previously noted, the PlayList is a way to control the fetching and display of ads in software, e.g., in the Eudora e-mail client. The primary benefits associated with the PlayList are the separation of ad parameters from ad images, insulation of the Eudora client from intimate knowledge of ad image servers, and centralized server intelligence in ad distribution, without requiring user registration or centralized user databases. Thus, it will be appreciated that PlayLists are extremely malleable objects. In an exemplary case, the PlayLists can exert varying degrees of control over how the Eudora client behaves, from specifying the exact set of ads Eudora runs to simply transmitting abstract URNs which will choose their own ads. If PlayLists are used to their fullest advantage, they will give the software provider a powerful tool in controlling ad display in software such as Eudora; if PlayLists are later deemed irrelevant, the PlayLists cost the software provider one extra, brief network connection per day.

As discussed above with respect to FIGS. 1 and 14, the client computer 100a connects to a PlayList server 302 (which may redirect to a different server 302') via a network 200. Then, the PlayList server 302 returns a PlayList to the client computer 100a via the network 200. Subsequently, the e-mail client software on the client computer fetches the ads specified in the PlayList.

The PlayList Request, which is sent by the Eudora client to the PlayList server 302 in order to initiate the ad fetch process, is not a simple burst of binary code. The PlayList Request is a block of extensible markup language (XML) code employed to provide the server 302 with sufficient information to build or select the proper New PlayList for the user. The information in the PlayList Request is shown in the following table.

| PARAMETER | DESCRIPTION |
| --- | --- |
| UserAgent | This is a string identifying the application requesting the PlayList, its version number, and the platform on which it is running. |
| PlayList(s) | This identifies the PlayList(s) that the client is currently using. This may have multiple values if the client is working off more than one PlayList. |
| Entry | A list of the id's of the ads recently shown by this client. The entries are nested inside the PlayList to which they belong.<br>Each entry can have zero or more of the following associated attributes or types (the number following the equal sign (=) indicates an exemplary value attached to the attribute which is used to achieve the description of the entry attributes provided below):<br>Active = "0"    The ad is no longer being shown.<br>IsRunout = "1"    The ad is a runout ad. This saves the server having to do a lookup on the ad.<br>IsSponsor = "1"    The ad is a sponsorship ad, to be shown in place of the QUALCOMM logo. See FIG. 3B.<br>IsButton = "1"''    The ad is a toolbar button.<br>Deleted = "1"''    The ad has been hidden by the user. This is allowed only for toolbar ads. |
| FaceTime | This lists the amount of face time the user has used in the last seven calendar days. This allows the server to determine how many ads the client is likely to be able to display. The value for the current day is the greater of today's value (see faceTimeUsedToday) and last week's value for today. |
| FaceTimeLeft | This is a total of the amount of face time requested by the ads still left in the client's ad cache. |
| FaceTimeUsedToday | This is the amount of face time the client has used toward displaying ads today. It can be used by the server to determine whether a date-critical ad can be shown today. |
| DistributorID | This id is used for the bounty system, so that the PlayList Server can identify and credit, commission or otherwise reward the ISP or other organization that distributed this copy of Eudora. |
| Pastry | This is a cookie the PlayList Server gave to the Eudora e-mail client in the past. It could contain any state information/settings the server wishes to save. |
| Profile | Profiling information originally entered on the software provider's web page and subsequently/concurrently stored with the e-mail client. |
| Screen.height | The height of the display on which the ads are shown, in pixels. |
| Screen.width | The width of the display on which the ads are shown, in pixels. |
| Screen.depth | The color depth of the display on which the ads are shown, in colors/bits per pixel. |
| PlayListVersion | The version # of the PlayList routine employed by this particular client. |

It will be appreciated that not all of these parameters are likely to be actively used at the same time; some are present to support particular modes of operation (see below), and will not be used in other modes. It should be mentioned here that every PlayList Request is checksummed with MD5. See RFC1321—"The MD5 Message-Digest Algorithm" at http://www.facs.org/rfcs/rfc1321.html. The PlayList server 302 preferably ignores requests that fail checksum verification.

After the client makes a PlayList Request, the server 302 replies with a PlayList Response. Preferably, the PlayList Response is divided into two major sections; the ClientInfo section, which updates general client behavior regarding ads, i.e., speed with which the ads turn over, and the New PlayList itself, which describes the ads the client should fetch. It should be mentioned that the PlayList Server, e.g., server 302, may also return an empty response, meaning that the e-mail client should continue on its course with the ads it already has. It should also be mentioned that every PlayList Response is checksummed with MD5, just as the PlayList Request is. The MD5 digest is encoded in hexadecimal and put in a "Check-Sum" header in the PlayList Response. Advantageously, the e-mail clients ignore PlayLists that fail checksum verification.

Before describing the sections of the PlayList Response, it should be mentioned that the e-mail client sometimes becomes, for lack of a better term, befuddled due to old client bugs, server bugs, etc. Sometimes the bad data inherited by even an updated client is too garbled for the system to function properly. While the client could be programmed to detect this condition, it is preferable to leave the task, i.e., error detection, to the server, which can be changed more easily. Thus, when the server detects that a client is "befuddled," the PlayList server 302 responds with just a single command: reset. No ClientInfo should follow, no PlayList should follow, just the reset command. On receiving the reset command, the client discards its accumulated ad databases and records, including PlayLists, faceTime history, ad history, ad caches, etc. Everything is reset to the pristine condition that the e-mail client software had before the Adware software was run for the very first time. It should be mentioned that Link History is exempted from the reset command, both for reasons of practicality and because it is so user-visible. The only other item of ad data that reset does not affect is the ad failure counter, which should be retained across a reset. The client should then recognize that it has no PlayList, and make another request to the PlayList Server for the needed PlayList.

The ClientInfo section updates various client parameters. The parameters are listed immediately below.

| PARAMETER | DESCRIPTION |
| --- | --- |
| ReqInterval | This is the number of hours the client should wait before checking for a New PlayList. If ad turnover is high, this will be a small number. A sponsored freeware version might have a much higher number here, so that it checked for a New PlayList only once a week or once a month. Clients may also check for New PlayLists if they have ads with nonzero showForMax values, and the ads have used up much of their time. |
| HistInterval | This value is the number of days the client must remember that it showed a particular ad. It will report this to the PlayList server so that the server can, at its discretion, choose not to direct the showing of ads for competing services to that particular client, competing ads are separated from one another by the HistInterval value. |
| Pastry | The previously mentioned cookie. The server can store whatever state information it wishes in this cookie. |
| Flush | More command than parameter, if present, it causes the client to discard an old PlayList or ad. Flushed ads and PlayLists are removed completely, and no longer show up in ad histories. |
| Width | The width in pixels the client should make the ad window be. |
| Height | The height in pixels of same. |
| FacetimeQuota | The number of seconds of facetime the client should devote to regular ads, before moving to the runout ad. |
| RerunInterval | The number of days an ad may be "rerun"; that is, shown for free after all other ads and the runout are exhausted. The time is measured from the last non-rerun showing of the ad. |

From the discussion above, it will be appreciated that the ClientInfo section is a powerful feature of PlayLists. It allows the software provider to control the application in a global way, including segueing smoothly from one ad model to another. It will be appreciated that if this were the only benefit the software provider derived from PlayLists, it alone would make implementation of PlayLists worthwhile.

As mentioned above, the PlayList Response is divided into two major sections; the ClientInfo section, which updates general client behaviors, and the New PlayList itself, which describes the ads the client should fetch. The New PlayList itself has one global value, PlayListID. This id is the id value that the client returns to the PlayList server the next time the client computer 100a connects to the PlayList server 302. It will be appreciated that this PlayListID advantageously can be included in the PlayList Request, or can be separately uploaded to the PlayList server in a myriad of forms, e.g., as a cookie. The remainder of the PlayList is a list of ads. Each ad is allowed to have many parameters, although it's likely not all of them will be used with any single ad, and it is possible that some of them will never be used at all. The parameters include the scheduling parameters, which are described in detail above, and ad information, which includes the information listed immediately below.

| PARAMETER | DESCRIPTION |
| --- | --- |
| AdID | A unique identifier for the ad in question. A 64-bit integer, the top 32 bits of which are a server authority id, the bottom 32 bits of which are an identifier unique to the server authority. |
| Title | A human-friendly string used to refer to the ad. |
| Src | A URN indicating where to get the actual ad to |

| PA-RAMETER | DESCRIPTION |
|---|---|
| | show. This might be highly specific (e.g., http://media48.doubleclick.net/eudora/coke/drinkcoke.gif) or it might be much more general (e.g., http://ads.doubleclick.net/eudora/ad;ord=1367844421?). Another important PlayList feature is that the PlayList permits the client software to pull ads from many different servers. The software provider could, for example, run its own servers in parallel with those belonging to DoubleClick, and take ads from each server, or some of the servers, based on the PlayList. There can be a checksum attribute on the src tag. If present, its value is a hexadecimal-encoded MD5 digest of the ad data. The client may check this checksum against the ad data. |
| IsButton | Is this "ad" a toolbar button? If so, it will be scheduled separately from the main ads. The only scheduling parameters that are meaningful for toolbar buttons are startDT and endDT. |
| IsSponsor | Is this "ad" a sponsor placard? If so, it will be scheduled separately from the main ads. |
| IsRunout | Is this ad intended to be run after all other ads have exhausted their runs for a given day? There will only be one active isRunout ad in any client's collection of PlayLists. |
| URN | The Uniform Resource Name of the server (e.g., a Web site address) to which the user is directed when he/she clicks on the ad. |

It should be mentioned that the term Uniform Resource Name (URN) indicates a generic set of all names/addresses that are short strings that refer to resources available via the Internet. Thus, URN encompasses both a Uniform Resource Locator (URL), which is subset of URN schemes that have explicit instructions on how to access a particular resource on the Internet, and a Uniform Resource Identifier (URI), which is another subset of URNs. It will be appreciated that the URL and URI subsets may overlap. It will also be appreciated that the terms URN, URL, and URI advantageously can be used interchangably; whichever term is used is meant to address the named resource in its broadest possible sense.

It has been mentioned in passing that not all parameters are likely to be used at one time. In fact, PlayLists are flexible enough to support many ad models. PlayLists are crucial to some ad models, to others they are helpful but not central, to still others they are marginally useful, but do not present significant impediments. The use of PlayLists does not predispose the software provider towards any specific ad model; the PlayLists advantageously can be used to support any ad models that the software provider chooses. Indeed, PlayLists permit the software provider to switch between ad models midstream, should the software provider decide to do so. In the discussion that follows, several ad models will be discussed with respect to FIGS. 16A and 16B in an effort to illustrate how PlayLists would be used for each ad model. It will be appreciated that this will demonstrate the essential neutrality of the PlayList concept to the ad model.

FIG. 16A illustrates the ad model associated with persistent ads while FIG. 16B depicts the parameters associated with a short-lived ad model. One thing to notice here is how few of the parameters from any of the sections appear in the chart. It will be appreciated that varying as few as five parameters advantageously causes the Adware to shift between these two distinct ad modes. That's because they are largely not relevant to the choice of ad model. The parameters will either be used or not, irrespective of the ad model. For example, the software provider can implement blank space after an ad in any model, and the software provider can eschew blank space after an ad in any model. Most of the parameters fall into this it-just-doesn't-matter category.

With respect to the short-lived ad model, it will be appreciated that the software provider accepts many ads; either from many advertisers or only a few advertisers. Ads do not persist for many days; they're used up and discarded at a relatively rapid rate. In this model, PlayLists will be used additively. Each time the client runs low on ads, it will ask for another PlayList which will describe a few more ads to mix with the clients' existing ads. When ads exceed their allotted time, the ads are discarded. In this ad model, the PlayList server really only serves to transmit parameters for ads. However, that is acceptable, since the parameters have to be transmitted somehow, after all.

Suppose the software provider wants to mix ad models, e.g., desires to provide a mix of long-running ads and short-lived ads. How this situation is handled depends on the stoichiometry. If the cache is or will be filled with mostly persistent ads and only a few short-lived ones, the software provider can merely increase the reqInterval and use PlayLists as in the Persistent Ad Model. In other words, the software provider merely picks a few random ads to go on each PlayList, and picks a few more random ads to go on the next PlayList, which the client will fetch the next day. If, on the other hand, the cache will contain mostly short-lived ads and only a few persistent ads, the computer system 10 will use multiple PlayLists. One PlayList will list the persistent ads, as discussed above; the remaining facetime will be filled using PlayLists of short-lived ads.

The above discussion illustrates how PlayLists can be used to support widely differing ad models. The reason PlayLists can do this is that they're really only an extra level of server control and in between Eudora and its ads.

Given the importance of ads to Adware e-mail software, one of the software provider's key concerns is "what happens if the Adware does not receive ads?" For example, users or ISPs may simply shut off the flow of ads to Eudora by using firewalls or other means. Alternatively, the user may simply delete ads or Playlists (or both) from, for example, his/her computer on a random or periodic basis. If this happens, then users will have no ads to display, i.e., the users get the full-featured version of Eudora without either seeing ads or paying. This would defeat one significant aspect of the exemplary software according to the present invention. On the other hand, users may have hardware or software problems or other issues that keep them from fetching ads, or the software provider's ad servers might even be down for some reason. Users should not be punished for this.

Figure 17A:
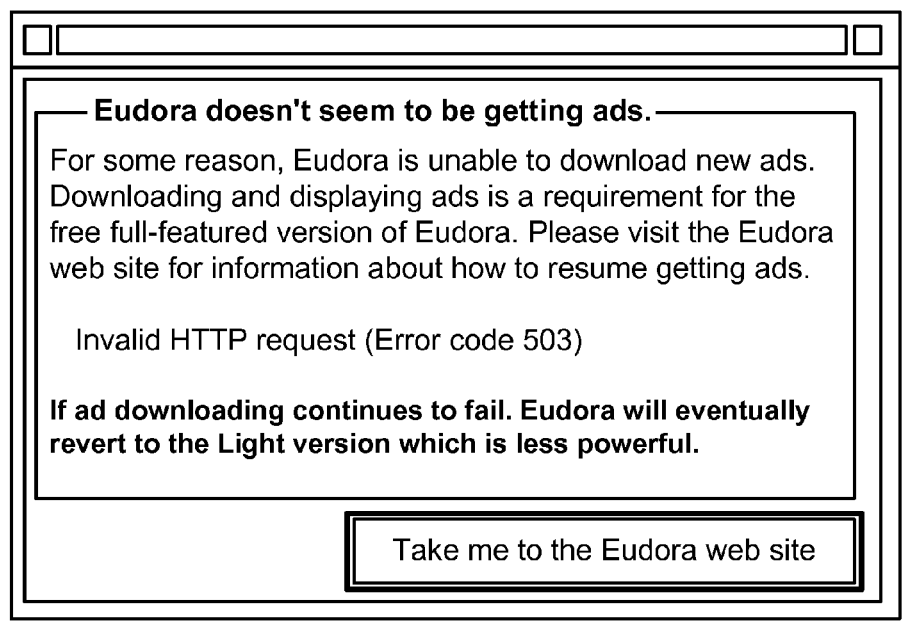
FIGS. 17A through 17C illustrate additional dialog boxes which advantageously can be generated by the e-mail client software according to one aspect of the present invention.
Figure 17B:
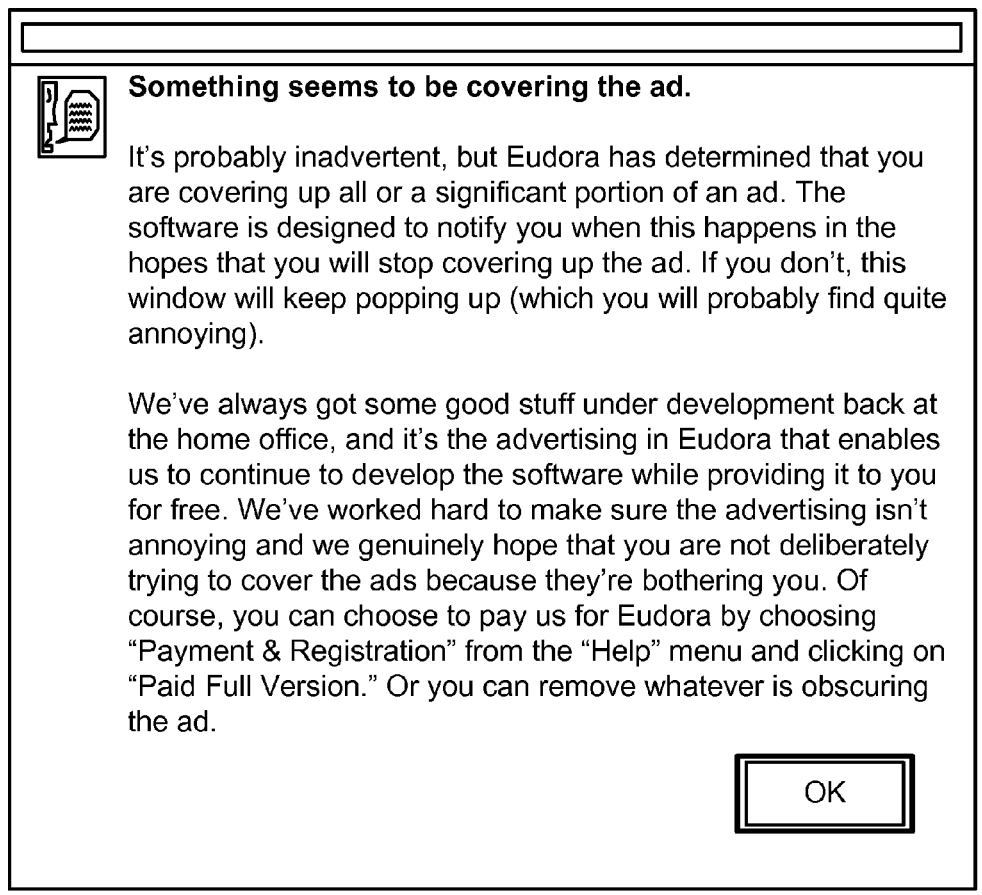
Figure 17C:
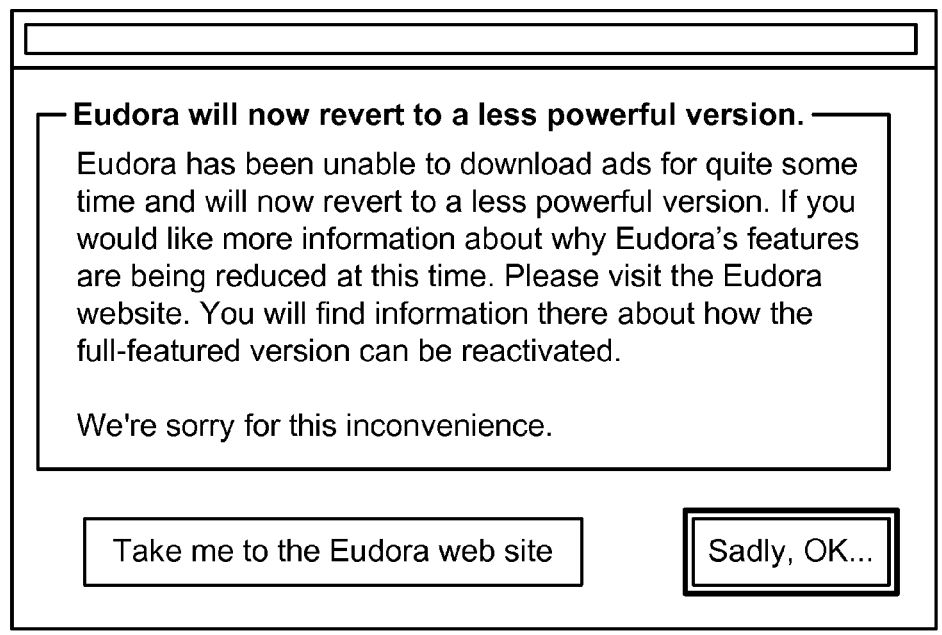

The software provider will distinguish between these two situations by asking a simple question, i.e., is the user sending or receiving mail? If the answer is yes, the software provider will assume that the blocking of ads is something the software provider needs to address. The way the software provider addresses this issue is with an escalating series of Ad Failure Nags. These will continue for two weeks or until the software receives ads. For every two days the software does receive ads, the software will decrement the Ad Failure Nag timer by one day. If the timer runs out, the software will display an apology to the user, revert to the Freeware version, and mark the user's software as owned by a Deadbeat User. Deadbeat Users will only be allowed to return to Adware if the ad server can be connected to at the time the user attempts to return to Adware. See FIGS. 17A-17C. It should be noted that if the software provider should ever decide to retire Eudora and wish to let people use it without ads, the software provider can simply publish a permanent registration code.

Alternatively, the e-mail client advantageously includes several more sophisticated functions for determining that an ad failure condition requires the employment of the Ad Failure Nag discussed above. For example, the client device can identify an ad download failure condition when a corresponding ad download function has failed to downloads during a predetermined period of time. In addition, the e-mail client device can identify an ad display failure condition when a corresponding ad display function has failed to display ads for a predetermined time period, e.g., the time(s) specified in the New PlayList received from the PlayList server and/or the current PlayList(s) stored for use by the e-mail client device. Either condition invokes the Ad Failure Nag function discussed above.

One of the things the software provider will need to know is that the ads the software provider thinks are being displayed are actually being displayed, thus confirming that the ads are being displayed as frequently and for as long as the software provider thinks they are being displayed. It will be appreciated that this will be crucially important to maintaining credibility with advertisers. An exemplary audit scheme contains the following features:

- Keep a rotating log of ad displays. This log will be rolled over once per week. The log will record ad-related events—when an ad was displayed, when it was removed, and when it was clicked on—in addition to other events, like cumulative face time in Eudora, cumulative run time, etc.
- At random, ask the user for permission to transmit the log. At a frequency of one out of every hundred users per month, ask for the user's permission to return the log to the software provider. If the permission is given, the log will be formatted in ASCII, placed in an outgoing message, and queued. The user will be given the opportunity to inspect and, if he/she desires, cancel the log collection. See FIG. 18A.
- For selected users, deliver a pastry. In addition to the random send of the log, the software provider will also, at random, ask particular users for their permission to audit transactions in detail with the server. This will allow the software provider to correlate client and server behavior.

The various state flow diagrams illustrated, for example, in FIGS. 5A, 6A, 7A, 8 and 9, referred to a plurality of web pages, i.e., HTML pages that can be accessed and retrieved from one of the software provider's servers, e.g., registration server 301. See FIG. 1. The general purposes of these pages and the URNs which the software uses to access these pages will now be described in greater detail below.

It will be appreciated that it will be helpful for the client to give the server information to help the server direct the user to the proper location or to assist the user by prefilling certain items on Web page based forms. That is the function of the query part of the URNs. The elements that might go in query parts are listed below. It will be noted that the query parts are divided into two groups. The first group includes items which are considered personal, and great care should be taken to transmit them only when appropriate; the second group includes items which are not considered to be privacy-sensitive.

| | |
|---|---|
| Realname | The Real Name field from the user's Dominant e-mail personality. (EP4 supports multiple e-mail personalities for IMAP4 (both POP3) e-mail accounts.) |
| Regfirst | The first name under which the user registered last time (if any). |
| Reglast | The last name under which the user registered last time (if any). |
| Regcode | The user's current Eudora registration code (if any). |
| OldReg | The user's old-form RegCode. |
| e-mail | The e-mail address from the user's Dominant personality. |
| Profile | The profile information the user has entered. |
| Destination | This is the URN which the user wishes to visit. |
| Adid | This is the id of an ad on which the user clicked. |
| Platform | MacOS, Windows, Palm, Nintendo 64, etc. |
| Product | The software provider's code name for the product being registered. Eudora, PDQMail, etc. |
| Version | The version number of the product being used to register. This should be of the form Major.Minor.Bugfix.Build. |
| DistributorID | This will be a code which sites may apply for, which will, in turn, allow the site, i.e., its controlling entities, to receive a continuing revenue stream in return for providing users with this custom-branded copy of Eudora. |
| Action | What it is the user has requested to do; register, pay, lostcode, etc. |
| Mode | Either Payware, Adware, or Freeware. |
| Topic | Used for support items, this tells the server what particular kind of support is needed. |

Typically, all of the software provider's non-ad URNs begin with: http://jump.eudora.com/jump.cgi?action=whatever The "action" value determines what function the user wishes to perform. The software provider then appends various other query parts to the URN, suitably %-escaped, i.e., separated by a percentage (%) or ampersand (&) symbol (for example), according to the chart illustrated in FIG. 19. A brief discussion of each type of web page referenced in FIG. 19 is provided immediately below.

| | |
|---|---|
| PAYMENT WEB PAGE | This web page should take the user's credit card info, name, e-mail address, and whatever other information the software provider wants to compile about its users. It will also ask them for a question and answer for use if they ever lose their payment code. It should return, e.g., display and also e-mail, their official registration name and registration code. |
| FREE WARE REGISTRATION WEB PAGE | This web page should take the same info as the Payment web page, minus the credit card information. It should send back (that is, display and also e-mail) their official registration name and registration code. |
| ADWARE REGISTRATION WEB PAGE | This web page should take the same info as the Payment web page, minus the credit card information. It should send back (that is, display and also e-mail) their official registration name and registration code. |
| BOX REGISTRATION WEB PAGE | This web page exists to accept registrations generated by Box or updater installers. It should simply accept the user's code, validate it, mail it back, and display a "thank you for registering" page or dialog box. |

| | |
|---|---|
| LOST CODE WEB PAGE | This web page helps users find their registration codes. When they register/pay, they'll be asked to provide their name, e-mail address, and a question and answer. When they come to the lost code page, they'll be asked for name and address, and if that matches, they'll be asked their question. If all that goes well, their RegCode will be mailed to them. If they can't receive mail, they'll have to call. |
| UPDATE WEB PAGE | This web page should list the updates that are available to the user. Ideally, it would list only those updates the user does not already have, and clearly indicate which updates are free and which updates the user needs to pay for. This web page will be downloaded to the user's system from time to time and displayed "off-line" in Eudora, and so it should be kept small. |
| ARCHIVED VERSIONS WEB PAGE | This web page should list all versions of Eudora, so that users can download whatever they happen to need. |
| PROFILE WEB PAGE | The purpose of this web page is to collect demographic information so that ads delivered to the user can more precisely targeted by advertisers. At this page, the user will be asked a series of questions about his/her personal preferences, habits, etc., e.g., buying habits, sleeping habits, preferences in clothing, etc. No information identifying the user is to be collected on this page! The information will be reduced to a cookie, mailed to Eudora and stored as part of the user's settings in the Eudora directory (folder). The procedure for accepting a profile is the same as the procedure for accepting a registration code, detailed below. |
| SUPPORT WEB PAGES | The software provider will need several web pages for resolving user problems. For these pages, the software provider will use the "topic" part of the query to direct users to situation-specific help as needed. |

Having discussed the client side of the overall system illustrated in FIG. 1, is it now time to turn to the server side of the system. The network will not be discussed in detail, however, as it is something well known in the art.

In particular, the PlayList Server (PLS) or Servlet, i.e., the applet responding to the PlayList Request, shall now be described in detail. The PLS is a server side program which services HTTP requests and returns HTTP responses. It will be appreciated that each request launches a different thread, and that the data format of communications between the client and the PLS is XML-encoded in the exemplary embodiment. The PLS advantageously can be instantiated using the following Java® packages.

| PKG | DESCRIPTION | USAGE |
|---|---|---|
| XP | XP is an XML 1.0 parser written in Java. The parser checks a given XML document for well-formedness and validity. Additional information is available from http://www.jclark.com/xml/xp/. | The PLS uses the XP parser for: 1. parsing the client request to ensure that it is valid. 2. parsing the PlayList Response to ensure that it is valid |
| SAX | SAX (Simple API for XML) is a standard interface for event-based XML parsing, the parser reads the XML document line by line and initiates events that contain information about the line that was just read. The PLS listens to particular events of interest and extract the data from the XML document in that way. Additional information is available from http://www.megginson.com/SAX/ | The PLS uses the SAX interface both in the XML request and the XML response. In the request, the PLS "looks" for specific tags to build the request object. In the response, the PLS sends events to generate the PlayList XML response. |
| MM.MySQL | MM.MySQL is a Java Database Connectivity (JDBC) Type-4 driver, i.e., an all-Java driver that issues requests directly to the PlayList server database.<br><br>It will be appreciated that this is the most efficient method of accessing the database. The JDBC API is made up of classes and interfaces found in the Java.sql and Java.text packages. Additional information is available at http://www.worldserver.com/mm.mysql/ | The PLS use the JDBC methods to: 1. Establish connection(s) to communicate with the database using JDBC. PLS first establishes a connection through the appropriate JDBC driver. The connection object can be used to perform all operations on the given database. In an exemplary case, the PLS will create a pool of connection objects during the Servlet initialization. 2. Execute SQL statements and retrieve results the PLS performs a SQL query to the database using both Statement and Prepared Statement objects. |

Figure 20:
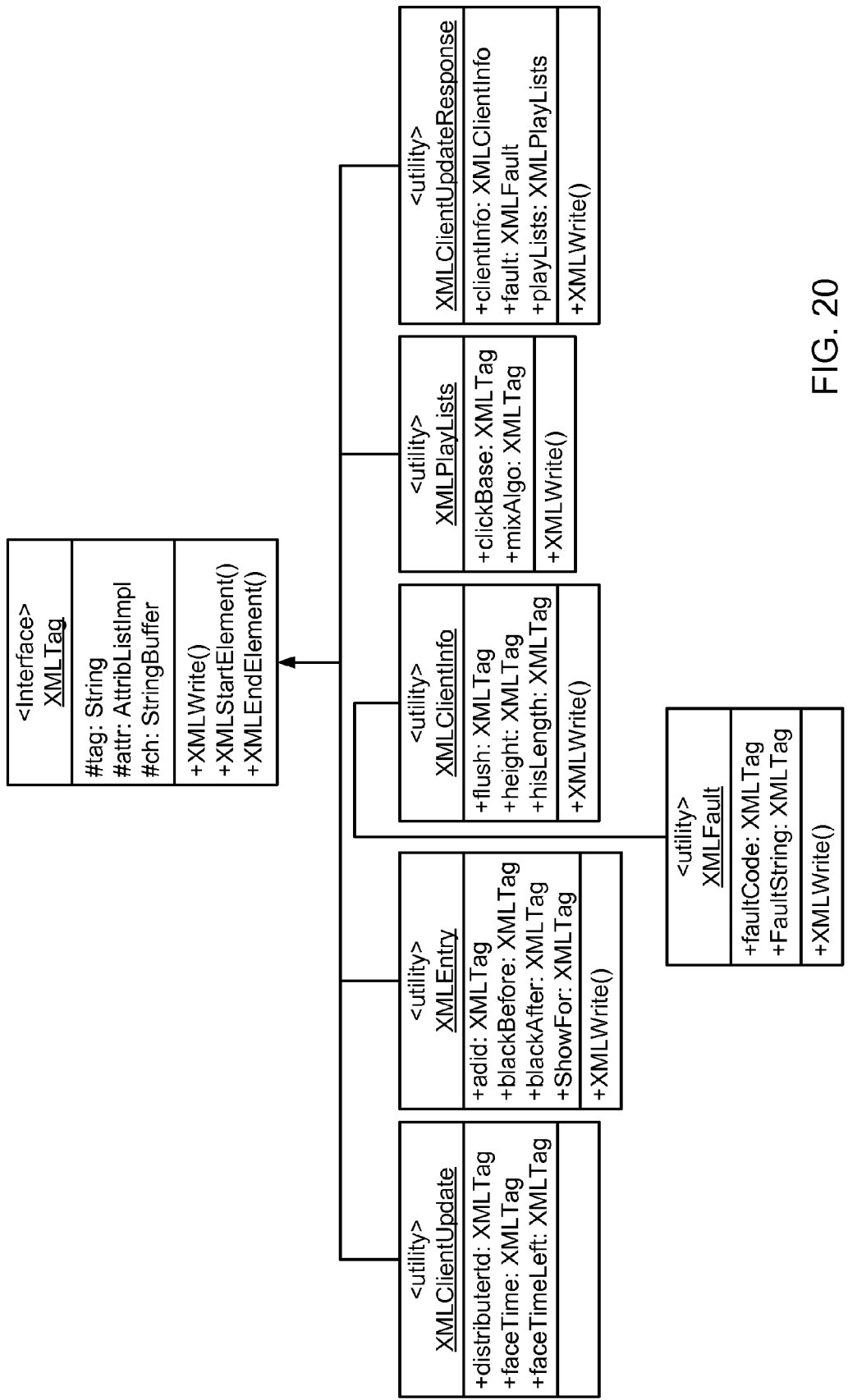
FIG. 20 is a class diagram illustrating the mapping of XML code to objects and the task flow when another exemplary embodiment according to the present invention is operating in accordance with doPost methodology.

What follows is an explanation of task flow in the PLS when the Servlet doPost method is invoked. See FIG. 20. The PLS parses the XML request and builds objects that represents the client update request. It will be noted that data access is performed using SAX. When logging the client request, the PLS stores the client request information in a so-called ClientUpdate table (not shown).

It will be appreciated that the PlayList Request can be received from a plurality of e-mail clients residing on the client computers generally denoted 100n through any given day. When issuing the same SQL statement repeatedly, it will be appreciated that it is more efficient to use a Prepared Statement rather then generating a new Statement in response to a query. In the logging operation, the software provider advantageously can employ the following semantic to avoid repetitive Statement generation:

PreparedStatement ps=conn.prepareStatement("INSERT INTO ClientUpdate (date, userAgent, PlayListId, Y) values (?, ?, ?, ?, . . . )");

It should be mentioned that in generating a New PlayList, the Servlet advantageously can employ both SQL queries and programming filtering. It will also be appreciated that these processes are synchronized in order to prevent conflicts when accessing the database. Appropriate pseudo code of generating a PlayList is depicted in FIGS. 21A and 21B. The first block of pseudo code in FIG. 21A generates an ad list. It will be appreciated that the ad list generated by the first block of pseudo code holds all the image ads that are active and can be delivered within a predetermined time frame. The second block of pseudo code listed in FIG. 21A calculates the time needed to deliver the ads. The third block of pseudo code, which is illustrated in FIG. 21B, determines additional ads which can be used to fill the available facetime. In other words, if the e-mail client software has remaining time to fill, the generated PlayList will automatically fill the available time with runout ads, i.e., find a run out ad which is not in the ads history and which also fits into the Goal show time left.

When generating XML, it is often useful to generate comments, processing instructions, and so on. The package XP Writer provides a set of methods for creating specific kinds of nodes in the output XML code, i.e., file. The following is a short list of methods PLS employs in generating the XML output.

Starts an element—start-tag

Ends an element—end-tag or close the current start-tag as an empty element.

Attribute add attributes to a tag name value pair format

Comments writes a comment

The PLS stores the information generated in response to a request in two tables, a PlayList general response table, which holds the client info section and PlayList general information, and a PlayList specific response, which holds the entry section. It will be appreciated that the PLS advantageously can use the prepared statement API to optimize performance in response to a query.

Referring again to FIG. 20, that figure illustrates a class diagram which advantageously describes the representation and rendering of the PlayList, as will as the PlayList Response. It will be appreciated that this class diagram includes repeated XML Write method calls; these method calls are employed by PLS to generate the XML tags associated with the PlayList.

Figure 22:
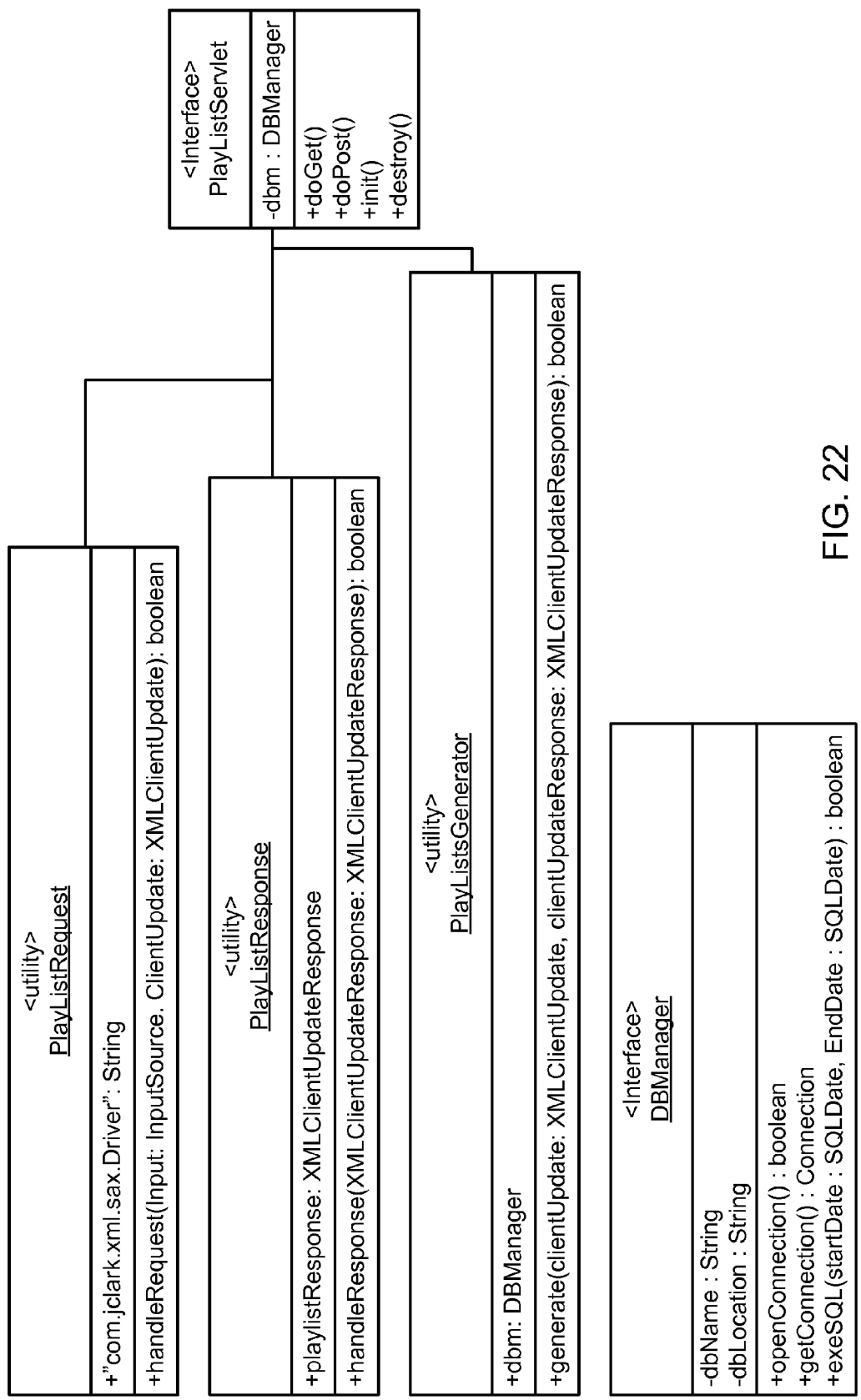
FIG. 22 is another class diagram illustrating handling of requests and writes between a server and at least one of the client computers depicted in FIG. 1.

Turning now to FIG. 22, that figure illustrates the major PlayList Servlet Classes, which collectively define the PlayList Servlet. More specifically, the PlayList Request class handles the request and subsequently maps the XML request to the clientUpdate object while the PlayListResponse class handles the response and writes the clientUpdateResponse back to the client. In addition, the PlayListsGenerate class generates the PlayLists while the DBManager class handles the Data Base connection pool. Additional details are readily apparent from FIG. 22.

Figure 23:
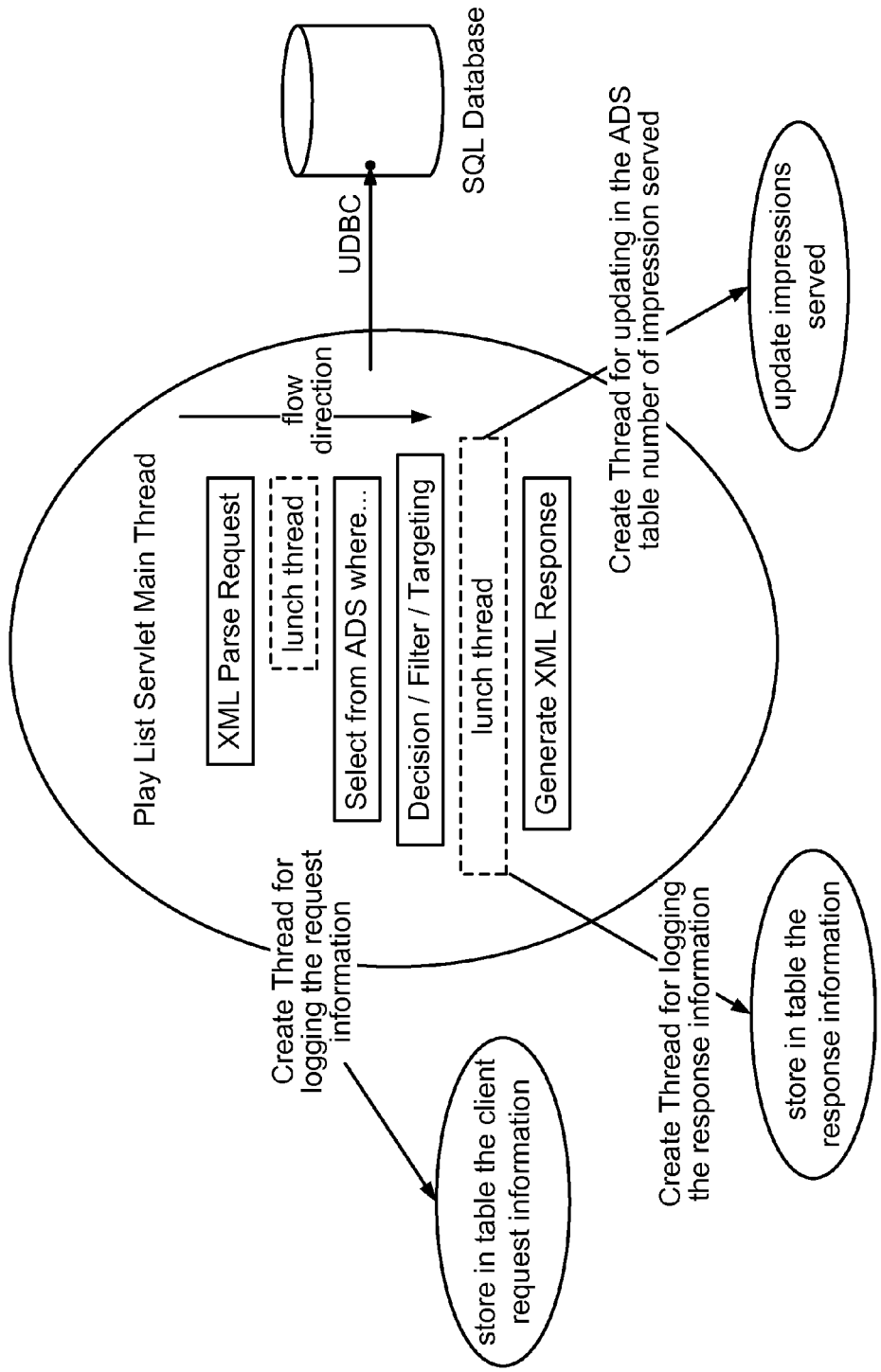
FIG. 23 illustrates database accesses in accordance with another aspect of the present invention.

It will be appreciated from FIG. 23 that all of the storage operations employing the database advantageously can be threaded. As mentioned above, all actions with respect to the database are performed the MM.MySQL package.

In summary, one exemplary embodiment of the present invention encompasses software for converting a general purpose computer into a specialized PlayList server for supplying a PlayList Response to a client device for exchanging information with an information server system over a communications network and storing ads. More specifically, the software instantiates a PlayList Response generation function for generating a PlayList Response identifying a plurality of selected ads to be presented by the client device, and a first communications function that completes a PlayList Response send communication link with the client device via the communications network over which the PlayList Response is transmitted to the client device, wherein the information server system and the PlayList server are independently controlled. It will be appreciated that, while the PlayList directs the presentation, e.g., display, of ads on the client device, e.g., an e-mail client, the ads advantageously may be delivered to or retrieved by the client device in any number of ways in this preferred embodiment. In this exemplary embodiment, the PlayList Request preferably includes ad identifiers and ad presentation instructions; corresponding uniform resource names (URNs) can be included but may be omitted.

According to another exemplary embodiment, the present invention encompasses software for converting a general purpose computer into a specialized PlayList server for supplying a PlayList Response to a client device exchanging information with an information server system and receiving ads from an ad server over a communications network. The software advantageously includes a PlayList Response generation function for generating a PlayList Response identifying a plurality of selected ads to be presented by the client device, and a first communications function that effects a PlayList Response send communication link with the client device via the communications network over which the PlayList Response is transmitted to the client device. Preferably, the information server system and the PlayList server are independently controlled. It will be appreciated that this exemplary and non-limiting embodiment of the present invention contemplates a specific communications channel between the client device and a dedicated ad server (system) for delivery of ads defined by the PlayList. It will also be appreciated that the PlayList Request employed by this exemplary embodiment includes both information dictating presentation of the ads and/or operation of the client device with respect to ad presentation functions, and the name and URN for ads included in a New PlayList.

According to yet another exemplary embodiment, the present invention provides software for converting a general purpose computer into a specialized PlayList server for supplying a PlayList Response to a client device exchanging information with an information server system and receiving ads from an ad server over a communications network, including:

a PlayList Response generation function for generating a PlayList Response identifying a plurality of selected ads to be presented by the client device, a PlayList Request parsing function for extracting selected information from the PlayList Request;

a PlayList generation function receiving an output of the database driver function for generating a PlayList for inclusion in the PlayList Response which identifies a plurality of selected ads to be presented by the client device in response to receipt of a PlayList Request, a selected information supply function for supplying the selected information to the PlayList Response generation function to thereby initiate the PlayList generation function, a first communications function that effects a PlayList Response send communication link with the client device via the communications network over which the PlayList Response is transmitted to the client device, and a second communication function that effects a PlayList Request receive function with the client device via the communications network, wherein the information server system and the PlayList server are independently controlled.

Preferably, the PlayList Request parsing function includes an extensible markup language (XML) parsing function for verifying the wellformedness of the PlayList Request, a PlayList analysis function receiving the PlayList Request after verification by the XML parsing function for generating an object, and a database driver function receiving the object for building a query from the object and applying the query to a PlayList server database.

It should be noted that the PlayList Response generation function is initiated by receipt of a PlayList Request, which, in an exemplary case, includes the name of the current PlayList(s) employed by the client device providing the PlayList Request. While each of the numerous client devices connected to an information server generate a PlayList Request, the discussion of this specific aspect of the present invention, i.e., the PlayList server, can best be understood from the point of view of a system including only one client device; the actual implementation of the, for example, e-mail client device contemplates the use of thousands of client devices.

The PlayList Request advantageously can include information regarding the currently running PlayList(s) on the client device, and user data fields that store data regarding the progress made by the client device in presenting, e.g., displaying, the ads stored by the client device. An exemplary and non-limiting list of the information that can be provided to the PlayList server via the PlayList Request includes:

a first user data field identifying a current PlayList;
a second user data field identifying user demographic data;
a third user data field identifying user/client device behavior data;
a fourth user data field identifying usage history of the client device;
a fifth user data field identifying the respective software operating on the client device;
a sixth user data field identifying the respective operating system of the client device;
a seventh user data field identifying the amount of time the user has used client device over a prescribed time interval;
an eighth user data field identifying the total amount of display time required for the stored ads that remain to presented by the client device;
a ninth user data field identifying the total amount of times that ads were presented by the client device during the prescribed time interval;
a tenth user data field identifying the dimensions of a display screen associated with the client device; and
a list of the ad identifiers corresponding to advertisements that have been displayed in the prescribed most recent time interval.

Advantageously, the PlayList Request parsing function can extract selected information from the PlayList Request and employ the selected information and other information, e.g., information provided by the entity controlling the PlayList server, in generating the PlayList Response. It will be appreciated that the PlayList Request may include all or a subset of the information listed immediately above; the PlayList Request parsing function extracts information contained in at least one of the user data fields. In any event, the receipt of the PlayList Request by the PlayList server initiates generation of the PlayList Response.

In response to the PlayList Request, the PlayList Response generation function generates one of an action command and the PlayList Response. With respect to the former, the PlayList Response generation function advantageously can generate the action command in response to receipt of a garbled PlayList Request. This can be generally thought of as an error code directing the client device to send a New PlayList Request. It will be appreciated that the action command can include an associated error message, which is presentable to the user by the client device. Alternatively, the action command may cause the client device to delete all of the ads received and/or stored by the client device responsive to a command issued to the PlayList server by an entity controlling the PlayList server. In other words, there are times when the software provider may wish to flush the existing ads; the entity controlling the PlayList server, e.g., the software provider, sends a command to the PlayList server, which command causes the PlayList server to respond with a flush command to either specific PlayList Requests, e.g., PlayList Requests generated by a particular software version, of all PlayList Requests. With respect to the latter, a detailed discussion follows.

As discussed above, the PlayList Response advantageously includes both client information, information regarding how the client device, e.g., a PDA device, is to present, e.g., display, the selected ads, i.e., the ads that during the time period following receipt of the PlayList Response by the client device, and a New PlayList. For example, selected parameters included in the client information advantageously can switch the client device from between a persistent presentation mode and a short-lived presentation mode of presenting the ads. The client information can, in an exemplary case:

control the turnover rate of the ads presented by the client device;
specify the periodicity at which the client device generates the PlayList Request;
establish a minimum time separation between competing ones of the ads;
establish specifications directing the manner in which the client device is to present each of the ads.

For example, when the ads available to the client device include both current ads (paid ads) and expired ads (free ads), the client information includes a minimum time period during which the client device presents the current ads before the client device presents the expired ads. The client information may also establish a maximum time period during which the client device is permitted to present the expired ads. In any event, the PlayList Response advantageously may include commands or selected parameters which direct the client device to either concatenate the New PlayList to the current PlayList(s) or discard the current PlayList(s) in favor of the New PlayList. The command, or the selected parameters, controlling this facet of the client device operation is executed upon receipt of the PlayList Response by the client device over the effected communications link.

The New PlayList included in the PlayList Response includes a name and a corresponding Uniform Resource Name (URN) for each of the selected ads. It will be appreciated that the URN can correspond to one of a storage location of the respective named ad on an ad server or a location on the ad server redirecting the client device to a location on another storage device for the respective named ad. Alternatively, the URN specifies a location on the ad server redirecting the client device to an ad storage location collocated on the ad server for the respective named ad. It should be mentioned at this point that, in addition to the name and URN of each of the selected ads, the New PlayList may also include information identifying an ad type, i.e., postage stamp ad, toolbar ad, or placard ad, for each one of the respective selected ads.

It should be noted that in at least one exemplary embodiment of the present invention, the PlayList server instantiated by software stored on the server computer 302 advantageously responds to a PlayList Request written, i.e., coded, in extensible markup language (XML). One of ordinary skill in the art of documents generated in XML will appreciate that these documents, e.g., the PlayList Request, advantageously can have an associated document type definition (DTD). In order to optimize system performance, the PlayList server should have the DTD available, i.e., available to the PlayList Request parsing function. There are several options for ensuring that the DTD is available to the PlayList server. First, the DTD for each of different types of client devices, e.g., e-mail client device or PDA, is stored by the PlayList server. In that case, the PlayList Request need only include a DTD tag, which identifies the particular DTD to be employed by the PlayList Request parsing function. Second, the DTD advantageously can be embedded in the PlayList Request. In either case, both the PlayList server and the client device implicitly use the same DTD.

It should be mentioned that the software provider should make provisions with respect to ad security. There are really two security issues to consider. One is whether or not the client is getting valid ads (call this client security), and the second is whether or not a valid client is fetching ads (call this server security).

Client security is of relatively small importance. If a given person manages to trick Eudora into displaying some ads other than those transmitted by the software provider, it probably doesn't matter a great deal. This is not to say that it could not become problematic if large numbers of clients at one or more sites began doing it; however, a carefully worded license agreement should make at least large sites avoid actions which would cause this particular problem. However, to avoid trivial attacks, PlayLists and ads advantageously can be checksummed with MD5 (or another mechanism), and the checksums recorded in the PlayList. Then the client can checksum the PlayList and ads using the same secret seed, and compare its checksums to those in the PlayList. If it fails to get the proper ads, this will be treated as a failure to get ads at all.

Server-side security is potentially a much bigger problem. The software provider intends to charge advertisers for ads, based on the understanding that the software provider's users will actually see the ads the software provider is charging for. To do this with confidence, the software provider should ascertain that it is actually Eudora that is downloading the ads, and not some rogue process written to fetch many ads. Why would someone bother to fetch ads? While the software provider can't discount the "because they can" motivation of the amateur hacker, the real issue is the ad revenue, i.e., ad bounty. Because every ad fetch can generate revenue for a third party, there is a very significant financial incentive for that third party to cause a lot of ad fetches. It thus becomes imperative that the software provider prevent (and/or detect) ad fetches not made by copies of Eudora. Given that such fetches may be in violation of the agreement the software provider signed with the distributor, these fetches could constitute a form of fraud.

There are several different approaches to fraud detection which advantageously can be implemented in the software running, for example, on Ad server 303. Whatever method the software provider eventually uses to prevent fraud, it will be important also to detect fraud should it occur. There are two broad classes of fraud detection; authentication and statistical analysis.

Authentication is easily understood; if the program fetching the ads fails to prove that it is a valid copy of Eudora, the software provider will be alerted to possible fraud. However, authentication provides challenges of its own, and may be impossible or impractical or simply unnecessary.

Statistical analysis has some significant benefits, but also significant drawbacks. The benefits include minimal work in the client (and hence no vulnerability to disassembly, etc.), no run-time burdens on either the client or the server, i.e., everything can be done "after the fact" during accounting runs, easily changeable from the software provider's end, ability to be applied retroactively, etc. The drawbacks to statistical analysis include that statistical analysis will never be entirely certain, and that the software provider may not collect the proper statistics, etc.

A listing of parameters or statistical measures that the software provider may gather or compute is presented immediately below.

| | |
|---|---|
| ClientID | It's hard to see a way to avoid generating some sort of client id for use with fetching ads. The software provider might hope that such identifiers will be self-validating, but it is preferable that the software provider needs to know what particular installation of Eudora is actually fetching ads. This can then be used in compiling statistics and performing computations. By "installation" the software provider means a single storage system directory (PC) or folder (Mac) with a Eudora mail structure in it, i.e., data interchanged between the e-mail client and at least one server and not necessarily the e-mail client itself, per se. |
| IpAddress | The software provider will likely want to log requests by the IP address of the originating e-mail client. |
| DistributorID | Of course a cornerstone of the referral payment system is the fact that the software provider will record the distributor ID for the client fetching ads. The software provider should collect this when users pay or even register the software. |
| NumPaidUsers | This statistic is the number of paid users with a given distributor ID. |
| NumClientIDs | This statistic is the number of client ID's with a given distributor ID. |
| NumAdsFetched | The number of ads fetched by a particular client ID. |

Given the raw data available from monitoring the parameters listed above, the following is an exemplary and non-inclusive list of possible statistical measures which can be generated.

| | |
|---|---|
| NumAdsFetched | A client ID with a very high number of ads fetched is suspicious. |
| NumClientIDs/ NumPaidUsers | Paid users is a very hard number, because the software provider will have collected credit card information and charged against this card. Thus, it can serve as a useful measuring stick for how many clients the software provider can expect. A particular distributor with a very high ratio or a ratio that suddenly goes higher bears investigation. |

One of the issues which the software provider must be very cognizant of is the protection of the user's privacy, i.e., the user generally does not want to receive ads based on information that the user unknowingly submitted to the software provider. There is an extremely vocal and paranoid subset of the user community, who object to practically all forms of information gathering, even the most benign. Even relatively innocent devices like serial numbers are considered something to be completely avoided. While the serial number of a software program may seem like a trivial matter to the software supplier, users who object to this type of "tagging" exist, and the software provider should be cognizant of such users. In order to avoid such concerns to the maximum extent possible, the software provider should adopt a Confidential Information Policy which includes the following provisions:

Obtain Permission—Before the software provider gathers or transmits any data that might identify the user to the advertiser, the software provider should obtain the user's explicit (See FIG. 18A) or near-explicit permission. The term near-explicit is employed to denote that the software provider may, for example, put a special privacy warning in the web page where the user registers a software program such as Eudora. Here, the user is clearly taking an action to submit data to the software provider; as such, explicit permission shouldn't be needed. On the other hand, the software provider should go out of its way to identify areas where an unreasonable user might be able to claim that he/she didn't know he/she was giving information to the software provider, and ask for explicit permission there, even if it seems relatively obvious to the software provider.

Data Separation—Insofar as possible, the software provider should maintain payment information separate from registration information, and both types of information should be maintained separate from demographic information, etc. While it may be very tempting to correlate databases, the software provider faces potential crucifixion if the databases are actually correlated. Moreover, since the software provider can still deliver very targeted advertising without database correlation, the software provider should maintain separate databases.

User Verifiability—Insofar as possible, protections established by the software provider should be verifiable by end users with packet sniffers. The software provider may even encourage the practice of watching the software's, e.g., Eudora's, actions. It is one thing to say "The software provider does not give your personal data to advertisers;" it is quite another for the user to be able to verify that this is the case.

Strong Public and Private Commitment—The software provider needs to be clear and public with its privacy policies, and the software provider needs to respect them internally. If the software provider merely views privacy as something the software provider must do to avoid adverse press coverage, the software provider will do it poorly and wind up in trouble.

In summary, the present invention encompasses a multi-moded software product, e.g., e-mail software, which includes three "self-contained" different versions (or, "modes"), including a "first full feature set" version which is activated when the software product is paid for by the user (i.e., a "Payware version"), a "second full feature set" version which is activated when the user agrees (e.g., either by default or by explicit agreement) to accept advertisements delivered to the client device in order to subsidize the software product (i.e., an "Adware" version), and a "reduced feature set" version which is activated when the software product is not paid for (i.e., a "freeware" version) and the "second full feature set" version is not activated. The present invention also encompasses a system and method for automatically distributing advertisements to a multiplicity of client devices that have such multi-moded software installed thereon. It will be appreciated that the first and second full feature sets are identical with respect to e-mail support features; it will also be appreciate that the second full feature set includes PlayList and ad fetching and display features which are dormant in the first full feature set.

Moreover, the present invention further encompasses multi-moded software as set forth above, wherein the multi-moded software includes a mode switching function which automatically switches from the "Adware" version to the "freeware" version upon detecting a prescribed condition (e.g., based upon monitored user activity level, and/or less than a prescribed number of ads having been downloaded, i.e., "deadbeat user" criterion). The present invention also encompasses a system and method for automatically distributing advertisements to a multiplicity of client devices that have such multi-moded software installed thereon.

It will be appreciated from the discussion above that the present invention further encompasses multi-moded software as set forth above, wherein the multi-moded software includes a mode switching function which automatically switches from the "Adware" version to the "freeware" version upon detecting occurrence of a prescribed "ad failure condition", e.g., less than a prescribed number of ads having been received and/or displayed by the client device within a prescribed time period, and an "Ad Failure Nag" function which monitors "time since last Nag" and which generates an "Ad Failure Nag" according to a "Nag Schedule" which is dynamically varied based on the monitored "time since last Nag" information and/or based on cumulative ad download/display statistics or information. The present invention also encompasses a system (and method) for automatically distributing advertisements to a multiplicity of client devices that have this multi-moded software product installed thereon.

In one exemplary embodiment, the present invention further encompasses multi-moded software as set forth above, wherein the multi-moded software includes a Nag function which generates different types of Nags dependent upon the current mode of the software product which is currently activated, and/or based upon time since the last Nag was generated, and/or based on cumulative ad download/display statistics or information, and/or based on other monitored conditions. For example, the different types of Nags could include a "Registration Nag", a "Payware Nag", an "Adware Nag", an "Update Nag", and an "Ad Failure Nag". The present invention also encompasses a system (and method)

for automatically distributing advertisements to a multiplicity of client devices that have this multi-moded software product installed thereon.

In another exemplary embodiment, the present invention encompasses a software product (e.g., e-mail software) that incorporates an automatic advertisement download function for automatically downloading advertisements to be displayed when the software is activated, and a control function for monitoring user activity levels and for controlling the display of downloaded advertisements at the client device based upon the monitored user activity levels (e.g., based upon "discrete" and/or "cumulative" ad display parameters). The present invention also encompasses a system and method for automatically distributing advertisements to a multiplicity of client devices that have this software product installed thereon.

The present invention also encompasses an e-mail software product that incorporates a control function for automatically downloading advertisements from a remote server system which is separate and independent from the e-mail server system, as well as the system and method for automatically distributing the advertisements to client devices which have this e-mail software product installed thereon. In particular, the system includes an ad server system that manages, administers, and controls the distribution of advertisements, and which is controlled by a control entity (e.g., one operated by the present assignee, QUALCOMM INCORPORATED) which is separate and independent from the control entity which controls the e-mail server system which provides e-mail services to any particular client device which has this e-mail software product installed thereon. Thus, in sharp contrast to the Juno Online Services system, in accordance with this aspect of the present invention, the ad server system and the e-mail server system are operated independently, i.e., under the control of separate and independent control entities.

Advantageously, the present invention also encompasses a software product, e.g., e-mail software, which incorporates an automatic advertisement files download function for automatically downloading advertisements from a remote server system to a client device on which the software product is installed, and a control function for locally controlling the display of downloaded advertisements at the client device based upon ad parameters included in the downloaded advertisement files, e.g., including (for each ad), various combinations and sub-combinations of the following ad parameters, namely, the maximum ad display time, or face time, for any given display of that particular ad, the maximum total/cumulative ad display time, or face time, for that particular ad, the maximum number of times to display that particular ad per day, the date/time before which that particular ad should not run, and the date/time after which that particular ad should not run. The present invention also encompasses a system and method for automatically distributing advertisements to a multiplicity of client devices that have this software product installed thereon.

It will be appreciated that the present invention also encompasses a software product, e.g., e-mail software, which incorporates an automatic advertisement download function which fetches a PlayList from a remote server system (e.g., a PlayList server system) which specifies the advertisements to be fetched by the client device on which the software product is installed and the source addresses (e.g., URNs) of the ad servers on which the specified advertisements are stored, fetches the advertisements specified in the fetched PlayList, and stores the fetched advertisements on the client device. The present invention further encompasses a system and method for distributing advertisements to client devices which have this software product installed thereon, including a PlayList server (or PlayList server system) which, in response to a PlayList Request from a particular client device that includes a client PlayList identifier, compares a client PlayList identified by the client PlayList identifier with a current PlayList (which may optionally be customized to that particular client device) stored on the PlayList server, and then sends back to the client device a New PlayList which specifies the new advertisements to be fetched by the client device, and the source addresses of the ad servers on which the specified new advertisements are stored.

Optionally, the above-described automatic advertisement download function of the software product installed on the client device can delete (discard) all or PlayList server-specified ones of the advertisements which are currently stored on the client device, e.g., those which are not specified in the current PlayList; and/or the above-described automatic advertisement download function of the software product installed on the client device can merge the New PlayList with the current client PlayList. The present invention also encompasses several variations and details of implementation of this novel PlayList/ad fetch process utilized in the Eudora Adware scheme.

Moreover, the present invention encompasses a software product, e.g., e-mail software, which incorporates a custom installer which identifies the specific software product distributor that distributed that software product. The present invention further encompasses a software product, e.g., e-mail software, which incorporates an automatic advertisement download function for automatically downloading advertisements from a remote server system to a client device on which the software product is installed, and a custom installer which identifies the specific software product distributor which distributed that software product, for the purpose of facilitating apportionment of advertising revenue the software product vendor receives from advertisers to specific software product distributors. The present invention also encompasses a system (and method) for automatically distributing advertisements to a multiplicity of client devices which have this software product installed thereon, wherein the system includes a centralized control facility which receives software product distributor ID information from the client devices and uses this software product distributor ID information to facilitate apportionment of advertising revenue the software product vendor receives from advertisers to specific software product distributors. Alternatively, or additionally, a central database function which identifies (e.g., by means of cross-referencing and/or correlation tables) the software product distributor ID for each software product distributed by the software vendor, e.g., based on a serial number or reference code associated with each copy of the software product, can be utilized.

Furthermore, the present invention encompasses a software product, e.g., e-mail software, that incorporates an automatic advertisement download function for automatically downloading advertisements from a remote server system to a client device on which the software product is installed, and a control function which utilizes a built-in "deadman timer" to impose a time limit for each particular advertisement download session, e.g., the client device will be disconnected from the remote server system upon expiration of the time limit imposed by the "deadman timer". The present invention also encompasses a system (and method) for automatically distributing advertisements to a multiplicity of client devices that have this software product installed thereon.

It will also be appreciated that the present invention can be characterized as a software product, e.g., e-mail software, that incorporates an automatic advertisement download function for automatically downloading advertisements from a remote server system to a client device on which the software product is installed, and an instrumentation and auditing module having various novel features/functions, e.g., maintaining a rotating log of ad-related statistics and/or performing random and/or statistically-based ad effectiveness audits with user permission. The present invention also encompasses a system (and method) for automatically distributing advertisements to a multiplicity of client devices that have this software product installed thereon, wherein the system includes a centralized control facility for obtaining ad-related statistical information from selected client devices, in a random or statistical manner, e.g., for the purpose of monitoring the integrity and/or effectiveness of the advertisement distribution system.

Moreover, the present invention encompasses a software product, e.g., e-mail software, that incorporates an automatic advertisement download function for automatically downloading advertisements from a remote server system to a client device on which the software product is installed, and a "link history" function which enables the user to review previously-viewed advertisements, e.g., by providing a graphical user interface (GUI) which includes a link history window that lists links the user has previously visited and ads that have been previously displayed to the user, along with some status information on each. Preferably, a mechanism will be provided to enable the user to select an ad listed in the link history window for display, e.g., by single-clicking the appropriate ad link, and to enable the user to visit the source Web site of any given ad listed in the link history window, e.g., by double-clicking the appropriate ad link. The present invention also encompasses a system (and method) for automatically distributing advertisements to a multiplicity of client devices that have this software product installed thereon.

Furthermore, the present invention encompasses a software product, e.g., e-mail software, which incorporates a "Nag" function that monitors "time since last Nag" and that "nags" the user according to a "Nag Schedule" which is dynamically varied based on the monitored "time since last Nag" information.

Finally, the present invention encompasses a software product, e.g., e-mail software, that incorporates a download function that downloads separate file portions representing a single image during separate communication sessions with a remote server (e.g., separate file portions of an advertisement file, e.g., a GIF file). The present invention further encompasses a system (and method) for automatically distributing advertisements to a multiplicity of client devices that have this software product installed thereon.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for use on a client device that is configured for communications with a remote source of advertisements via a communications network, comprising:
   downloading advertisements from the remote source, during one or more advertisement download sessions;
   storing downloaded advertisements on a storage medium associated with the client device;
   effecting display of at least selected ones of the stored advertisements on a display associated with the client device;
   determining whether an obscured ad condition has occurred via an obscured ad monitor function which determines if the at least selected ones of the stored advertisements is both on the display and uncovered and wherein the obscured ad condition occurs when an advertisement currently being displayed on the display associated with the client device is being obscured by one or more other items currently being displayed on the display; and
   generating an obscured ad nag display distinct from the advertisement currently being displayed via an obscured ad nag function in response to detection of the obscured ad condition, wherein the obscured ad nag display notifies the user of the obscured ad,
   wherein:
      advertisements comprise advertisement files each of which includes an advertisement and a plurality of ad display parameters associated with that advertisement;
      the advertisement display function displays the stored advertisement according to the ad display parameters; and
      the ad display parameters include, for each of the plurality of stored advertisements the following parameters:
         a maximum face time that the associated advertisement is to be displayed wherein the face time comprises a time period during which a prescribed minimum level of user activity occurs;
         a maximum cumulative face time that the associated advertisement is to be displayed;
         the maximum number of times per day that the associated advertisement is to be displayed;
         a start date/time before which the associated advertisement should not be displayed; and
         an end date/time after which the associated advertisement should not be displayed.

2. The method of claim 1, wherein the obscured ad nag display further notifies the user that the obscured nag display will be generated upon each future occurrence of an obscured ad condition.

3. The method of claim 2, wherein the obscured ad nag display further notifies the user that the user has the following choices:
   remove whatever is obscuring the obscured advertisement;
   a maintenance state, so that every future occurrence of an obscured ad condition will result in the generation of the obscured ad nag display; and
   switch an operating mode of the software from a first operating mode to a second operating mode, wherein the second operating mode has less features than the first operating mode.

4. The method of claim 1, wherein effecting display of at least selected ones of the stored advertisements comprises effecting display of the at least one selected ones of the stored advertisements when the client device is offline.

5. The method of claim 1, wherein the obscured ad display further notifies the user that the following options are available:
   remove whatever is obscuring the obscuring advertisement;
   a maintenance state, so that every future occurrence of an obscured ad condition will result in the generation of the obscured ad nag display; and switch an operating mode of the software from a first operating mode to a second operating, wherein the second operating mode has less features than the first operating mode.

6. The method of claim 1, wherein downloading advertisements from the remote source comprises downloading advertisements from the remote source via the Internet.

7. The method of claim 1, wherein the method is performed as part of method steps of an e-mail software.

8. The method of claim 7, wherein the at least one remote source is operated by a vendor of the e-mail software.

9. The method of claim 7, wherein downloading advertisements from the remote source comprises downloading advertisements from an advertisement distribution server system that is operated by a vendor of the e-mail software in order to distribute advertisements to clients of the vendor for the purpose of subsidizing the e-mail software.

10. The method of claim 7, wherein downloading advertisements from the remote source comprises downloading advertisements from an advertisement distribution server system that includes;
   at least one ad server which stores at least one of a plurality of advertisements to be downloaded; and
   at least one playlist server which stores at least one playlist each of which contains a list of the plurality of advertisements to be downloaded, and the address of the ad server where each listed advertisement is stored.

11. The method of claim 10, wherein the at least one playlist server is controlled by a vendor of the e-mail software.

12. The method of claim 10, wherein the at least one ad server comprises a plurality of ad servers that each store one or more advertisements to be distributed to the client device.

13. The method of claim 10, wherein:
   the at least one playlist server is controlled by a vendor of the e-mail software;
   the at least one ad server comprises a plurality of ad servers that each store one or more advertisements to be distributed to clients of the vendor of the e-mail software; and
   at least one of the plurality of ad servers is controlled by the vendor of the e-mail software.

14. The method of claim 10, wherein:
   the at least one playlist server is controlled by a vendor of the e-mail software;
   the at least one ad server comprises a plurality of ad servers that each store one or more advertisements to be distributed to clients of the vendor of the e-mail software; and
   at least one of the plurality of ad servers is controlled by an entity other than the vendor of the e-mail software that has granted the vendor of the e-mail software and its clients access to its ad server(s).

15. The method of claim 7, wherein the e-mail software is compatible with a plurality of e-mail service providers.

16. The method of claim 7, wherein the e-mail software is not tied to a particular e-mail service provider.

17. The method of claim 7, wherein the e-mail software is operational across a plurality of different e-mail systems.

18. The method of claim 7, further comprising installing the e-mail software on a computer-readable storage medium associated with the client device.

19. A non-transitory computer readable medium having stored therein computer readable instructions for use on a client device that is configured for communications with a remote source of advertisements via a communications network, wherein the stored computer readable instructions are configured to cause the client device to perform operations comprising:
   downloading advertisements from the remote source during one or more advertisement download sessions;
   storing downloaded advertisements on a storage medium associated with the client device;
   effecting display of at least selected ones of the stored advertisements on a display associated with the client device;
   determining whether an obscured ad condition has occurred via an obscured ad monitor function which determines if the at least selected ones of the stored advertisements is both on the display and uncovered and wherein the obscured ad condition occurs when an advertisement currently being displayed on the display associated with the client device is being obscured by one or more other items currently being displayed on the display; and
   generating an obscured ad nag display distinct from the advertisement currently being displayed via an obscured ad nag function in response to detection of the obscured ad condition, wherein the obscured ad nag display notifies the user of the obscured ad condition,
   wherein:
      advertisements comprise advertisement files each of which includes an advertisement and a plurality of ad display parameters associated with that advertisement;
      the advertisement display function displays the stored advertisement according to the ad display parameters; and
      the ad display parameters include, for each of the plurality of stored advertisements, the following parameters:
         a maximum face time that the associated advertisement is to be displayed wherein the face time comprises a time period during which a prescribed minimum level of user activity occurs;
         a maximum cumulative face time that the associated advertisement is to be displayed;
         the maximum number of times per day that the associated advertisement is to be displayed;
         a start date/time before which the associated advertisement should not be displayed; and
         an end date/time after which the associated advertisement should not be displayed.

20. The non-transitory computer readable medium of claim 19, wherein the stored computer readable instructions are configured to cause the client device to perform operations such that generating the obscured ad nag display further notifies the user that the obscured nag display will be generated upon each future occurrence of an obscured ad condition.

21. The non-transitory computer readable medium of claim 20, wherein the stored computer readable instructions are configured to cause the client device to perform operations such that the obscured ad nag display further notifies the user that the user has the following choices:
   remove whatever is obscuring the obscured advertisement;
   a maintenance state, so that every future occurrence of an obscured ad condition will result in the generation of the obscured ad nag display; and
   switch an operating mode of software from a first operating mode to a second operating mode, wherein the second operating mode has less features than the first operating mode.

22. The non-transitory computer readable medium of claim 19, wherein the stored computer readable instructions are configured to cause the client device to perform operations such that the at least one selected ones of the stored advertisements is displayed when the client device is offline.

23. The non-transitory computer readable medium of claim 19, wherein the stored computer readable instructions are configured to cause the client device to perform operations such that the obscured ad display further notifies the user that the following options are available:
- remove whatever is obscuring the obscuring advertisement;
- a maintenance state, so that every future occurrence of an obscured ad condition will result in the generation of the obscured ad nag display; and
- switch an operating mode of software from a first operating mode to a second operating, wherein the second operating mode has less features than the first operating mode.

24. The non-transitory computer readable medium of claim 19, wherein the stored computer readable instructions are configured to cause the client device to perform operations such that downloading advertisements from the remote source comprises downloading advertisements from the remote source via the Internet.

25. The non-transitory computer readable medium of claim 19, further having stored therein e-mail software.

26. The non-transitory computer readable medium of claim 25, wherein the stored computer readable instructions are configured to cause the client device to perform operations such that downloading advertisements from the remote source comprises downloading advertisements from a remote source operated by a vendor of the e-mail software.

27. The non-transitory computer readable medium of claim 25, wherein the stored computer readable instructions are configured to cause the client device to perform operations such that downloading advertisements from the remote source comprises downloading advertisements from an advertisement distribution server system that is operated by a vendor of the e-mail software.

28. The non-transitory computer readable medium of claim 25, wherein the stored computer readable instructions are configured to cause the client device to perform operations such that downloading advertisements from the remote source comprises downloading advertisements from an advertisement distribution server system that includes:
- at least one ad server which stores at least one of a plurality of advertisements to be downloaded; and
- at least one playlist server which stores at least one playlist each of which contains a list of the plurality of advertisements to be downloaded, and the address of the ad server where each listed advertisement is stored.

29. The non-transitory computer readable medium of claim 28, wherein the at least one playlist server is controlled by a vendor of the e-mail software.

30. The non-transitory computer readable medium of claim 28, wherein the at least one ad server comprises a plurality of ad servers that each store one or more advertisements to be distributed to the client device.

31. The non-transitory computer readable medium of claim 28, wherein:
- the at least one playlist server is controlled by a vendor of the e-mail software;
- the at least one ad server comprises a plurality of ad servers that each store one or more advertisements to be distributed to clients of the vendor of the e-mail software; and
- at least one of the plurality of ad servers is controlled by the vendor of the e-mail software.

32. The non-transitory computer readable medium of claim 28, wherein:
- the at least one playlist server is controlled by a vendor of the e-mail software;
- the at least one ad server comprises a plurality of ad servers that each store one or more advertisements to be distributed to clients of the vendor of the e-mail software; and
- at least one of the plurality of ad servers is controlled by an entity other than the vendor of the e-mail software that has granted the vendor of the e-mail software and its clients access to its ad server(s).

33. The non-transitory computer readable medium of claim 25, wherein the e-mail software is compatible with a plurality of e-mail service providers.

34. The non-transitory computer readable medium of claim 25, wherein the e-mail software is not tied to a particular e-mail service provider.

35. The non-transitory computer readable medium of claim 25, wherein the e-mail software is operational across a plurality of different e-mail systems.

36. A client device configured for communications with a remote source of advertisements via a communications network, comprising:
- a display;
- means for downloading advertisements from the remote source, during one or more advertisement download sessions;
- means for storing downloaded advertisements on a storage medium associated with the client device;
- means for effecting display of at least selected ones of the stored advertisements on the display;
- means for determining whether an obscured ad condition has occurred via an obscured ad monitor function which determines if the at least selected ones of the stored advertisements is both on the display and uncovered and wherein the obscured ad condition occurs when an advertisement currently being displayed on the display associated with the client device is being obscured by one or more other items currently being displayed on the display; and
- means for generating an obscured ad nag display distinct from the advertisement currently being displayed via an obscured ad nag function in response to detection of the obscured ad condition, wherein the obscured ad nag display notifies the user of the obscured ad, wherein:
- advertisements comprise advertisement files each of which includes an advertisement and a plurality of ad display parameters associated with that advertisement;
- the advertisement display function displays the stored advertisement according to the ad display parameters; and
- the ad display parameters include, for each of the plurality of stored advertisements, the following parameters:
  - a maximum face time that the associated advertisement is to be displayed wherein the face time comprises a time period during which a prescribed minimum level of user activity occurs;
  - a maximum cumulative face time that the associated advertisement is to be displayed;
  - the maximum number of times per day that the associated advertisement is to be displayed;
  - a start date/time before which the associated advertisement should not be displayed; and
  - an end date/time after which the associated advertisement should not be displayed.

37. The client device of claim 36, wherein means for generating the obscured ad nag display comprises means for notifying the user that the obscured nag display will be generated upon each future occurrence of an obscured ad condition.

38. The client device of claim 37, wherein the means for generating the obscured ad display comprises means for notifying the user that the user has the following choices:
- remove whatever is obscuring the obscuring advertisement;
- a maintenance state, so that every future occurrence of an obscured ad condition will result in the generation of the obscured ad nag display; and
- switching an operating mode of software from a first operating mode to a second operating, wherein the second operating mode has less features than the first operating mode.

39. The client device of claim 36, wherein means for effecting display of at least selected ones of the stored advertisements comprises means for effecting display of at least selected ones of the stored advertisements when the client device is offline.

40. The client device of claim 36, wherein the means for generating the obscured ad display comprises means for notifying the user that the user has the following choices:
- remove whatever is obscuring the obscuring advertisement;
- a maintenance state, so that every future occurrence of an obscured ad condition will result in the generation of the obscured ad nag display; and
- switching an operating mode of software from a first operating mode to a second operating, wherein the second operating mode has less features than the first operating mode.

41. The client device of claim 36, wherein means for downloading advertisements from the remote source comprises means for downloading advertisements from the remote source via the Internet.

* * * * *